United States Patent
Nonomura et al.

(10) Patent No.: US 7,231,386 B2
(45) Date of Patent: *Jun. 12, 2007

(54) APPARATUS, METHOD, AND PROGRAM FOR RETRIEVING STRUCTURED DOCUMENTS

(75) Inventors: Katsuhiko Nonomura, Ichikawa (JP); Takuya Kanawa, Yokohama (JP); Hiroshi Niina, Kawasaki (JP); Shozo Isobe, Kawasaki (JP); Masakazu Hattori, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 254 days.

This patent is subject to a terminal disclaimer.

(21) Appl. No.: 10/980,787

(22) Filed: Nov. 4, 2004

(65) Prior Publication Data

US 2005/0114763 A1 May 26, 2005

Related U.S. Application Data

(62) Division of application No. 10/107,584, filed on Mar. 28, 2002, now Pat. No. 7,080,067.

(30) Foreign Application Priority Data

Mar. 30, 2001 (JP) ............................. 2001-098181

(51) Int. Cl.
  *G06F 17/30* (2006.01)
  *G06F 7/00* (2006.01)
(52) U.S. Cl. .................... 707/3; 707/4; 707/5; 715/513
(58) Field of Classification Search ............... 707/2, 707/3, 5, 100–102, 10, 104.1, 4; 709/205, 709/217, 219, 202; 715/513, 514, 217, 532, 715/517
See application file for complete search history.

(56) References Cited

U.S. PATENT DOCUMENTS 4,803,614 A 2/1989 Banba et al.

(Continued)

FOREIGN PATENT DOCUMENTS

JP 7-56786 3/1995

(Continued)

OTHER PUBLICATIONS

M. Hattori et al.; "Structured Document Search Method, Structured Document Search Apparatus and Structured Document Search System", U.S. Appl. No. 09/714,627, filed Nov. 17, 2000.

(Continued)

*Primary Examiner*—Greta Robinson
*Assistant Examiner*—Jacques Veillard
(74) *Attorney, Agent, or Firm*—Finnegan, Henderson, Farabow, Garrett & Dunner, L.L.P.

(57) ABSTRACT

A system retrieves structured documents based on first desired concept item having first concept items classified hierarchically and subordinated to first desired concept item, second desired concept item having second concept items classified hierarchically and subordinated to second desired concept item, generates a table displaying retrieval results, and associates groups of desired component, one of first items classified as first concept items immediately lower than first desired concept item, and desired second concept item with column index cells of table respectively. When a display area where one of the column index cells is displayed is designated, the system acquire the groups associated with the designated area, and retrieves, based on the acquired group, structured documents each including the desired component including a value in which one of the first concept items subordinated to the one of the first item and one of the second concept items are included.

5 Claims, 51 Drawing Sheets

U.S. PATENT DOCUMENTS

| | | | |
|---|---|---|---|
| 4,868,733 A * | 9/1989 | Fujisawa et al. | 707/5 |
| 4,999,790 A | 3/1991 | Murayama et al. | |
| 5,715,443 A | 2/1998 | Yanagihara et al. | |
| 5,768,578 A * | 6/1998 | Kirk et al. | 707/100 |
| 5,809,496 A | 9/1998 | Byrd et al. | |
| 6,006,217 A * | 12/1999 | Lumsden | 707/2 |
| 6,076,088 A * | 6/2000 | Paik et al. | 707/5 |
| 6,192,366 B1 | 2/2001 | Ogawa | |
| 6,243,723 B1 * | 6/2001 | Ikeda et al. | 715/514 |
| 6,629,097 B1 | 9/2003 | Keith | |
| 6,662,215 B1 | 12/2003 | Moskowitz et al. | |
| 6,772,148 B2 | 8/2004 | Baclawski | |
| 6,912,538 B2 * | 6/2005 | Stapel et al. | 707/101 |
| 7,080,067 B2 * | 7/2006 | Nonomura et al. | 707/3 |

FOREIGN PATENT DOCUMENTS

| | | |
|---|---|---|
| JP | 7-282087 | 10/1995 |
| JP | 9-218878 | 8/1997 |
| JP | 2001-92851 | 4/2001 |

OTHER PUBLICATIONS

U.S. Appl. No. 10/107,066, filed Mar. 28, 2002, to Hattori et al.
Salton, Gerard et al.: "Automatic Structuring And Retrieving of Large Text Files", Feb. 1994, Communications of the ACM, vol. 37, No. 2, p. 97-108.

* cited by examiner

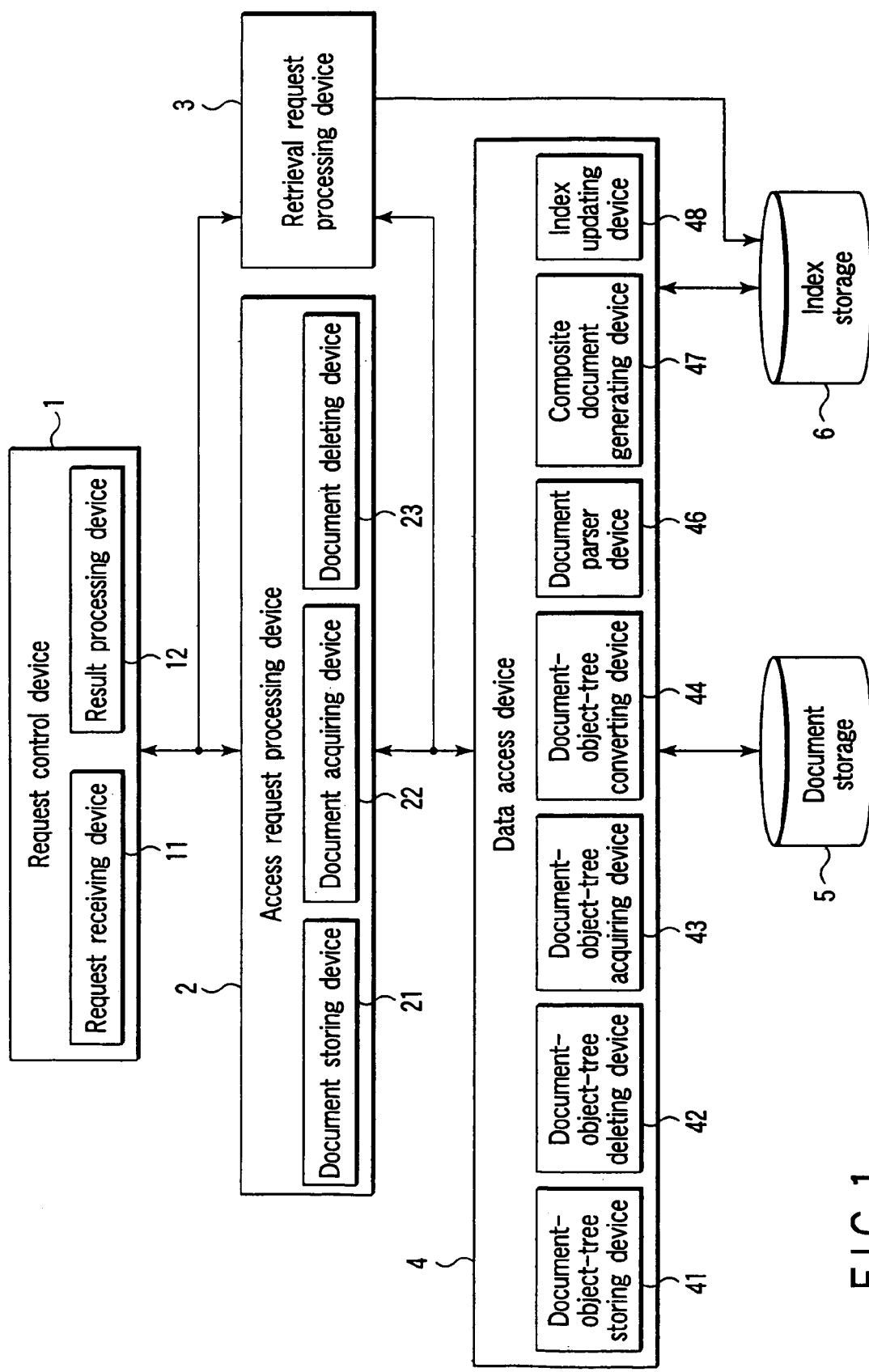
F I G. 1

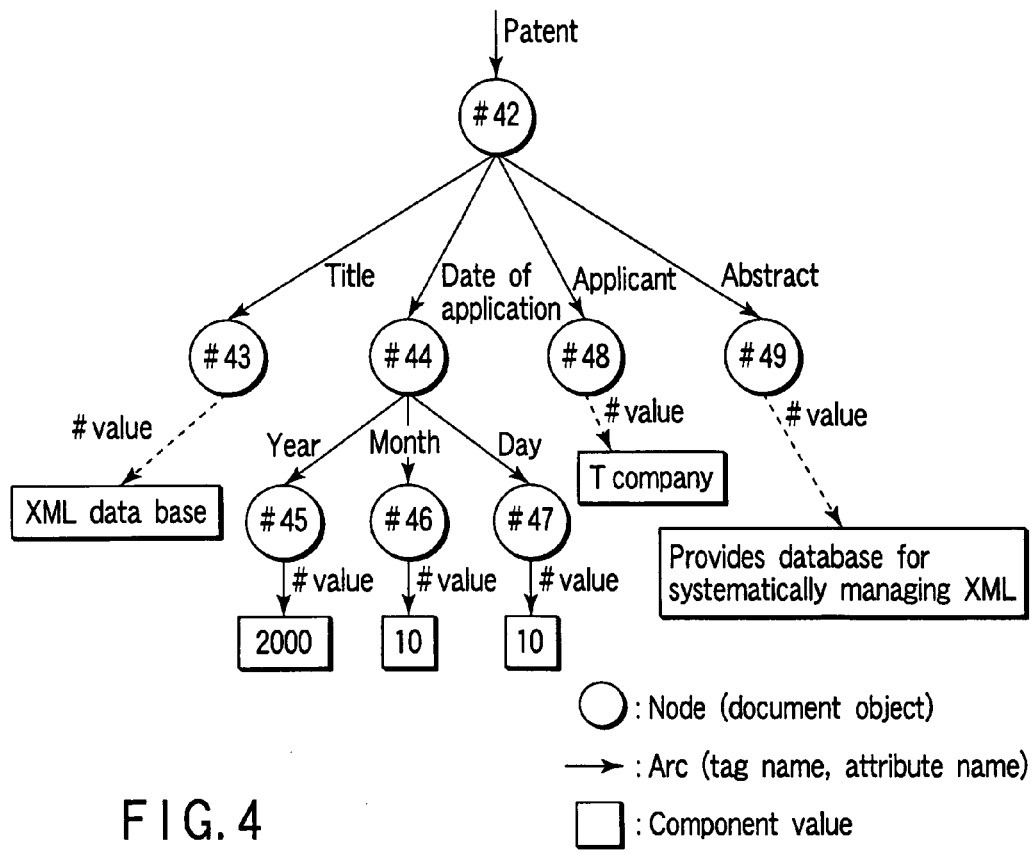
FIG. 4
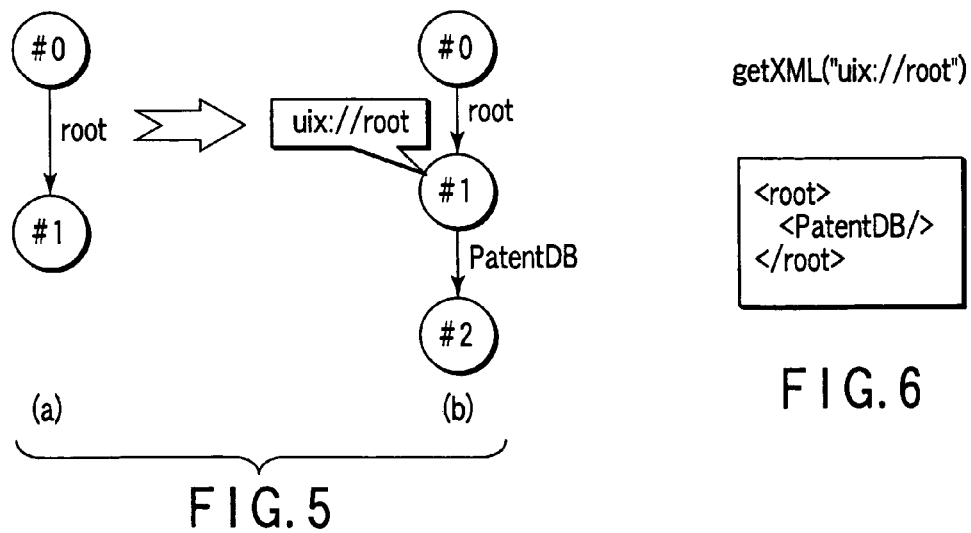
FIG. 5
FIG. 6 getXML("uix://root/PatentDB")

```
<PatentDB>
  <Patent>
    <Title>XML data base</Title>
    <Date of application><Year>2000</Year><Month>10</Month>
      <Day>10</Day></Date of application>
    <Applicant>T company</Applicant>
    <Abstract>Provides database for systematically managing XML
      </Abstract>
  </Patent>
  <Patent>
    ...
  </Patent>
  <Patent>
    ...
  </Patent>
</PatentDB>
```

FIG. 11

```
<Schema>
  <ElementType name="Patent" content="eltOnly">
    <group order="seq">
      <element type="Title"/>
      <element type="Date of application"/>
      <element type="Applicant"/>
      <element type="Abstract"/>
    </group>
  </ElementType>
  <ElementType name="Title"content="textOnly"/>
  <ElementType name="Applicant"content="textOnly"/>
  <ElementType name="Abstract"content="textOnly"/>
  <ElementType name="Year"content="textOnly"/>
  <ElementType name="Month"content="textOnly"/>
  <ElementType name="Day"content="textOnly"/>
  <ElementType name="Date of application"content="eltOnly"/>
    <group order="seq">
      <element type="Year"/>
      <element type="Month"/>
      <element type="Day"/>
    </group>
  </ElementType>
</Schema>
```

FIG. 12

```
<Concept name="Information model">
  <Concept name="Document">
    <Concept name="Structured document">
      <Concept name="XML"/>
      <Concept name="SGML"/>
    </Concept>
    <Concept name="Non structured document">
      <Concept name="Text"/>
    </Concept>
  </Concept>
  <Concept name="Relation">
   . . . . . . . . .
  </Concept>
  <Concept name="Object">
   . . . . . . . . .
  </Concept>
</Concept>
```

FIG. 16

```
<Concept name="Information manipulation">
  <Concept name="Retrieval"/>
  <Concept name="Storage"/>
  <Concept name="Processing"/>
  <Concept name="Distribution">
</Concept>
```

FIG. 17

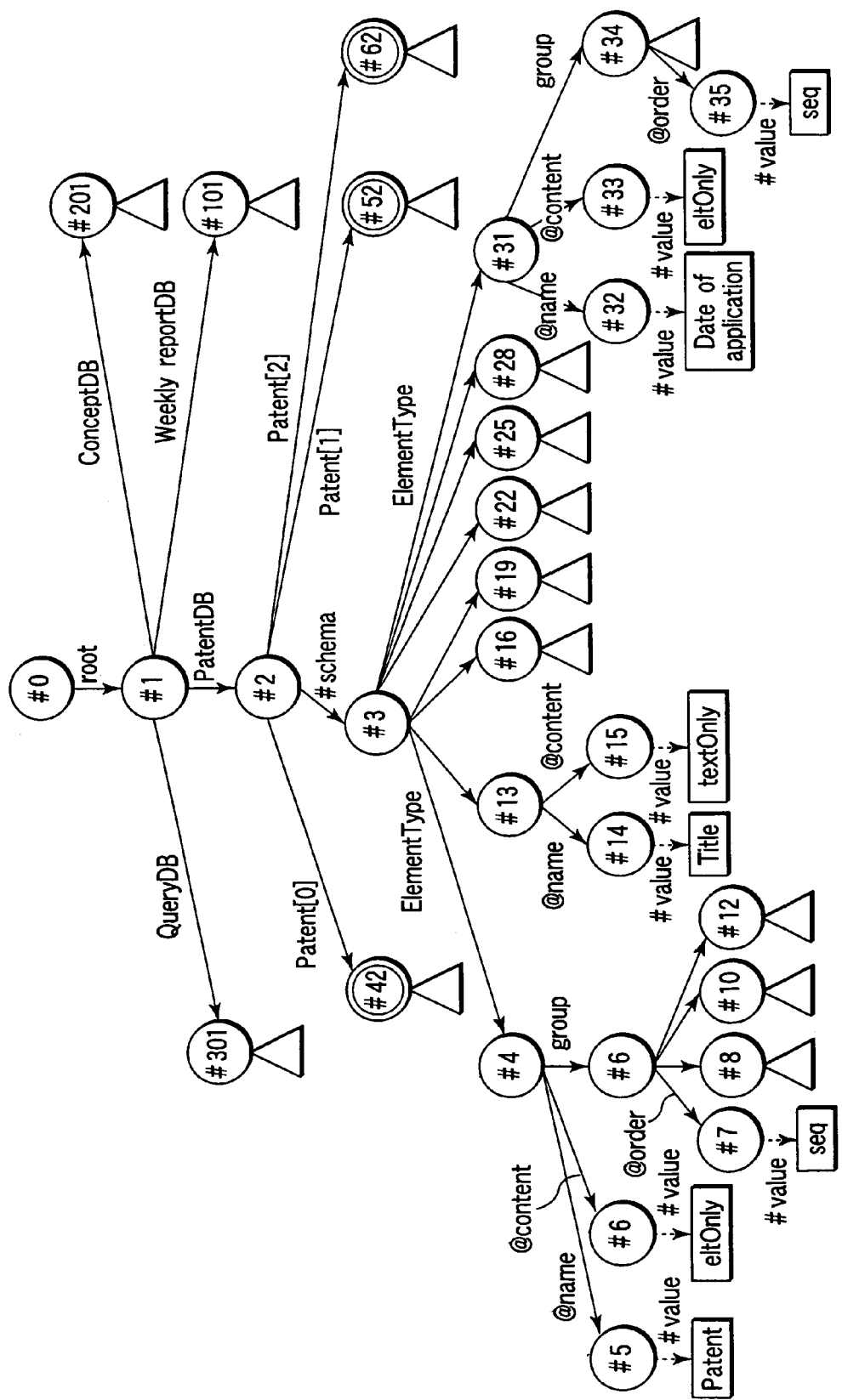
F I G. 18

Temporary file A
tmp000.xml

```
<Patent xmlns="x-schema:tmp001.xml">
  <Title>XML data base</Title>
  <Date of application><Year>2000</Year><Month>10</Month>
    <Day>10</Day></Date of application>
  <Applicant>T company</Applicant>
  <Abstract>Provides database for systematically managing XML
    </Abstract>
  <A>Data</A>
</Patent>
```

FIG. 22

Temporary file B
tmp001.xml

```
<Schema>
  <ElementType name="Patent" content="eltOnly">
    <group order="seq">
      <element type="Title"/>
      <element type="Date of application"/>
      <element type="Applicant"/>
      <element type="Abstract"/>
    </group>
  </ElementType>
  <ElementType name="Title"content="textOnly"/>
  <ElementType name="Applicant"content="textOnly"/>
  <ElementType name="Abstract"content="textOnly"/>
  <ElementType name="Year"content="textOnly"/>
  <ElementType name="Month"content="textOnly"/>
  <ElementType name="Day"content="textOnly"/>
  <ElementType name="Date of application"content="eltOnly"/>
    <group order="seq">
      <element type="Year"/>
      <element type="Month"/>
      <element type="Day"/>
    </group>
  </ElementType>
</Schema>
```

FIG. 23

Temporary file A
tmp000.xml

```
<Patent xmlns="x-schema:tmp001.xml">
  <Title>XML data base</Title>
  <Date of application><Year>2000</Year><Month>10</Month>
    <Day>10</Day></Date of application>
  <Applicant>T company</Applicant>
  <Abstract>Provides database for systematically managing XML
    </Abstract>
</Patent>
```

FIG. 24

Temporary file B
tmp001.xml

```
<Schema>
  <ElementType name="Patent" content="eltOnly">
    <group order="seq">
      <element type="Title"/>
      <element type="Date of application"/>
      <element type="Applicant"/>
      <element type="Abstract"/>
    </group>
  </ElementType>
  <ElementType name="Title"content="textOnly"/>
  <ElementType name="Applicant"content="textOnly"/>
  <ElementType name="Abstract"content="textOnly"/>
  <ElementType name="Year"content="textOnly"/>
  <ElementType name="Month"content="textOnly"/>
  <ElementType name="Day"content="textOnly"/>
  <ElementType name="Date of application"content="eltOnly"/>
    <group order="seq">
      <element type="Year"/>
      <element type="Month"/>
      <element type="Day"/>
    </group>
  </ElementType>
</Schema>
```

FIG. 25

Temporary file A
tmp000.xml

```
<Patent xmlns="x-schema:tmp001.xml">
  <Title>XML data base</Title>
  <Applicant>T company</Applicant>
  <Abstract>Provides database for systematically managing XML
    </Abstract>
</Patent>
```

FIG. 29

Temporary file B
tmp001.xml

```
<Schema>
  <ElementType name="Patent" content="eltOnly">
    <group order="seq">
      <element type="Title"/>
      <element type="Date of application"/>
      <element type="Applicant"/>
      <element type="Abstract"/>
    </group>
  </ElementType>
  <ElementType name="Title"content="textOnly"/>
  <ElementType name="Applicant"content="textOnly"/>
  <ElementType name="Abstract"content="textOnly"/>
  <ElementType name="Year"content="textOnly"/>
  <ElementType name="Month"content="textOnly"/>
  <ElementType name="Day"content="textOnly"/>
  <ElementType name="Date of application"content="eltOnly"/>
    <group order="seq">
      <element type="Year"/>
      <element type="Month"/>
      <element type="Day"/>
    </group>
  </ElementType>
</Schema>
```

FIG. 30

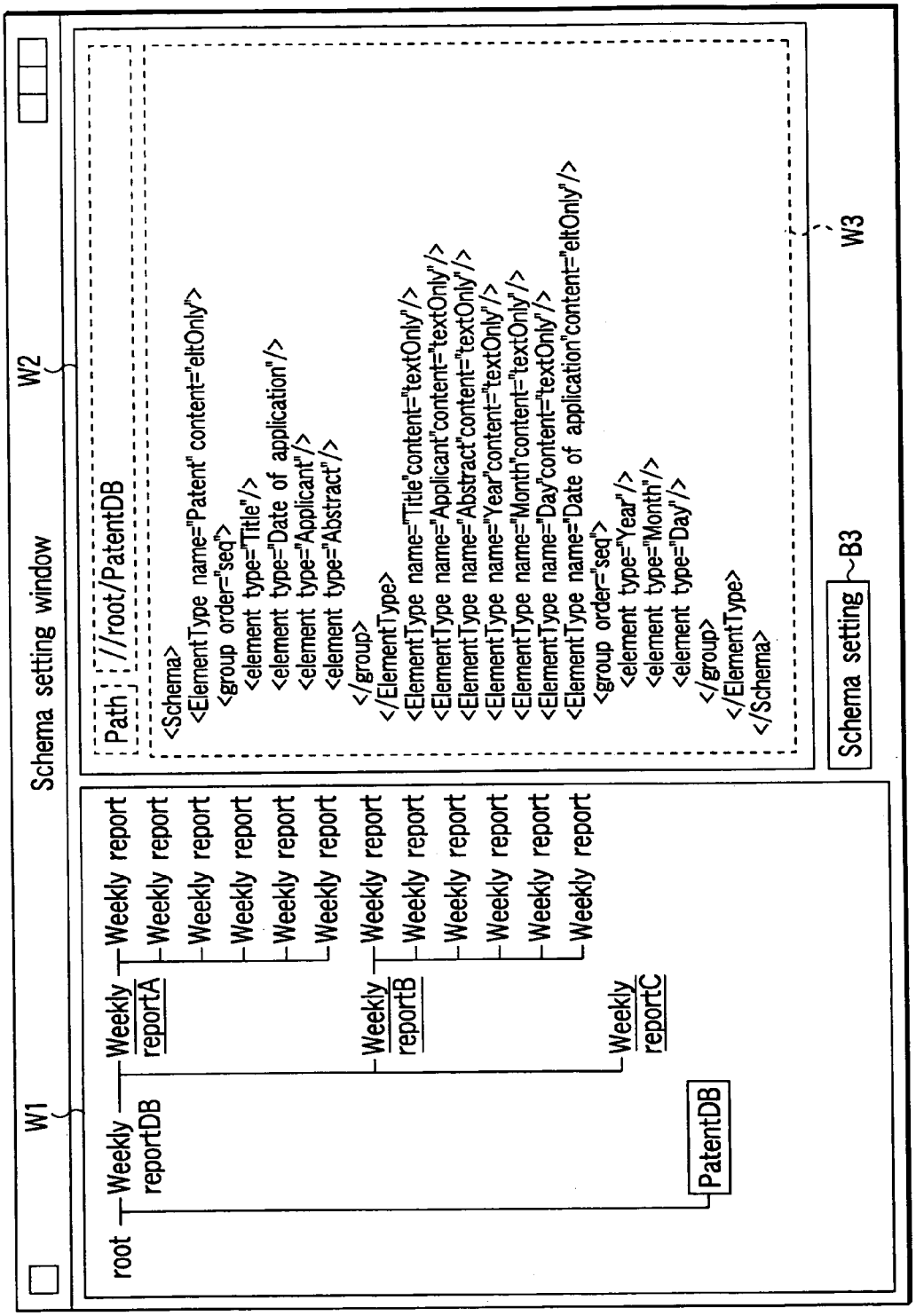
F I G. 37

```
<kf:query>
    <kf:select>
    Output format description field
    </kf:select>
    <kf:from>
    XML data bind description field
    </kf:from>
    <kf:where>
    Condition description field
    </kf:where>
</kf:query>
```

FIG. 39

Query for plain retrieval

```
<query>
 <kf:query>
    <kf:select>
       <result>
          <Title>$t</Title>
       </result>
    </kf:select>
    <kf:from path="/uix://root/PatentDB">
       <PatentDB>
          <Patent>
             <Title>$t</Title>
             <kf:star><Year>$y</Year></kf:star>
             <Abstract>$s</Abstract>
          </Patent>
       <PatentDB>
    </kf:from>
    <kf:where>
       <kf:cmp op="EQ" param1=$y" param2="1999"/>
       <kf:eval exp="MyLike($s,'PC')"/>
    </kf:where>
 </kf:query>
</query>
```

FIG. 40

```
<out>
  <result>
   <Title>Schema generating device</Title>
  <result>
  <result>
   <Title>Semi-structured data storage system</Title>
  <result>
  <result>
   <Title>Natural language retrieval device</Title>
  <result>
  <result>
   <Title>Data management system</Title>
  <result>
   ...
</out>
```

FIG. 41

Query for conceptual retrieval

```
<query>
 <kf:query>
    <kf:select>
       <result>
          <Title>$t</Title>
       </result>
    </kf:select>
    <kf:from path="/uix://root/PatentDB">
       <PatentDB>
          <Patent>
             <Title>$t</Title>
             <keywords>$k</keywords>
          </Patent>
       </PatentDB>
    </kf:from>
    <kf:from path="/uix://root/ConceptDB">
      <Concept name="Peripheral">
         <Concept name="$x"/>
      </Concept>
    </kf:from>
    <kf:where>
      <kf:or>
         <kf:cmp op="EQ" param1="$k" param2="Peripheral"/>
         <kf:cmp op="EQ" param1="$k" param2="$x"/>
      </kf:or>
    </kf:where>
 </kf:query>
<query>
```

FIG. 42

```
<query>
 <kf:query xmlns:kf="">
  <kf:select>
   <result>$u</result>
  </kf:select>
  <kf:from path="uix://root">
   <kf:star>
    <kf:dot><xq:as tagName="$e"path="$u">
     <kf:star>
      <Title>$t</Title>
     </kf:star>
     <kf:star>
      <Year>$y</Year>
     </kf:star>
    </kf:dot>
   </kf:star>
  <kf:from>
  <kf:where>
   <kf:cmp op1="member" op2="$e" op3="Patent"/>
   <kf:cmp op1="like" op2="$t" op3="Document"/>
   <kf:cmp op1=">=" op2="$y" op3="1998"/>
  </kf:where>
 </kf:query>
</query>
```

FIG. 45

```
<query>
 <kf:query xmlns:kf="">
  <kf:select>
   <result>$u</result>
  </kf:select>
  <kf:from path="uix://root">
   <kf:star>
    <Schema><kf:as path="$u"/>
     <ElementType name="$a1">
     </ElementType>
     <ElementType name="$a2">
     </ElementType>
    </Schema>
   </kf:star>
  </kf:from>
  <kf:where>
   <kf:cmp op1="like" op2="$a1" op3="Patent"/>
   <kf:cmp op1="like" op2="$a2" op3="Summary"/>
  </kf:where>
 </kf:query>
</query>
```

FIG. 48

```
<query>
  <kf:query>
    <kf:select>
      <result>
         <kf:as>$elt</kf:as>
      </result>
    </kf:select>
    <kf:from path="uix://root/QueryDB">
      <query>
         <from>
            <PatentDB/>
         <from>
         <kf:as>$elt</kf:as>
      <query>
    </kf:from>
  </kf:query>
</query>
```

FIG. 49

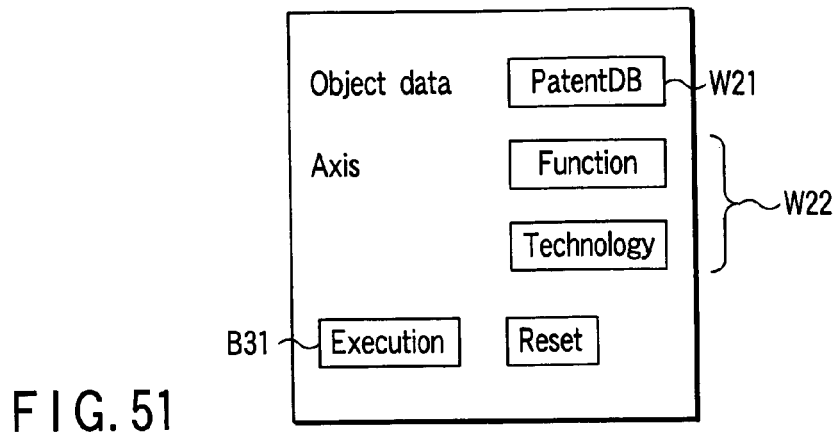

FIG. 51

```
<query>
 <kf:query xmlns:kf="" vars="$p$q">
  <kf:select>
    <data x="$x" y=$y" z=$z"/>
  <kf:select>
  <kf:from path="uix://root/PatentDB">
    <Patent>
      <KOKAI pub. No.>$z</KOKAI pub. No.>
      <kf:star>$key1</kf:star>
      <kf:star>$key2</kf:star>
    </Patent>
  </kf:from>
  <kf:from path="uix://root/ConceptDB/$p">
    <Concept name="$x">
      <kf:star>
        <Concept name="$key1"/>
      </kf:ster>
    </Concept>
  <kf:from>
  <kf:from path="uix://root/ConceptDB/$q">
    <Concept name="$y">
      <kf:star>
        <Concept name="$key2"/>
      </kf:star>
    </Concept>
  </kf:from>
  <kf:query>
</query>
```

FIG. 52

```
<result>
    <data x="Retrieval" y="Implemented database" z="KOKAI pub. No.11-12345"/>
    <data x="Retrieval" y="Implemented database" z="KOKAI pub. No.11-12346"/>
    <data x="Storage" y="Implemented database" z="KOKAI pub. No.11-34567"/>
    <data x="Analysis support" y="Implemented database" z="KOKAI pub. No.11-45678"/>
    <data x="Retrieval" y="Semi-structured database" z="KOKAI pub. No.11-23456"/>
    <data x="Storage" y="Semi-structured database" z="KOKAI pub. No.11-23457"/>
    <data x="Storage" y="Natural language process" z="KOKAI pub. No.11-55678"/>
<result>
```

F I G. 53

| Function / Technology | Retrieval | Storage | Analysis support |
|---|---|---|---|
| Implemented database | KOKAI pub. No.11-12345<br>KOKAI pub. No.11-12346 | KOKAI pub. No.11-34567 | KOKAI pub. No.11-45678 |
| Semi-structured database | KOKAI pub. No.11-23456 | KOKAI pub. No.11-23457 | |
| Natural language process | | KOKAI pub. No.11-55678 | |

F I G. 54

```
<Paper>
    <Reporting number>R0001</Reporting number>
    <Reporting date>
        <Year>2000</Year>
        <Month>5</Month>
        <Day>17</Day>
    </Reporting date>
    <Title>XML database</Title>
    <Reporter list>
        <Reporter>
            <Affiliation>Stady department</Affiliation>
            <Name>Hanako Tanaka</Name>
        </Reporter>
        <Reporter>
            <Affiliation>Development department</Affiliation>
            <Name>Taro Suzuki</Name>
        </Reporter>
    </Reporter list>
    <Summary>Implement storage and retrieval functions of XML data using
            semi-structured model.</Summary>
        <Keywords>
        <Keyword>XML</Keyword>
        <Keyword>Database technology</Keyword>
        <Keyword>Document storage</Keyword>
        <Keyword>Tag retrieval</Keyword>
    </Keywords>
</Paper>
```

FIG. 56

```
<Concept tree>
  <Concept name="Function">
    <Concept name="Storage function">
      <Concept name="Document storage function">
        <Concept name="Document storage"/>
      </Concept>
      <Concept name="Table storage function">
        <Concept name="Table storage"/>
      </Concept>
    </Concept>
    <Concept name="Retrieval function">
      <Concept name="Keyword retrieval function">
        <Concept name="Keyword retrieval"/>
        <Concept name="Full-text retrieval"/>
      </Concept>
      <Concept name="Tag retrieval function">
        <Concept name="Tag retrieval"/>
      </Concept>
      <Concept name="Image retrieval function">
        <Concept name="Image retrieval"/>
      </Concept>
      <Concept name="Ambiguous retrieval function">
        <Concept name="Thesaurus retrieval"/>
        <Concept name="Similarity object retrieval"/>
      </Concept>
    </Concept>
  </Concept>
  <Concept name="Technology">
    <Concept name="Database technology"/>
    <Concept name="Natural language technology"/>
    <Concept name="Knowledge process technology"/>
  </Concept>
</Concept tree>
```

FIG. 57

```
<Query vars="$tag1 $category1 $tag2 $category2">
  <head>
    <XTAG>$tag1</XTAG>
    <XVAL>$category1</XVAL>
    <YTAG>$tag2</YTAG>
    <YVAL>$category2</YVAL>
    <QID1>Qid0</QID1>
    <QID2>Qid1</QID2>
  </head>
</kf:query xmlns:kf="">
  <kf:select>
    <result>
      <X>$sub1</X>
      <Y>$sub2</Y>
      <Count>$cnt0</Count>
    </result>
  </kf:select>
  </kf:from path="uix://root/Papers">
    <Paper>
      <$tag1>$keyword1</$tag1>
      <$tag2>$keyword2</$tag2>
    </Paper>
  </kf:from>
  <kf:from path="uix://root/Concept tree">
    <kf:star><Concept name="$category1">
      <Concept name="$sub1">
        <kf:star><Concept name="$keyword1"/></kf:star>
      </Concept></kf:star>
  </kf:from>
  <kf:from path="uix://root/Concept tree">
    <kf:star><Concept name="$category2">
      <Concept name="$sub2">
        <kf:star><Concept name="$keyword2"/></kf:star>
      </Concept></kf:star>
  </kf:from>
  </kf:groupBy vars="$sub1 $sub2"/>
</kf:query>
</Query>
```

FIG. 60

```
<Result>
    <head>
        <XTAG>Keywords/keyword</XTAG>
        <XVAL>Function</XVAL>
        <YTAG>Keywords/keyword</YTAG>
        <YVAL>Technology</YVAL>
        <QID1>Qid0</QID1>
        <QID2>Qid1</QID2>
    </head>>
    <result>
        <X>Storage function</X>
        <Y>Database technology</Y>
        <Count>5</Count>
    </result>
    ...(Repetition of result)...
</Result>
```

FIG. 61

| Query ID | Style ID |
|---|---|
| Qid0 | Sid0 |
| Qid1 | Sid1 |
| Qid2 | Sid2 |
| Qid3 | Sid3 |

FIG. 62

Function

| | Storage function | Retrieval function |
|---|---|---|
| Database technology | 5 | 4 |
| Natural language technology | 2 | 8 |
| Knowledge process technology | 1 | 2 |

Technology

FIG. 63

| (1,1) | (2,1) | (3,1) |
|---|---|---|
| (1,2) | (2,2) | (3,2) |
| (1,3) | (2,3) | (3,3) |
| (1,4) | (2,4) | (3,4) |

FIG. 64

| | Qid0, keywords/keyword, storage function, keywords/keyword, technology | Qid0, keywords/keyword, retrieval function, keywords/keyword, technology |
|---|---|---|
| Qid0, keywords/keyword, function, keywords/keyword, technology | Qid1, keywords/keyword, storage function, keywords/keyword, Database technology | Qid1, keywords/keyword, retrieval function, keywords/keyword, Database technology |
| Qid0, keywords/keyword, function, keywords/keyword, natural language technology | Qid1, keywords/keyword, storage function, keywords/keyword, natural language technology | Qid1, keywords/keyword, storage function, keywords/keyword, natural language technology |
| Qid0, keywords/keyword, function, keywords/keyword, knowledge process technology | Qid1, keywords/keyword, storage function, keywords/keyword, knowledge process technology | Qid1, keywords/keyword, retrieval function, keywords/keyword, knowledge process technology |

(Query ID, parameter1 (Tag name), parameter2 (Component value), parameter3 (Tag name), parameter4 (Component value))

FIG. 65

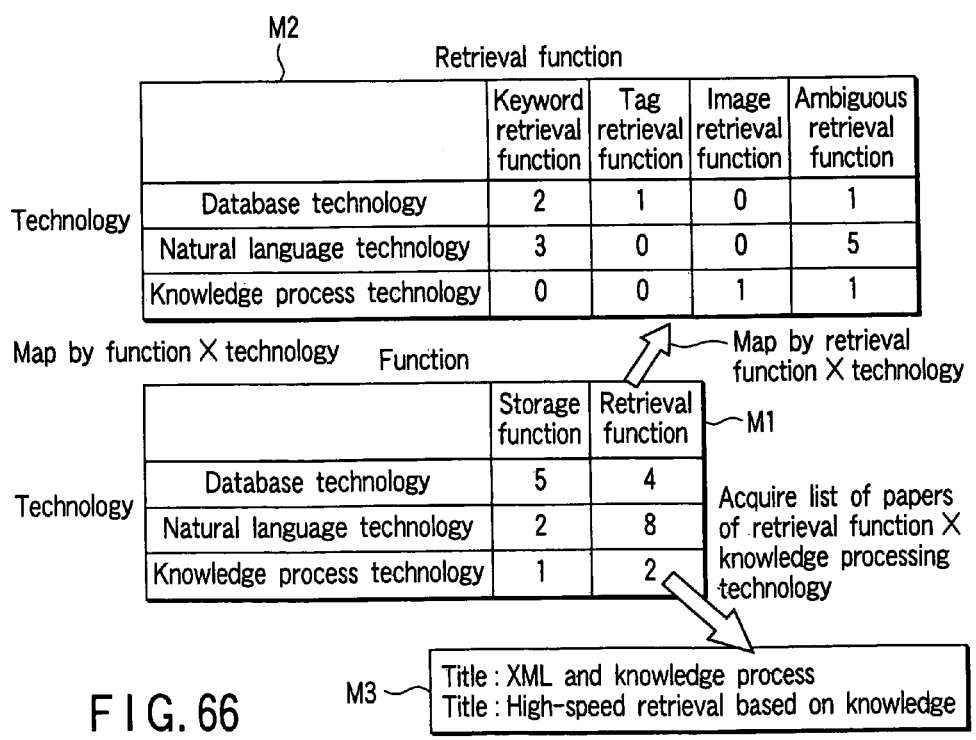

FIG. 66

```
<Result>
    <head>
        <XTAG>Keywords/keyword</XTAG>
        <XVAL>Function</XVAL>
        <YTAG>Keywords/keyword</YTAG>
        <YVAL>Technology</YVAL>
        <QID1>Qid0</QID1>
        <QID2>Qid1</QID2>
    </head>>
    <result>
        <X>Keyword retrieval function</X>
        <Y>Database technology</Y>
        <Count>2</Count>
    </result>
    ...(Repetition of result)...
</Result>
```

FIG. 67

| (1,1) | (2,1) | (3,1) | (4,1) | (5,1) |
| --- | --- | --- | --- | --- |
| (1,2) | (2,2) | (3,2) | (4,2) | (5,2) |
| (1,3) | (2,3) | (3,3) | (4,3) | (5,3) |
| (1,4) | (2,4) | (3,4) | (4,4) | (5,4) |

FIG. 68

```
<Query vars="$tag1 $tag2 $category1 $category2">
  <head>
    <XTAG>$tag1</XTAG>
    <XVAL>$category1</XVAL>
    <YTAG>$tag2</YTAG>
    <YVAL>$category2</YVAL>
  </head>>
</kf:query xmlns:kf="">
  <kf:select>
    <result>$elt</result>
  </kf:select>
  <kf:from path="uix://root/Papers">
    <Paper>
      <kf:as>$elt</kf:as>
      <$tag1>$keyword1</$tag1>
      <$tag2>$keyword2</$tag2>
    </Paper>
  </kf:from>
  <kf:from path="uix://root/Concept tree">
    <kf:star><Concept name="$category1">
      <kf:star><Concept name="$keyword1"/></kf:star>
    </Concept></kf:star>
  </kf:from>
  <kf:from path="uix://root/Concept tree">
    <kf:star><Concept name="$category2">
      <kf:star><Concept name="$keyword2"/></kf:star>
    </Concept></kf:star>
  </kf:from>
  <kf:groupBy vars="$elt"/>
</kf:query>
</Query>

Query Qid1 (uix://root/Queries/Query[1])
```

FIG. 69

APPARATUS, METHOD, AND PROGRAM FOR RETRIEVING STRUCTURED DOCUMENTS

CROSS-REFERENCE TO RELATED APPLICATIONS

This is a division of application Ser. No. 10/107,584 filed Mar. 28, 2002, now U.S. Pat. No. 7,080,067 all of which is expressly incorporated herein by reference.

This application is based upon and claims the benefit of priority from the prior Japanese Patent Application No. 2001-098181, filed Mar. 30, 2001, the entire contents of which are incorporated herein by reference.

BACKGROUND OF THE INVENTION

1. Field of the Invention

The present invention relates to an apparatus and method for retrieving a desired structured document from a structured document database having a hierarchical logical structure which stores a plurality of structured documents having different document structures.

2. Description of the Related Art

Nowadays, along with the advance of IT (information technology), a huge volume of information can be easily acquired. On the other hand, required information is buried in a large volume of information, and cannot be fully utilized. Even when a large volume of information is present, there is no significance in it unless it can be used efficiently.

Hence, an activity that accumulates data, which are important for corporate management, of know-how and job data possessed by specific persons and departments, and utilize them as "management resources", i.e., knowledge management, has been proposed.

For example, some documents such as patent specifications, weekly reports, and the like have predetermined formats, and are standardized to these formats. In addition to such documents which are standardized to given formats, many documents with free formats are also present.

Hence, in order to realize knowledge management, a database which can store and manage both documents with predetermined document structures, and other documents with free formats is required.

XML (Extensible Markup Language) is expected to be the core technology of the next-generation knowledge management.

An XML document is data having a tree structure. An XML database that stores and manages XML documents has a tree-like hierarchical data structure that manages components of a plurality of structured documents to be managed as those which form a document structure of one, giant structured document. That is, the XML database stores XML documents as one tree-like, giant XML document. Each component on this hierarchical structure can be specified by a "pass". The pass is a means for indicating a specific area (location) on the XML database. Using this pass, a partial XML document can be accessed from the XML database.

The document structure of an XML document stored in the XML database need not always be defined by a schema. If the schema is defined, only one schema per database is allowed. That is, if no schema is used, documents with different document structures can be stored and managed together. However, if one schema is set, documents with document structures different from that defined by the schema cannot be stored together.

Jpn. Pat. Appln. KOKAI Publication No. 7-56786 "structured document management apparatus" has proposed a method that sets one schema in an XML database, and stores and manages only documents that match the set schema.

On the other hand, a technique called OLAP (Online Analytical Processing) is known. This is an analytical application which allows an end user to directly retrieve and aggregate data in a database so as to find out problems and solutions. With this technique, for example, a huge volume of sales information for respective shops can be analyzed while being instantaneously switched across various dimensions such as products, areas, years, and the like.

As a database to which OLAP is applied, a multi-dimensional database that can switch a plurality of attribute items (dimensions) in turn and can retrieve and calculate data has received a lot of attention. Upon selecting two arbitrary attribute items, data is immediately displayed in a two-dimensional table format (map).

However, the multi-dimensional database must manage a large volume of data, since aggregated results corresponding to all combinations of attribute items are prepared in advance. Also, since this database has a unique data structure, dedicated client software is required.

By contrast, a relational database (RDB) manages normalized data using a two-dimensional table format, and generates one table of an aggregated result by combining a plurality of tables required for analysis. Since data are coupled every time the viewpoint changes, a long response time is required.

In order to store and manage a huge number of structured documents of different document structures on a database, when a specific document structure is predetermined for a specific type of documents, it is convenient to standardize all documents of such type to an identical document structure for the purpose of data manipulations such as retrieval and the like.

However, there is no conventional XML database which can store and manage documents of different document structures while maintaining consistency of document structures corresponding to different document types. That is, the conventional XML database can store and manage documents that match one schema, but cannot store and manage documents corresponding to a plurality of different schemas together with documents which do not correspond to any schemas.

A plurality of databases which correspond to a plurality of schemas may be prepared. In this case, if the schema is different, the database to be accessed is different. For this reason, access to a huge number of documents with various document structures cannot be uniformly made, and it is difficult to retrieve and extract a related information group from a huge number of pieces of various kinds of information.

As described above, conventionally, since documents having various document structures defined in advance in correspondence with the types of documents cannot be simultaneously managed together with structured documents which have no document structure, it is impossible to retrieve and extract a related information group from a huge volume of various kinds of information by uniform access to various document structures irrespective of a specific document structure.

Hence, conventionally, it is difficult to easily implement OLAP that displays the retrieved and aggregated results of data from a huge number of structured documents having various document structures, while switching a plurality of attribute items (dimensions) in turn.

Once the attribute item has changed to change the analytical viewpoint, retrieval/aggregation operations must be redone by re-setting the attribute item in a retrieval condition. Since such process is required, it is not easy to switch the display window for displaying the retrieved/aggregated result using an attribute item set based on a given viewpoint to that from another viewpoint.

In this manner, in order to implement OLAP, every time the analytical viewpoint changes, the display window of the data retrieved/aggregated result using the changed attribute item must be switched, but it is not easy to attain such window transition that involves retrieval and aggregation processes.

BRIEF SUMMARY OF THE INVENTION

It is an object of the present invention to provide a method, apparatus, and computer program which can easily retrieve structured documents for implementing OLAP (window transition which involves retrieving can be easily made), in a structured document database which stores and manages structured documents having various document structure, and allow easy data analysis from various viewpoints.

According to a first aspect of the present invention, there is provided a method for retrieving structured documents from a structured-documents-database having a hierarchical structure and storing a plurality of structured documents each having a document structure and a plurality of first data items, each of the document structures being constructed by a plurality of components, each of the component constructing the hierarchical structure, and each of the first data items being stored in the structured-documents-database as a value included in one of the components, the method comprising: receiving a first group of a first desired component, a second desired component, a first desired concept item and a second desired concept item, the first desired concept item having a plurality of first concept items classified hierarchically and subordinated to the first desired concept item, and the second desired concept item having a plurality of second concept items classified hierarchically and subordinated to the second desired concept item; retrieving from the structured-documents-database, a plurality of first structured documents each including the first desired component including a value in which one of the first concept items is included and the second desired component including a value in which one of the second concept items is included, based on the first group, to obtain a plurality of first retrieval results each associated with one of a plurality of first items classified as classified first concept items immediately lower than the first desired concept item and one of a plurality of second items classified as classified second concept items immediately lower than the second desired concept item; generating a table for displaying the first retrieval results, the table being constructed by a plurality of cells arranged two-dimensionally, the cells including a plurality of column index cells and a plurality of row index cells and a plurality of data cells, the column index cells in which a plurality of column indexes are set respectively, the row index cells in which a plurality of row indexes are set respectively, and the data cells in which a plurality of second data items are set respectively, by setting the first items at the column index cells as the column indexes respectively, setting the second items at row index cells as the row indexes respectively, and setting the first retrieval results at the data cells as the second data items respectively based on the one of the first items and the one of the second items which are associated with each of the first retrieval results; associating a plurality of second groups of the first desired component, the second desired component, one of the first items, and the desired second concept item with the column index cells of the table respectively; displaying the table on a display; designating an area where one of the. column index cells is displayed, to obtain a designated area; acquiring one of the second groups associated with the designated area, to obtain acquired second group; retrieving from the structured-documents-database based on the acquired second group, a plurality of second structured documents each including the first desired component including a value in which one of the first concept items subordinated to the one of the first item is included and the second desired component including a value in which one of the second concept items is included, to obtain a plurality of second retrieval results each associated with one of a plurality of third items classified as first concept items immediately lower than the one of the first item and one of the second items; and, displaying the second retrieval results on the display.

According to a second aspect of the present invention, there is provided a method for retrieving structured documents from a structured-documents-database having a hierarchical structure and storing a plurality of structured documents each having a document structure and a plurality of first data items, each of the document structures being constructed by a plurality of components, each of the component constructing the hierarchical structure, and each of the first data items being stored in the structured-documents-database as a value included in one of the components, the method comprising: receiving a first group of a first desired component, a second desired component, a first desired concept item and a second desired concept item, the first desired concept item having a plurality of first concept items classified hierarchically and subordinated to the first desired concept item, and the second desired concept item having a plurality of second concept items classified hierarchically and subordinated to the second desired concept item; generating a first retrieval condition for retrieving a plurality of first structured documents each including the first desired component including a value in which one of the first concept items is included and the second desired component including a value in which one of the second concept items is included, based on the first group; retrieving the first structured documents from the structured-documents-database, based on the first retrieval condition, to obtain a plurality of first retrieval results each associated with one of a plurality of first items classified as first concept items immediately lower than the first desired concept item and one of a plurality of second items classified as second concept items immediately lower than the second desired concept item; generating a first table for displaying the first retrieval results, by using a table which constructed by a plurality of cells. arranged two-dimensionally, the cells including a plurality of column index cells and a plurality of row index cells and a plurality of data cells, the column index cells in which a plurality of column indexes are set respectively, the row index cells in which a plurality of row indexes are set respectively, and the data cells in which a plurality of second data items are set respectively, setting the first items at the column index cells as the column indexes respectively, setting the second items at row index cells as the row indexes respectively, and setting the first retrieval results at the data cells as the second data items respectively based on the one of the first items and the one of the second items which are associated with each of the first retrieval results; associating a plurality of second groups of the first desired component, the second desired component, one of the first items, and the desired second concept item with the column index cells of the first table, respectively; displaying the first table on a display; designating an area where one of the column index cells is displayed, to obtain a first designated area; acquiring one of the second groups associated with the first designated area, to obtain acquired second group; generating a second retrieval condition for retrieving, a plurality of second structured documents each including the first desired component including a value in which one of the first concept items subordinated to the one of the first item is included and the second desired component including a value in which one of the second concept items are included, based on the acquired second group; retrieving a plurality of second structured documents from the structured-documents-database, based on the second retrieval condition, to obtain a plurality of second retrieval results each associated with one of a plurality of third items classified as first concept items immediately lower than the one of the first item and one of the second items; generating a second table for displaying the second retrieval result, by using the table, setting the third items at the column index cells as the column indexes respectively, setting the second items at row index cells as the row indexes respectively, and setting the second retrieval results at the data cells as the second data items respectively based on one of the third items and one of the second items which are associated with each of the second retrieval results; and, displaying the second table on the display.

According to a third aspect of the present invention, there is provided a computer program stored on a computer readable medium, and instructing the computer to retrieve structured documents from a structured-documents-database having a hierarchical structure and storing a plurality of structured documents each having a document structure and a plurality of data items, each of the document structures being constructed by a plurality of components, each of the component constructing the hierarchical structure, and each of the data items being stored in the structured-documents-database as a value included in one of the components, the computer program comprising: first program instruction means for instructing a computer processor to receive a first group of a first desired component, a second desired component, a first desired concept item and a second desired concept item, the first desired concept item having a plurality of first concept items classified hierarchically and subordinated to the first desired concept item, and the second desired concept item having a plurality of second concept items classified hierarchically and subordinated to the second desired concept item; second program instruction means for instructing a computer processor to retrieve from the structured-documents-database, a plurality of first structured documents each including the first desired component including a value in which one of the first concept items is included and the second desired component including a value in which one of the second concept items is included, based on the first group, to obtain a plurality of first retrieval results each associated with one of a plurality of first items classified as first concept items immediately lower than the first desired concept item and one of a plurality of second items classified as second concept items immediately lower than the second desired concept item; third program instruction means for instructing a computer processor to generate a table for displaying the first retrieval results, the table being constructed by a plurality of cells arranged two-dimensionally, the cells including a plurality of column index cells and a plurality of row index cells and a plurality of data cells, the column index cells in which a plurality of column indexes are set respectively, the row index cells in which a plurality of row indexes are set respectively, and the data cells in which a plurality of second data items are set respectively, by setting the first items at the column index cells as the column indexes respectively, setting the second items at row index cells as the row indexes respectively, and setting the first retrieval results at the data cells as the second data items respectively based on the one of the first items and the one of the second items which are associated with each of the first retrieval results; fourth program instruction means for instructing a computer processor to associate a plurality of second groups of the first desired component, the second desired component, one of the first items, and the second desired concept item with the column index cells of the table respectively; fifth program instruction means for instructing a computer processor to display the table on a display; sixth program instruction means for instructing a computer processor to acquire a designated area on which one of the column index cells is displayed and which is designated by a pointing device; seventh program instruction means for instructing a computer processor to acquire one of the second groups associated with the designated area, to obtain acquired second group; eighth program instruction means for instructing a computer processor to retrieve from the structured-documents-database based on the acquired second group, a plurality of second structured documents each including the first desired component including a value in which one of the first concept items subordinated to the one of the first item is included and the second desired component including a value in which one of the second concept items is included, to obtain a plurality of second retrieval results each associated with one of a plurality of third items classified as the first concept items immediately lower than the one of the first item and one of the second items; and ninth program instruction means for instructing a computer processor to display second retrieval results on the display.

According to a fourth aspect of the present invention, there is provided A computer program stored on a computer readable medium, and instructing the computer to retrieve structured documents from a structured-documents-database having a hierarchical structure and storing a plurality of structured documents each having a document structure and a plurality of data items, each of the document structures being constructed by a plurality of components, each of the component constructing the hierarchical structure, and each of the data items being stored in the structured-documents-database as a value included in one of the components, the computer program comprising: first program instruction means for instructing a computer processor to receive a first group of a first desired component, a second desired component, a first desired concept item and a second desired concept item, the first desired concept item having a plurality of first concept items classified. hierarchically and subordinated to the first desired concept item, and the second desired concept item having a plurality of second concept items classified hierarchically and subordinated to the second desired concept item; second program instruction means for instructing a computer processor to generate a first retrieval condition for retrieving a plurality of first structured documents each including the first desired component including a value in which one of the first concept items is included and the second desired component including a value in which one of the second concept items is included, based on the first group; third program instruction means for instructing a computer processor to retrieve the first structured documents from the structured-documents-database, based on the first retrieval condition, to obtain a plurality of first retrieval results each associated with one of a plurality of first items classified as first concept items immediately lower than the first desired concept item and one of a plurality of second items classified as second concept items immediately lower than the second desired concept item; fourth program instruction means for instructing a computer processor to generate a first table for displaying the first retrieval results, by using a table which constructed by a plurality of cells arranged two-dimensionally, the cells including a plurality of column index cells and a plurality of row index cells and a plurality of data cells, the column index cells in which a plurality of column indexes are set respectively, the row index cells in which a plurality of row indexes are set respectively, and the data cells in which a plurality of second data items are set respectively, setting the first items at the column index cells as the column indexes respectively, setting the second items at row index cells as the row indexes respectively, and setting the first retrieval results at the data cells as the second data items respectively based on the one of the first items and the one of the second items which are associated with each of the first retrieval results; fifth program instruction means for instructing a computer processor to associate a plurality of second groups of the first desired component, the second desired component, one of the first items, and the desired second concept item with the column index cells of the first table respectively; sixth program instruction means for instructing a computer processor to display the first table on the display; seventh program instruction means for instructing a computer processor to acquired first designated area on which one of the column index cells is displayed and which is designated by a pointing device; eighth program instruction means for instructing a computer processor to acquire one of the second groups associated with the first designated area, to obtain acquired second group; ninth program instruction means for instructing a computer processor to generate a second retrieval condition for retrieving a plurality of second structured documents each including the first desired component including a value in which one of the first concept items subordinated to the one of the first item is included and the second desired component including a value in which one of the second concept items is included, based on the acquired second group; tenth program instruction means for instructing a computer processor to retrieve a plurality of second structured documents from the structured-documents-database, based on the second retrieval condition, to obtain a plurality of second retrieval results each associated with one of a plurality of third items classified as first concept items immediately lower than the one of the first item and one of the second items; eleventh program instruction means for instructing a computer processor to generate a second table for displaying the second retrieval result, by using the table, setting the third items at the column index cells as the column indexes respectively, setting the second items at row index cells as the row indexes respectively, and setting the second retrieval results at the data cells as the second data items respectively based on one of the third items and one of the second items which are associated with each of the second retrieval results; and twelfth program instruction means for instructing a computer processor to display the second table on the display.

According to a fifth aspect of the present invention, there is provided an apparatus for retrieving structured documents from a structured-documents-database having a hierarchical structure and storing a plurality of structured documents each having a document structure and a plurality of first data items, each of the document structures being constructed by a plurality of components, each of the component constructing the hierarchical structure, and each of the first data items being stored in the structured-documents-database as a value included in one of the components, the apparatus comprising: a receiver configured to receive a first group of a first desired component, a second desired component, a first desired concept item and a second desired concept item, the first desired concept item having a plurality of first concept items classified hierarchically and subordinated to the first desired concept item, and the second desired concept item having a plurality of second concept items classified hierarchically and subordinated to the second desired concept item; a first retrieving device configured to retrieve from the structured-documents-database, a plurality of first structured documents each including the first desired component including a value in which one of the first concept items is included and the second desired component including a value in which one of the second concept items is included, based on the first group, to obtain a plurality of first retrieval results each associated with one of a plurality of first items classified as first concept items immediately lower than the first desired concept item and one of a plurality of second items classified as second concept items immediately lower than the second desired concept item; a generating device configured to generate a table for displaying the first retrieval results, the table being constructed by a plurality of cells arranged two-dimensionally, the cells including a plurality of column index cells and a plurality of row index cells and a plurality of data cells, the column index cells in which a plurality of column indexes are set respectively, the row index cells in which a plurality of row indexes are set respectively, and the data cells in which a plurality of second data items are set respectively, by setting the first items at the column index cells as the column indexes respectively, setting the second items at row index cells as the row indexes respectively, and setting the first retrieval results at the data cells as the second data items respectively based on the one of the first items and the one of the second items which are associated with each of the first retrieval results; a associating device configured to associate a plurality of second groups of the first desired component, the second desired component, one of the first items, and the desired second concept item with the column index cells of the table respectively; a display configured to display the table; a designating device configured to designate an area where one of the column index cells is displayed, to obtain a designated area; a acquiring device configured to acquire one of the second groups associated with the designated area, to obtain acquired second group; a second retrieving device configured to retrieve from the structured-documents-database based on the acquired second group, a plurality of second structured documents each including the first desired component including a value in which one of the first concept items subordinated to the one of the first item is included and the second desired component including a value in which one of the second concept items is included, to obtain a plurality of second retrieval results; and wherein the display further displays the second retrieval results.

BRIEF DESCRIPTION OF THE SEVERAL VIEWS OF THE DRAWING

FIG. 1 is a block diagram showing the arrangement of a structured document management system according to an embodiment of the present invention;

FIG. 4 depicts the document structure of the structured document shown in FIG. 3;

FIG. 5 is a view for explaining an append command, i.e., a case wherein an append command is executed in an initial state of a structured document database;

FIG. 6 shows the processing result upon executing an acquire command with respect to the structured document database in the state shown in (b) of FIG. 5;

FIG. 11 shows the execution result obtained when an acquire command for extracting "patent" information below node "patent DB" is executed for the structured document database in the state shown in FIG. 8;

FIG. 12 shows an example of a schema that defines the document structure of an XML document;

FIG. 16 shows an example of a structured document which expresses a concept hierarchy used in retrieval as needed;

FIG. 17 shows an example of a structured document which expresses a concept hierarchy used in retrieval as needed;

FIG. 18 shows a case wherein a document object tree of "concept" information shown in FIGS. 16 and 17 is appended to the structured document database in the state shown in FIG. 8 by executing an append command;

FIG. 22 shows the conversion result of a document object tree of a composite document obtained by inserting a document object tree of a storage document of parameters in an append command into a document object tree acquired from the structured document database, i.e., an example of a composite document stored in temporary file A;

FIG. 23 shows an example of a schema document which is stored in temporary file B and is acquired from the structured document database;

FIG. 24 shows another example of a composite document stored in temporary file A;

FIG. 25 shows an example of a schema document which is stored in temporary file B and is acquired from the structured document database;

FIG. 29 shows still another example of a composite document stored in temporary file A, i.e., an example of a composite document generated upon executing a delete command;

FIG. 30 shows an example of a schema document which is stored in temporary file B and is acquired from the structured document database;

FIG. 37 shows a display example of a window as a user interface for setting a schema, and is a view for explaining a schema setting operation;

FIG. 39 shows an example of a query (XML document);

FIG. 40 shows an example of a query (XML document) of plain retrieval;

FIG. 41 shows a retrieval result (XML document) using the query of plain retrieval shown in FIG. 40;

FIG. 42 shows an example of a query (XML document) of conceptual retrieval;

FIG. 45 shows a query generated based on information input on the window shown in FIG. 44;

FIG. 48 shows an example of a query of schema retrieval;

FIG. 49 shows an example of a query used to retrieve a query;

FIG. 51 shows a display example of an input window for conceptual retrieval;

FIG. 52 shows a query corresponding to input information in the input window shown in FIG. 51;

FIG. 53 shows an XML document as a retrieval result corresponding to the query shown in FIG. 52;

FIG. 54 shows an example of a patent map;

FIG. 56 shows an example of "paper" information as an example of a structured document described in XML;

FIG. 57 shows a description of an XML document corresponding to a document object tree of "concept" information below node "concept tree" shown in FIG. 55;

FIG. 60 shows an example of a query of query ID "Qid0";

FIG. 61 shows an XML document obtained as a result of retrieval using the query shown in FIG. 60;

FIG. 62 shows an example of a correspondence table between query IDs and style IDs, which is stored in the retrieval request processing device shown in FIG. 1;

FIG. 63 shows a display example of a retrieval result on the client terminal, i.e., a window display example when the retrieval result is displayed as a matrix(table)-format map;

FIG. 64 is a view for explaining coordinates of elements which form the matrix of the map shown in FIG. 53;

FIG. 65 is a view for explaining query IDs and parameters associated with components which form the matrix of the map shown in FIG. 63;

FIG. 66 is a view for explaining window transition on the client terminal;

FIG. 67 shows an XML document as a retrieval result based on a retrieval request involved to a window transition;

FIG. 68 is a view for explaining coordinates of elements which form the matrix of the map M2 shown in FIG. 66;

FIG. 69 shows a query of query ID "Qid1"; and

DETAILED DESCRIPTION OF THE INVENTION

An outline of a structured document management system will be explained below prior to the description of an embodiment of the present invention.

(Description of Structured Document Management System)

Structured documents include documents described in XML, SGML, and the like. SGML (Standard Generalized Markup Language) is the standard specified by ISO (International Organization for Standardization). XML is the standard specified by W3C (World Wide Web Consortium). These are structured document standards which allow to structure documents.

A document described in XML will be exemplified below as a structured document. Data that defines the document structure of a structured document (document structure definition data) is called a schema. In XML, schema languages such as XML-Schema, XDR (XML Data Reduced), and the like have been proposed to define a schema. A case will be exemplified below wherein a schema is described in XDR.

The schema is also a structured document to be managed by the structured document management system, and will also be referred to as a schema document. A structured document other than the schema document and has various contents such as a patent specification, mail message, weekly report, advertisement, and the like will also be referred to as a contents document.

The structured document management system manages the schema documents, contents documents, and queries that describe retrieval requests from the user (to be described later), i.e., query documents. These documents will be generally referred to as "documents".

In the following description, "documents" indicate all of contents, schema, and query documents unless otherwise specified.

Prior to the description of the embodiment, XML will be briefly explained below.

Figures 2, 3:
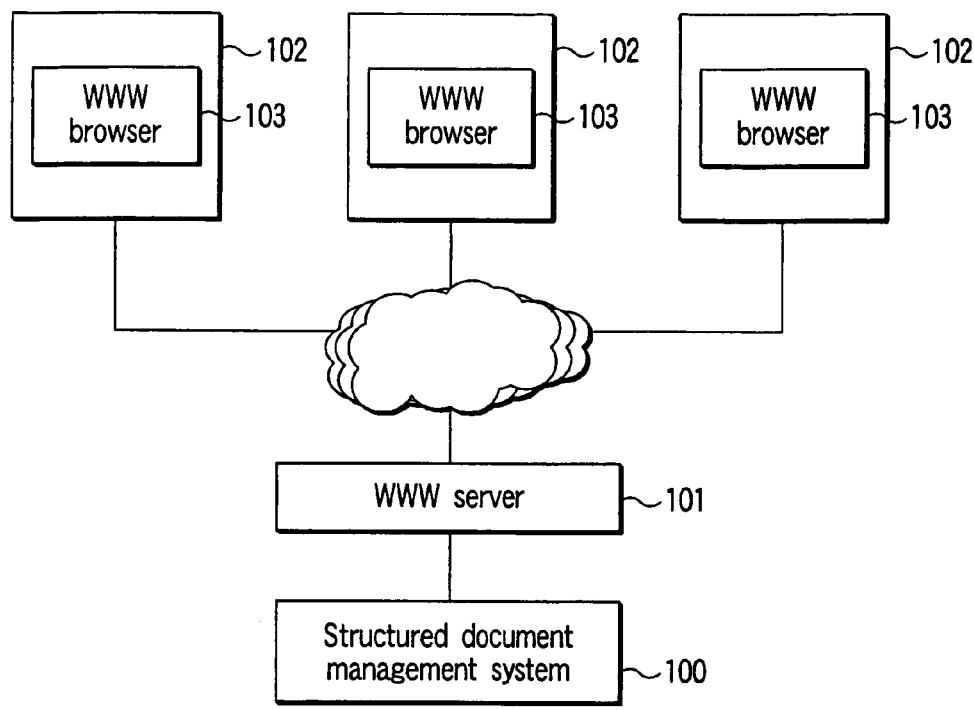
FIG. 2 shows one use pattern of the structured document management system shown in FIG. 1, i.e., a case wherein the structured document management system runs as a back end of WWW.
FIG. 3 shows an example of a structured document described in XML.

FIG. 3 shows an example of "patent" information as an example of the structured document described in XML. XML and SGML use tags to express the document structure. Tags include start and end tags. Each component of the document structure is bounded by start and end tags. A start tag is defined by closing a component name (tag name) by ">", and an end tag is defined by closing a component name by "</" and ">". The contents of a component that follows a tag are text (character string) or repetition of a child component. Also, the start tag can be set with attribute information like "<component name attribute="attribute value">". A component which does not contain any text like "<patent DB></patent DB>" can also be simply expressed by "<patent DB/>".

The document shown in FIG. 3 has a component that starts from a "patent" tag as a root, and includes components that respectively start from "title", "date of application", "applicant", and "abstract"tags as child components. For example, a component starting from the "title" tag includes text (character string) like "XML database" as a component value.

Normally, a structured document of, e.g., XML repetitively includes arbitrary components, and the document structure is not determined in advance.

In order to logically express the structured document shown in FIG. 3, a tree expression shown in FIG. 4 is used. The tree is formed by nodes (circles assigned with numbers), arcs (lines with data which connect circles representing nodes), and text bounded by boxes.

One node corresponds to one component, i.e., one document object. A plurality of arcs with labels corresponding to tag names and attribute names extend from each node. Each arc points to a character string (text) as a node value or component value. An alphanumeric value (for example "#0", "#49") described in each node is an object ID used to identify each document object.

The tree structure shown in FIG. 4 will be referred to as a document object tree of the structured document shown in FIG. 3 hereinafter.

FIG. 1 shows an example of the arrangement of a structured document management system according to this embodiment. Referring to FIG. 1, the structured document management system roughly comprises a request control device 1, access request processing device 2, retrieval request processing device 3, data access device 4, document storage 5, and index storage 6. The document storage 5 and index storage 6 comprise, e.g., an external storage device.

The system arrangement shown in FIG. 1 can be implemented using software.

The request control device 1 comprises a request receiving device 11 and result processing device 12. The request receiving device 11 receives user's requests such as a document storing request, document acquiring request, document retrieval request, and the like, and calls the access request processing device 2. The result processing device 12 returns the processing result of the access request processing device 2 to the user as the request source.

The access request processing device 2 comprises a plurality of processing devices corresponding to, various requests from the user (e.g., a document storing request, document acquiring request, document delete request, and the like): a document storing device 21, document acquiring device 22, and document deleting device 23.

The document storing device 21 stores a document in a designated logical area in the document storage 5.

The document acquiring device 22 acquires a document present in a designated area when the logical area in the document storage 5 is designated.

The document deleting device 23 deletes a document present in a designated logical area in the document storage 5.

Figure 8:
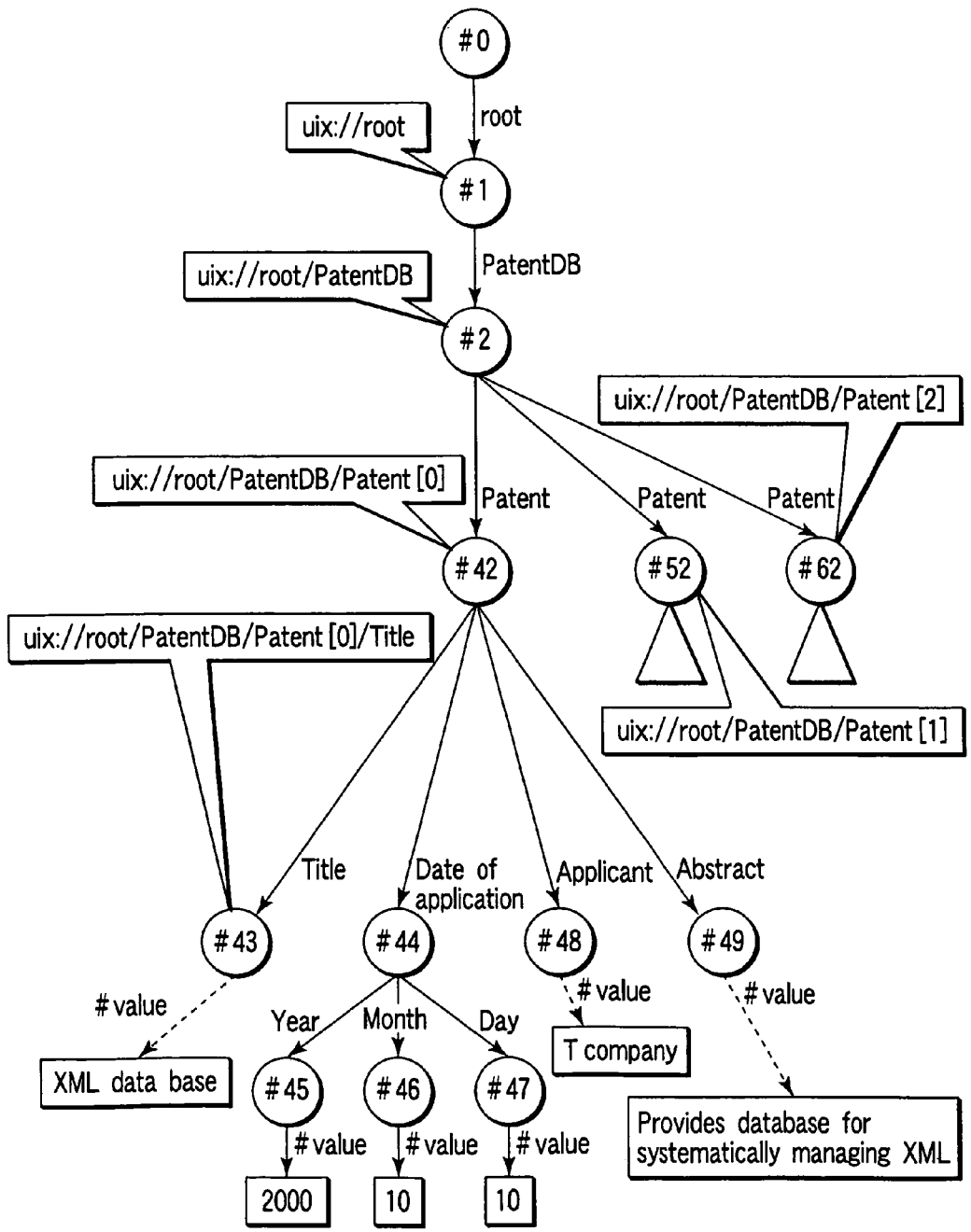
FIG. 8 shows a case wherein a document object tree of three pieces of "patent" information is appended to the structured document database in the state shown in (b) of FIG. 5 by executing an append command.

The document storage 5 is a structured document database, and stores documents in a hierarchical tree structure like a directory structure of UNIX, as shown in, e.g., FIG. 8.

As shown in FIG. 8, the structured document database can be expressed in the same manner as the tree structure of one structured document shown in FIG. 4. That is, a partial hierarchical tree (partial tree) below an arbitrary node is a structured document extracted from the structured document database, and will be referred to as a document object tree hereinafter. Each node is assigned an object ID. The object ID is a unique numerical value in the structured document database.

Assume that a node which serves as the root of the hierarchical tree is-assigned object ID "#0" so as to specify that it is a root node.

The root node, i.e., node "#0" is linked to a node with object ID "#1", which starts from a "root" tag. Node "#1" is linked to a node with object ID "#2", which starts from a "patent DB" tag. Node "#2" is linked to nodes with object IDs "#42", "#52", and "#62", which respectively start from "patent" tags.

The "patent" information shown in FIG. 3 corresponds to the partial tree below node "#42" in FIG. 8. This node is linked to nodes which start from a "title" tag, "applicant" tag, "abstract" tag, and the like, and end nodes are linked to character strings (component values) such as "XML database . . . ", "T company", "provides database for systematically managing XML", and the like.

In FIG. 8, the partial tree below the node with object ID "#52", and that below the node with object ID "#62" are also document object trees each of which corresponds to one "patent" information.

The component value "XML database" linked to node "#43" is connected to that node "#43" via a special tag name "#value". Since this tag name starts from "#", it cannot be used as a standard tag name in the XML standard.

In order to designate a specific node in the structured document database, a structured document pass is used. The structured document pass is a character string which starts from "uix://root". uix (Universal Identifier for XML) is a character string that indicates the structured document pass.

For example, if "uix://root/patent DB" is described as the structured document pass, a logical area in the document storage 5 designated by this structured document pass extends from node "#1" to a node indicated by an arc with "patent DB", i.e., node "#2" in FIG. 8.

Likewise, a structured document pass "uix://root/patent DB/patent"designates node "#42" in FIG.. 8, and a structured document pass "uix://root/patent DB/date of application/year" indicates node "#45" in FIG. 8.

For example, when a plurality of pieces of "patent" information are to be stored below node "#2", i.e., a component "patent DB" in FIG. 8, indices may be appended to a component name ("patent" in this case) so as to identify each "patent" information.

The first "patent" information in "patent DB" is expressed by "uix://root/patent DB/patent [0]", which, however, is equivalent to "uix://root/patent DB/patent". The second "patent" information in "patent DB" is expressed by "uix://root/patent DB/patent [1]", and the fifth "patent" information in "patent DB" is expressed by "uix://root/patent DB/patent [4]".

The index storage 6 stores a structure index and lexical index used in retrieval.

Figure 9:
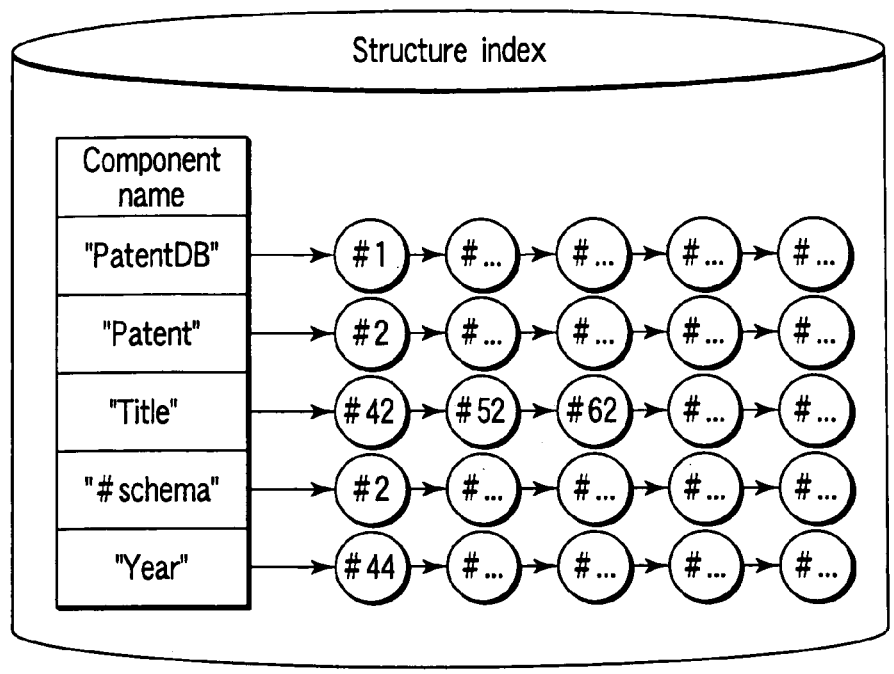
FIG. 9 shows a storage example of a structure index.

The structure index is an index file that associates component names stored in the structured document database with structured documents (document object trees) which start from components with those component names. For example, in the structured document database in FIG. 8, if a component name "patent" (corresponding to "patent" information) is present in a structured document below node "#42", a structured document below node "#52", and a structured document below node "#62", a parent node of nodes "#42", "#52", and "#62", i.e., node "#2", is stored in the structure index to be linked to the component name "patent", as shown in FIG. 9.

In this way, when an index is formed using a parent node, the index file can be compressed. That is, when an index is formed using a parent node, even when the number of child nodes increases, the number of nodes to be linked to each component name does not increase since the parent node represents the child nodes.

Figure 10:
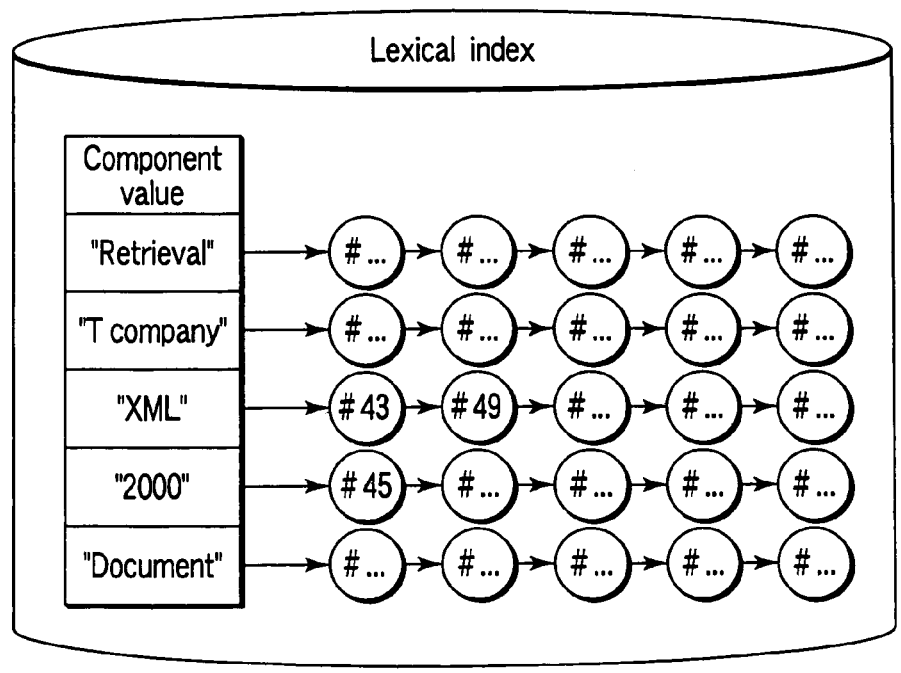
FIG. 10 shows a storage example of a lexical index.

The lexical index is an index file that associates character string data stored in the structured document database, and the positions of structured documents (document object trees) that include those character string data. For example, in the structured document database shown in FIG. 8, a character string "XML" is present in a structured document below node "#43" and a structured document below node "#49". In this case, the lexical index stores nodes "#43" and "#49" to be linked to the character string "XML", as shown in FIG. 10.

The designated logical area in the document storage 5 is the storage location of a document designated by the user using the structured document pass. The structured document pass is an expression which is visible to the user.

The description will revert to FIG. 1.

The data access device 4 executes various processes to access the document storage 5. The data access device 4 comprises a document-object-tree storing device 41, document-object-tree deleting device 42, document-object-tree acquiring device 43, document-object-tree converting device 44, document parser device 46, composite document generating device 4,7, and index updating device 48.

The document-object-tree storing device 41 stores a document object tree in a designated physical area in the document storage 5.

The document-object-tree deleting device 42 deletes a document object tree present in a designated physical area in the document storage 5.

The document-object-tree acquiring device 43 acquires a document object tree present in a designated physical area (by, e.g., a structured document pass) in the document storage 5.

The document-object-tree converting device 44 converts a document object tree into a structured document (XML document).

The document parser device 46 loads a structured document input by the user, and checks its document structure. Furthermore, if a schema as document structure definition data is found, the device 46 inspects if the document structure of the input structured document follows the schema. The output result is a document object tree. The document parser can be built by combining a lexical analyzer (that makes parsing to convert a character string into tokens) such as lex (lexical analyzer generator) and a parser generator such as yacc (yet another compiler compiler).

The composite document generating device 47 generates data required to inspect if a document matches a schema, upon storing or deleting a document.

The index updating device 48 updates the structure and lexical indices shown in FIGS. 9 and 10 every time the storage contents of the structured document database are updated upon storing or deleting a document.

The physical area in the document storage 5 is internal data indicates the unique location of each document data in the structured document database such as a file offset, object ID, and the like. This area is invisible to the user.

The retrieval request processing device 3 retrieves a document stored in the document storage 5 using the respective processing function devices equipped in the data access device 4. Upon receiving a document retrieval request from the user by the request receiving device 11 in the request control device 1, the retrieval request processing device 3 receives a query document described in a query language from the request receiving device 11. The retrieval request processing device 3 then accesses the index storage 6 and document storage 5 via the data access device 4 to acquire a set of documents that match the retrieval request (retrieval condition included in the retrieval request), and outputs the result via the result processing device 12.

FIG. 2 shows one use pattern of the structured document management system shown in FIG. 1. In FIG. 2, a structured document management system 100 with the arrangement shown in FIG. 1 runs as a back end of WWW (World Wide Web) On a plurality of (e.g., three in this case) client terminals (e.g., a personal computer, portable communication terminal, and the like) 102, WWW browsers 103 are running. The user can access the structured document management system 100 by accessing a WWW server 101 from each client terminal. Each WWW browser 103 and WWW server 101 communicate with each other using HTTP (Hyper Text Transfer Protocol). The WWW server 101 and structured document management system 100 communicate with each other using CGI (Common Gateway Interface), COM (Component Object Model), or the like.

A user's request such as a document storing request, document acquiring request, document retrieval request, or the like is sent from the WWW browser 103, and is received by the structured document management system 100 via the WWW server 101. The processing result of the structured document management system 100 is returned to the WWW browser 103 as the request source via the WWW server 101.

Details of (1) storage function and (2) retrieval function of the structured document management system shown in FIG. 1 will be described below. In (3) application example, patent research using conceptual retrieval will be exemplified.

(Storage Function)

Storage-system commands in the structured document management system in FIG. 1 include:
insertXML(pass, N-th, XML): store document
appendXML(pass, XML): store document
getXML(pass): acquire document
removeXML(pass): delete document
setSchema(pass, schema): store schema
getSchema(pass): acquire schema "insertXML" (to be simply referred to as an insert command hereinafter) is a command for inserting a document at the N-th position below the structured document pass designated in ( ).

"appendXML" (to be simply referred to as an append command hereinafter) is a command for inserting a document at the last position below the structured document pass designated in ( ).

"getXML" (to be simply referred to as an acquire command hereinafter) is a command for extracting a document below the structured document pass designated in ( ).

"removeXML" (to be simply referred to as a delete command hereinafter) is a command for deleting a document (a document other than a schema document; mainly, a contents document) below the structured document pass designated in ( ).

"setSchema" (to be simply referred to as a schema store command hereinafter) is a command for setting a schema in the structured document pass designated in ( ).

"getSchema" (to be simply referred to as a schema acquire command hereinafter) is a command for extracting a schema set in the structured document pass designated in ( ).

Of these command, processes that pertain to the insert command, append command, and schema store command are executed by the document storing device 21 in the access request processing device 2, processes that pertain to the acquire command and schema acquire command are executed by the document acquiring device 22, and a process that pertains to the delete command is executed by the document deleting device 23.

A case will be explained below with reference to FIG. 5 wherein an append command is executed in the initial state (see (a) of FIG. 5) of the structured document database.

As a result of executing "appendXML("uix://root", "<patent DB/>")" with respect to the initial state in which nodes "#0" and "#1" are connected via arc "root", as shown in (a) of FIG. 5, node "#2" and arc "patent DB" are generated, as shown in (b) of FIG. 5.

A case will be explained below wherein an acquire command is executed for the structured document database in the state shown in (b) of FIG. 5.

For example, when "getXML("uix://root")" is executed, a document object tree below node "#0" indicated by arc "root" in (b) of FIG. 5 is extracted, and is converted into an XML document. As a result, a character string "<root><patent DB/></root>" is extracted, and is converted into an XML document shown in FIG. 6. The process of the acquire command is executed by the document acquiring device 22 of the access request processing device 2.

A case will be described below wherein an append command for storing "patent" information as a contents document (XML document) shown in FIG. 3 is executed for the structured document database in the state shown in (b) of FIG. 5. In this case, "appendXML("uix://root/patent DB", "<patent> . . . </patent>")" is executed. ""<patent> . . . </patent>""in this command corresponds to an XML document of "patent" information shown in FIG. 3.

Figure 7:
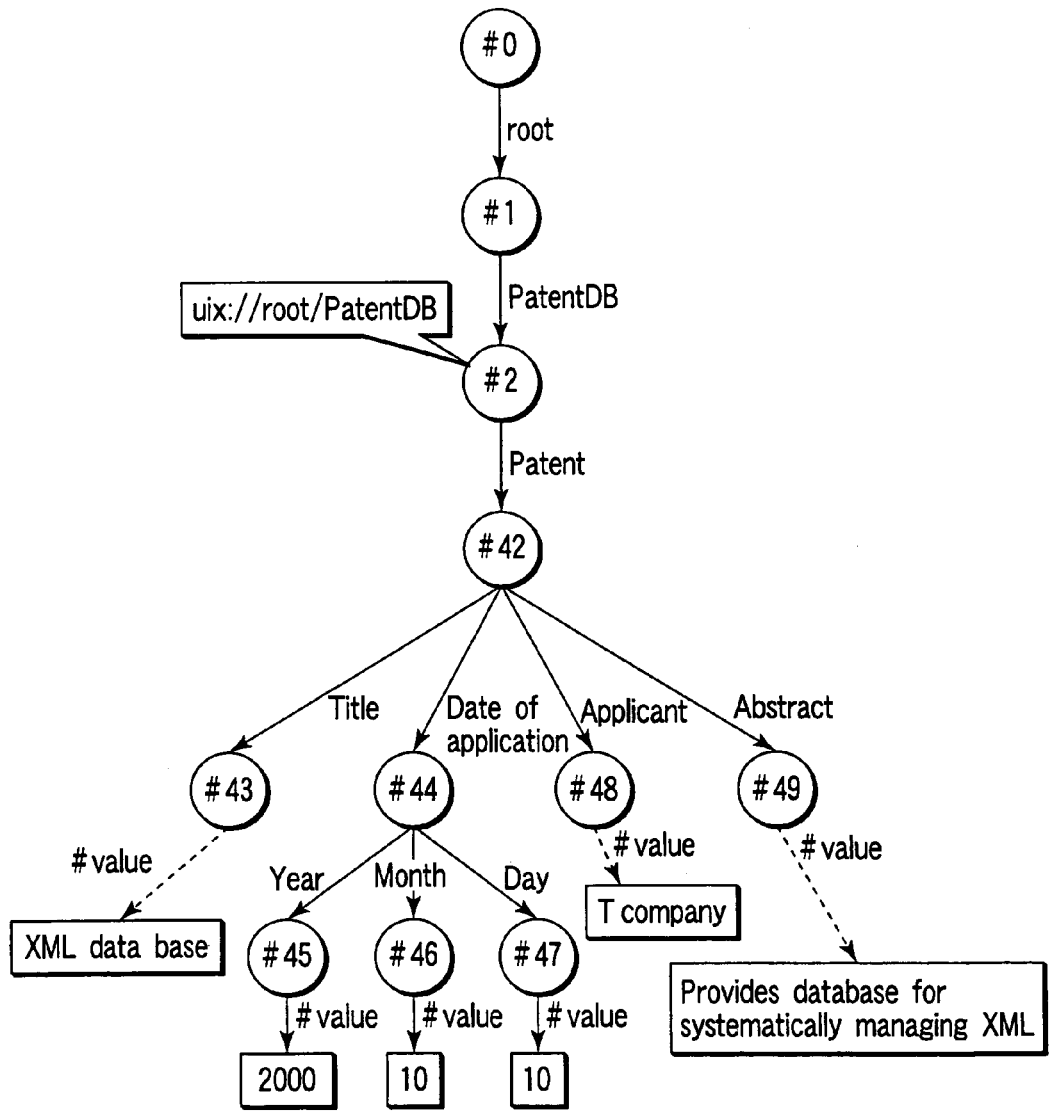
FIG. 7 shows a case wherein a document object tree of one "patent" information is appended to the structured document database in the state shown in (b) of FIG. 5 by executing an append command.

Upon executing the process of the append command, a document object tree (corresponding to FIG. 4) having node "#42" as a top node is appended below node "#2", as shown in FIG. 7.

Assume that the following append command is repetitively executed three times for the structured document database in the state shown in (b) of FIG. 5.

"appendXML("uix://root/patent DB", "<patent> . . . </patent>")"

""<patent> . . . </patent>""in this command corresponds to a contents document having the same document structure as that of the XML document shown in FIG. 3.

As a result, document object trees having nodes "#42", "#52", and "#62" as top nodes are appended below node "#2", as shown in FIG. 8.

A case will be explained below wherein an acquire command for extracting "patent" information below node "patent DB" is executed for the structured document database in the state shown in FIG. 8. In this case, "getXML ("uix://root/patent DB")"is executed. Thus, a document object tree below node "#2", which is indicated by arc "patent DB" is extracted. As a result, an XML document "<patent DB> <patent> . . . </patent> <patent> . . . </patent> <patent> . . . </patent> </patent DB>" can be acquired, as shown in FIG. 11.

The structured document database also manages data that defines the document structure of a contents document (XML document) such as "patent" information mentioned above, i.e., a schema.

FIG. 12 shows an example of a schema which defines the document structure of an XML document. In this case, XDR (XML-Data Reduced) as one of document structure definition languages of XML will be taken as an example. Of course, other document structure definition languages such as XML-Schema and the like may be used.

The schema shown in FIG. 12 defines the document structure of "patent" information shown in FIG. 3 using XDR. As can be easily understood from FIG. 12, the schema is also an XML structured document. The schema starts from a component starting from a "Schema" tag, and includes a set of components starting from an "ElementType" tag as child components.

The schema shown in FIG. 12 includes the following definitions.

This schema describes the document structure definition of a document that starts from a "patent" tag ("ElementType name="patent"").

Child components are only components ("content="eltOnly"").

Child components include those starting from "title", "date of application", "Applicant" and "abstract" tags ("element type="title", . . . ") Furthermore, the order of child components is uniquely determined ("order="seq"").

This schema describes the document structure definitions of "title", "applicant", "abstract", "year", "month", "day", and "date of application" in addition to the document structure definition starting from a "patent" tag. That is, it is defined that values of components starting from "title", "applicant", "abstract", "year", "month", and "day" tags are only text ("content="textOnly""). Child components of a component starting from the "date of application" tag have an order of "year", "month", and "day".

A case will be explained below wherein a schema store command for storing the schema document shown in FIG. 12 is executed for the structured document database in the state shown in FIG. 8. In this case, "setSchema("uix://root/patent DB", "<Schema> . . . </Schema>")" is executed.

""<Schema> . . . </Schema>"" in this command corresponds to the schema document shown in FIG. 12.

Upon executing this command, arc "#schema" is appended below node "#2", and a document object tree having node "#3" as a top node is appended at the end of that arc. Since the schema itself has an XML document expression, it is evolved to a tree as in storage of a contents document such as "patent" information mentioned above.

Figure 13:
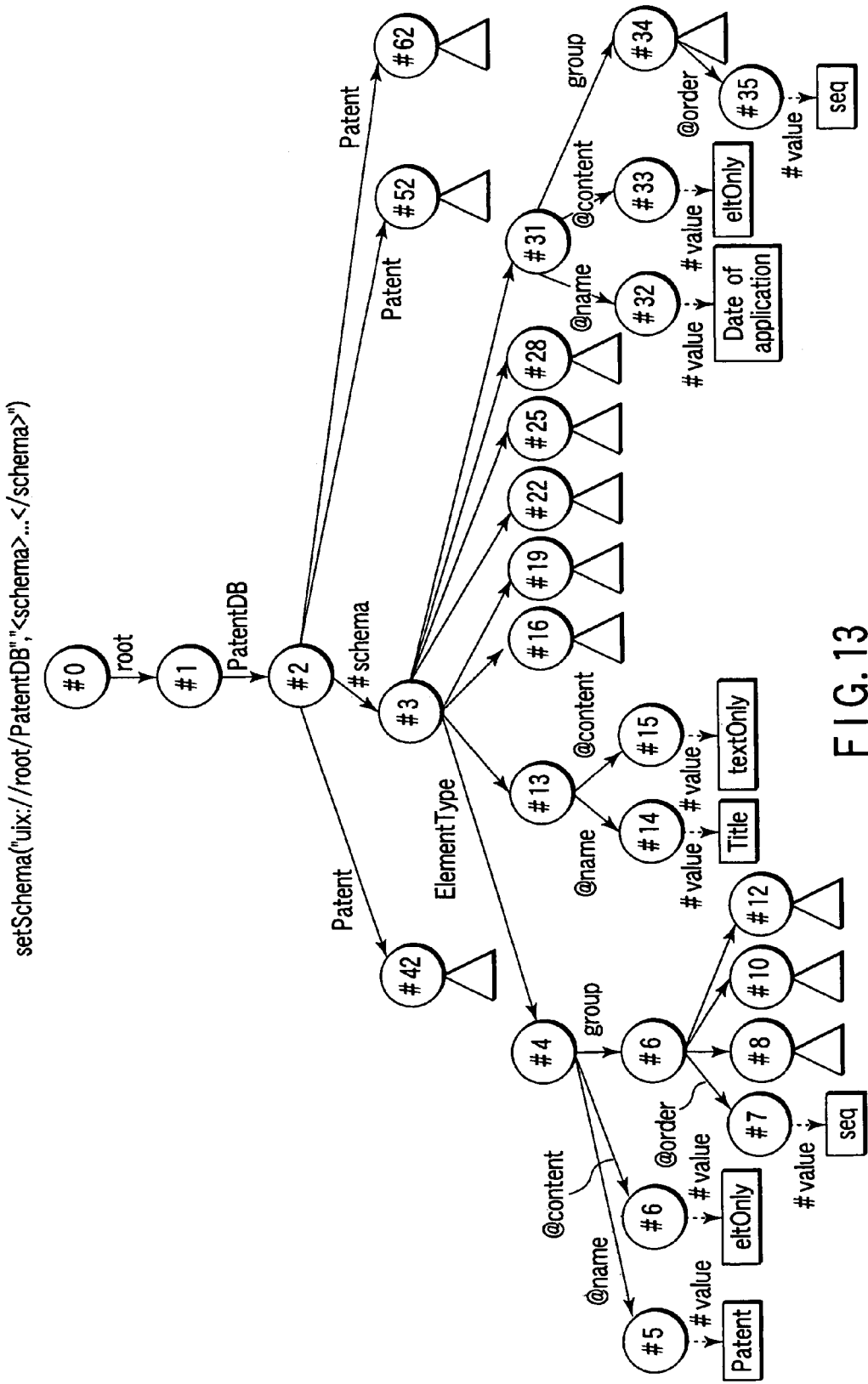
FIG. 13 shows a case wherein the schema shown in FIG. 12 is appended and stored (set) in the structured document database in the state shown in FIG. 8 by executing a schema store command.

In FIG. 13, an arc starting from "@" like "@name" corresponds to an attribute. Since tag name "#schema" starts from "#" and "@," it cannot be used as a standard tag name in the XML standard.

Since the schema document shown in FIG. 12 is stored below node "#2", the document structure of a document to be stored below node "#2" is required to match the document structure defined by the schema document shown in FIG. 12. In other words, the schema shown in FIG. 12 is set below node "#2".

Figure 14:
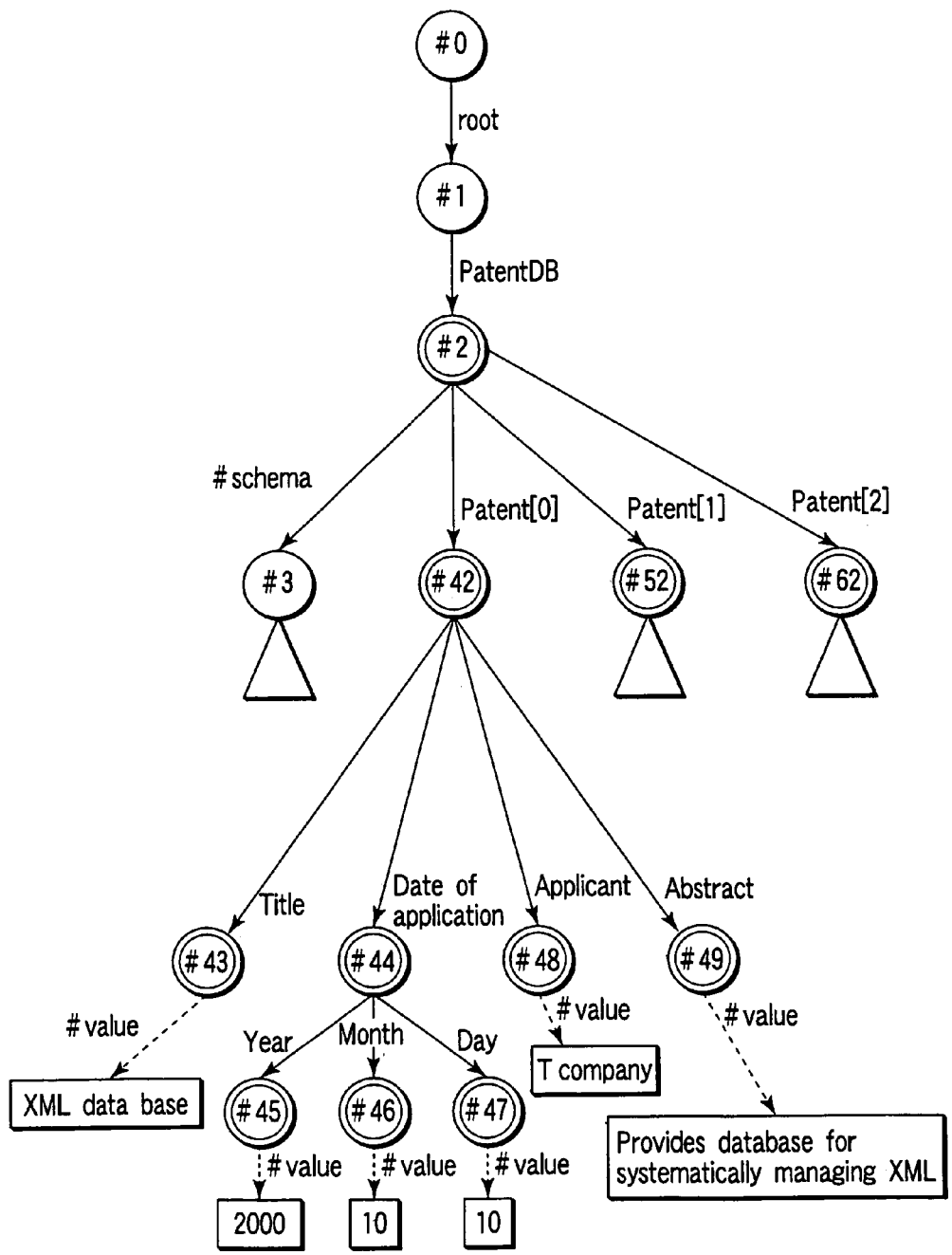
FIG. 14 shows a document object tree which is set with the schema and is also set with an attribute value indicating that the schema is present.

When the schema shown in FIG. 12 is set below node "#2", each node of the document object tree below node "#2" is set with an attribute value indicating the presence of the schema, as shown in FIG. 14.

After the schema shown in FIG. 12 is set below node "#2", when a document of "patent" information shown in FIG. 3 which matches the document structure defined by this schema is stored in the structured document database as a document object tree, as shown in FIG. 14, an attribute value indicating the presence of the schema shown in FIG. 12 is set in each document object which forms the document object tree in the document structure of this document. For example, "1" is set in an attribute value (e.g., "schema matching ON/OFF") indicating if the schema is present for each document object file which forms the document object tree. In FIG. 14, each document object (node) which matches the schema is indicated by a double circle. Each document object indicated by the double circle has the document structure definition corresponding to that document object.

Figure 15:
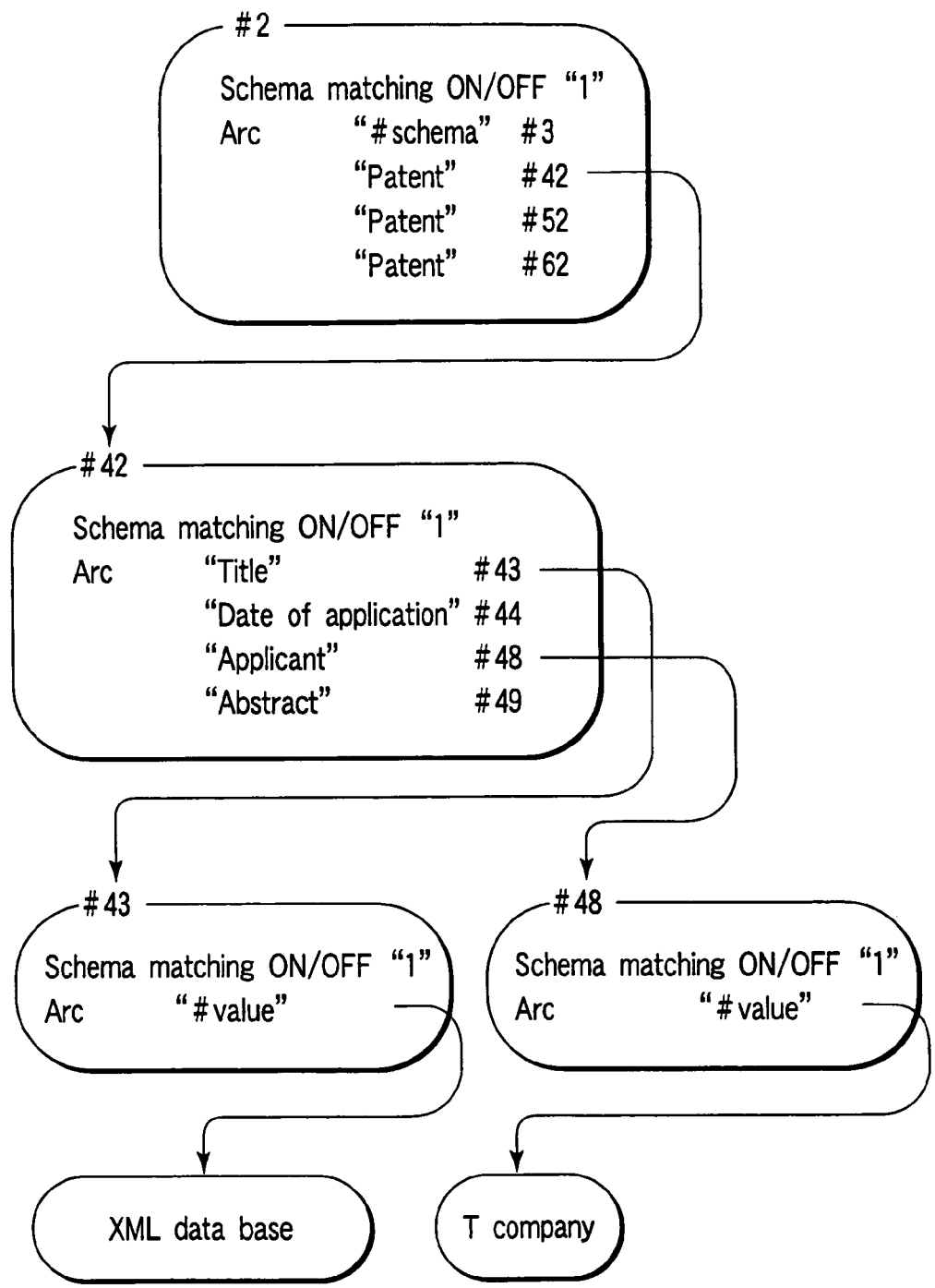
FIG. 15 shows a state wherein respective object store attribute values indicating that the schema is present.

FIG. 15 schematically shows the contents of respective document object files. For example, a document object file with object ID "#42" describes the aforementioned attribute value together with information (e.g., an arc, a pointer value to a document object as a link destination, and the like) associated with another document object linked to that document object. If there is no schema which is applied to that document object, the value "schema matching ON/OFF" is "0".

FIGS. 16 and 17 show examples of structured documents which express concept hierarchies used as needed in retrieval in the structured document management system in FIG. 1. "Concept" information shown in each of FIGS. 16 and 17 is a contents document described in XML.

An example of "concept" information shown in FIG. 16 expresses an "information model" used as one axis of classification used to classify the contents of patent documents in so-called patent research using the concept hierarchy. "Concept" information bounded by "concept" tags has a document structure with a nested structure. That is, in the example shown in FIG. 16, concept "information model" includes, as child concepts, concept "document", concept "relation", and concept "object". Also, concept "document" includes, as child concepts, concept "structured document" and concept "non-structured document". Furthermore, concept "structured document" includes, as child concepts, concept "XML" and concept "SGML".

A description example of "concept" information shown in FIG. 17 expresses axis of classification "information manipulation" different from FIG. 16 using the concept hierarchy. In the example of FIG. 17, concept "information manipulation" includes, as child concepts, concept "retrieval", concept "storage", concept "processing", and concept "distribution".

The "concept" information shown in FIGS. 16 and 17 can also be stored in the structured document database in the same manner as the above "patent" information. More specifically, "appendXML("uix://root", "<concept DB/>")" is executed first for the structured document database in the state shown in FIG. 8, and node "#201" and arc "concept DB" are generated, as shown in FIG. 18. In this state, when the "concept" information shown in FIG. 16 is to be stored, "appendXML("uix://root/concept DB", "<concept name> . . . </concept>")" is executed. In this command, ""<concept name> . . . </concept>"" corresponds to the "concept" information shown in FIG. 16.

Figure 19:
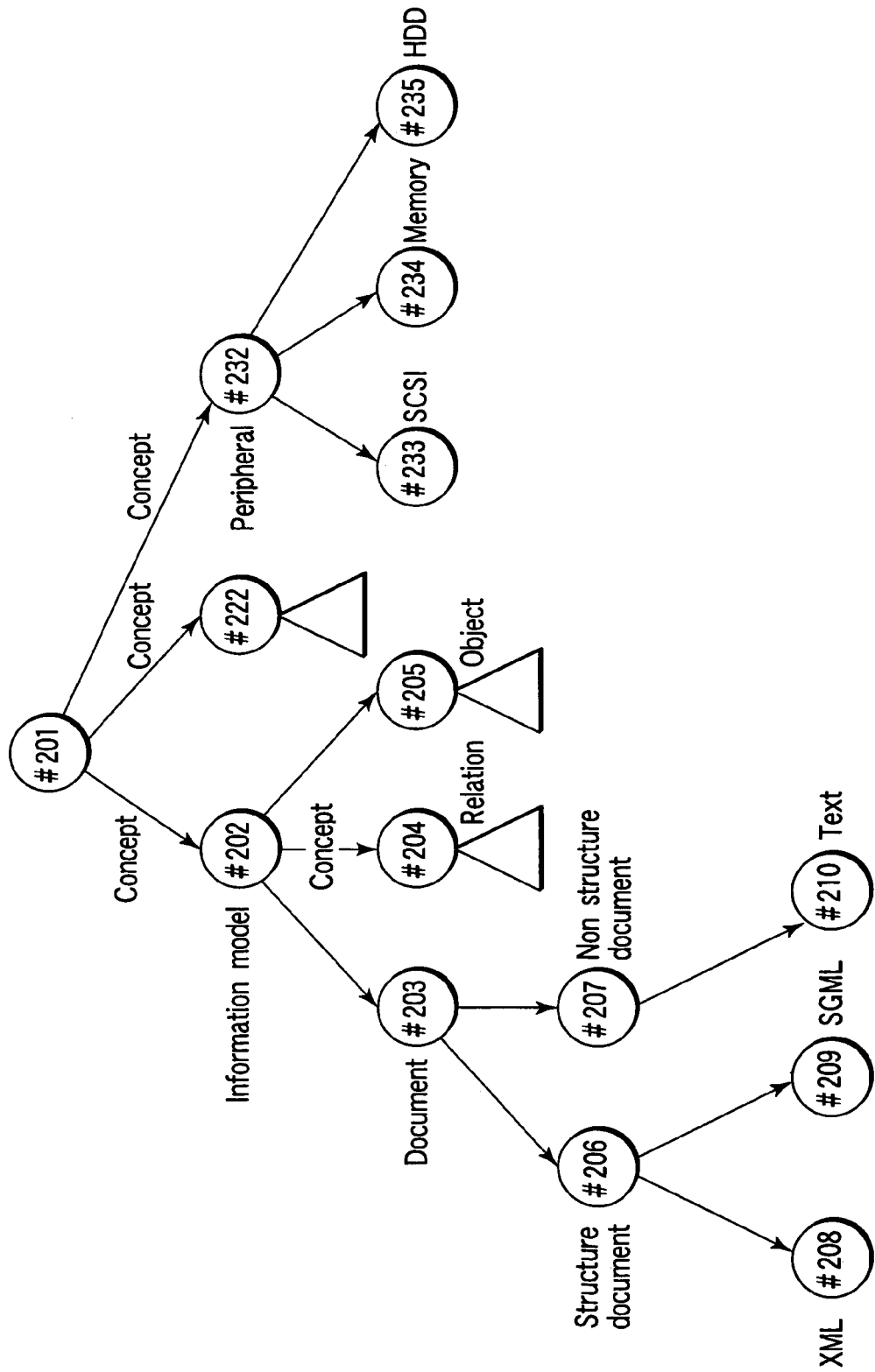
FIG. 19 shows a document object tree of "concept" information shown in FIGS. 16 and 17 that is appended to node "#201" shown in FIG. 18.

Upon execution of the process of the append command, a document object tree having node "#202" as a top node is appended below node "#201", as shown in FIG. 19.

As described above, in the structured document management system shown in FIG. 1, a huge number of XML documents (contents documents, schema documents, query documents, and the like) with different document structures, which are registered on the structured document database, are handled as one tree-like giant XML document starting from the "root" tag, as shown in FIGS. 18 and 19. For this reason, since a given access means which is independent from the document structures, i.e., a pass to the giant XML document is used to access a partial XML document, XML documents can be flexibly retrieved and processed.

Since a schema is set in a portion on the structured document database, the validity indicating if the document structure of a document to be stored matches the document structure defined by that schema can be automatically checked (to be described later).

(1-1) Document Storage Process

The document storage processing operation of the structured document management system shown in FIG. 1 will be explained below with reference to the flow chart shown in FIG. 20.

Figure 20:
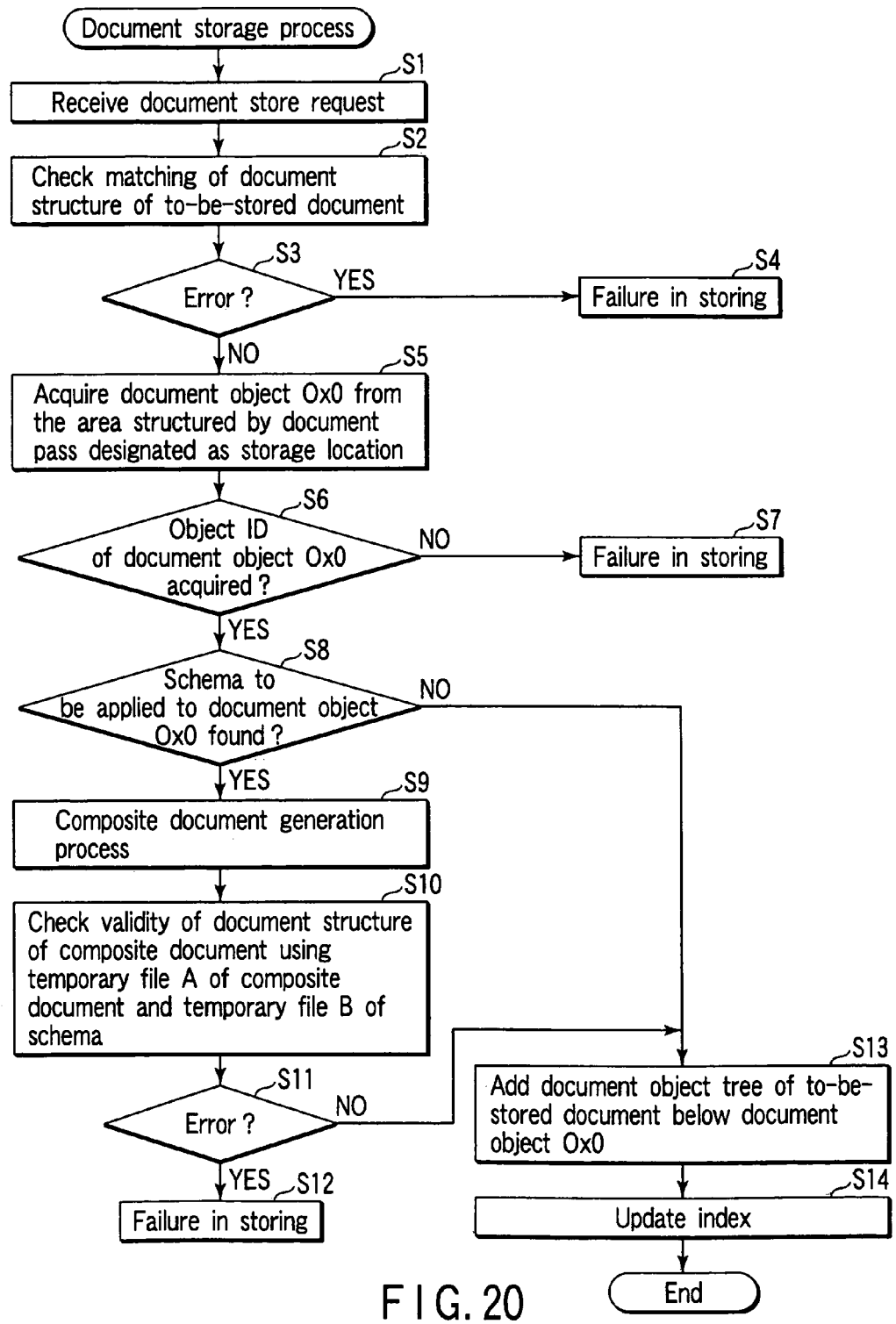
FIG. 20 is a flow chart for explaining the document storage processing operation of the structured document management system shown in FIG. 1.

When one of an insert command, append command, and schema store command is sent as a document store request from the client terminal 102 to the structured document management system 100, and is received by the request receiving device 11, the processing operation shown in FIG. 20 is executed.

Figure 31:
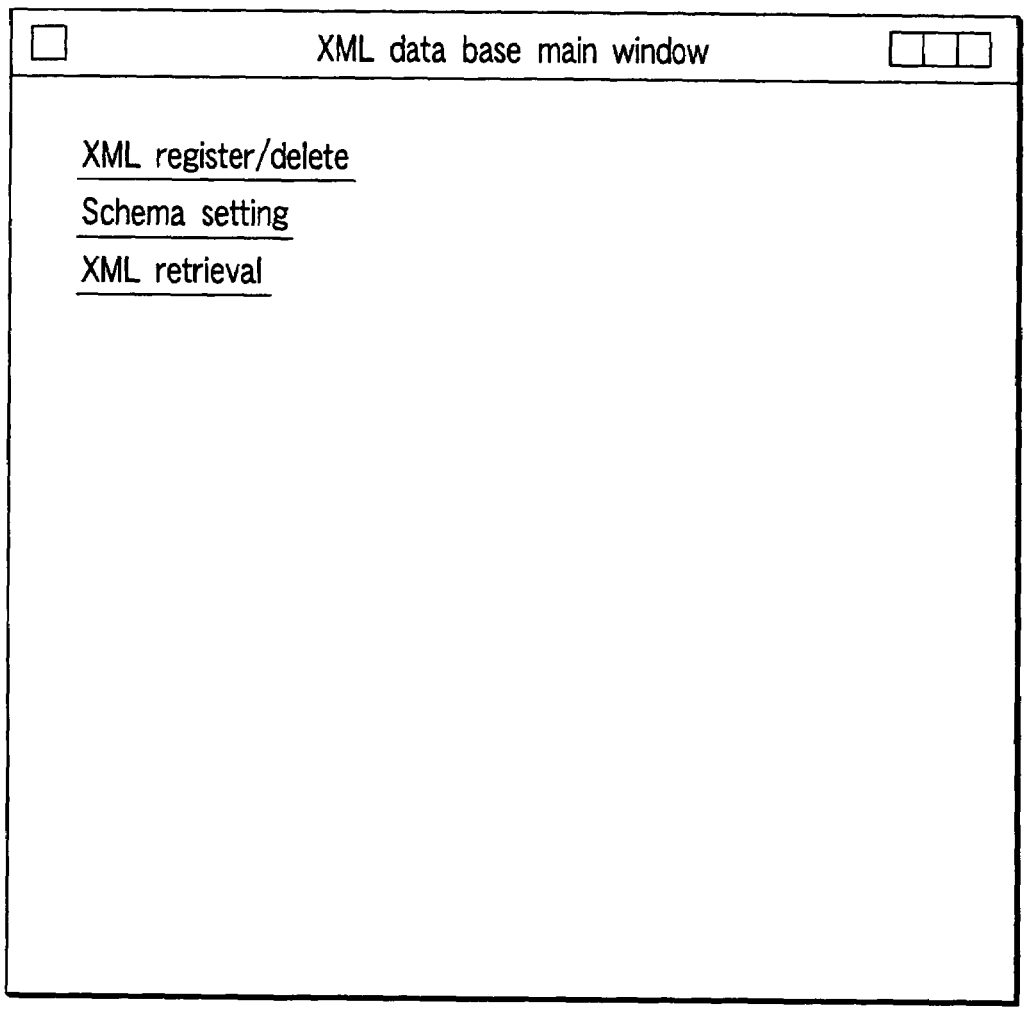
FIG. 31 shows a display example of a window as a user interface.

A display of the client terminal 102 displays a window as a user interface shown in, e.g., FIG. 31, which is provided from (e.g., the request control device 1 of) the structured document management system 100.

The window shown in FIG. 31 displays a list (menu) of manipulation items to the structured document management system 100. The manipulation items include "register/delete XML", "set schema", and "retrieve XML".

Figure 32:
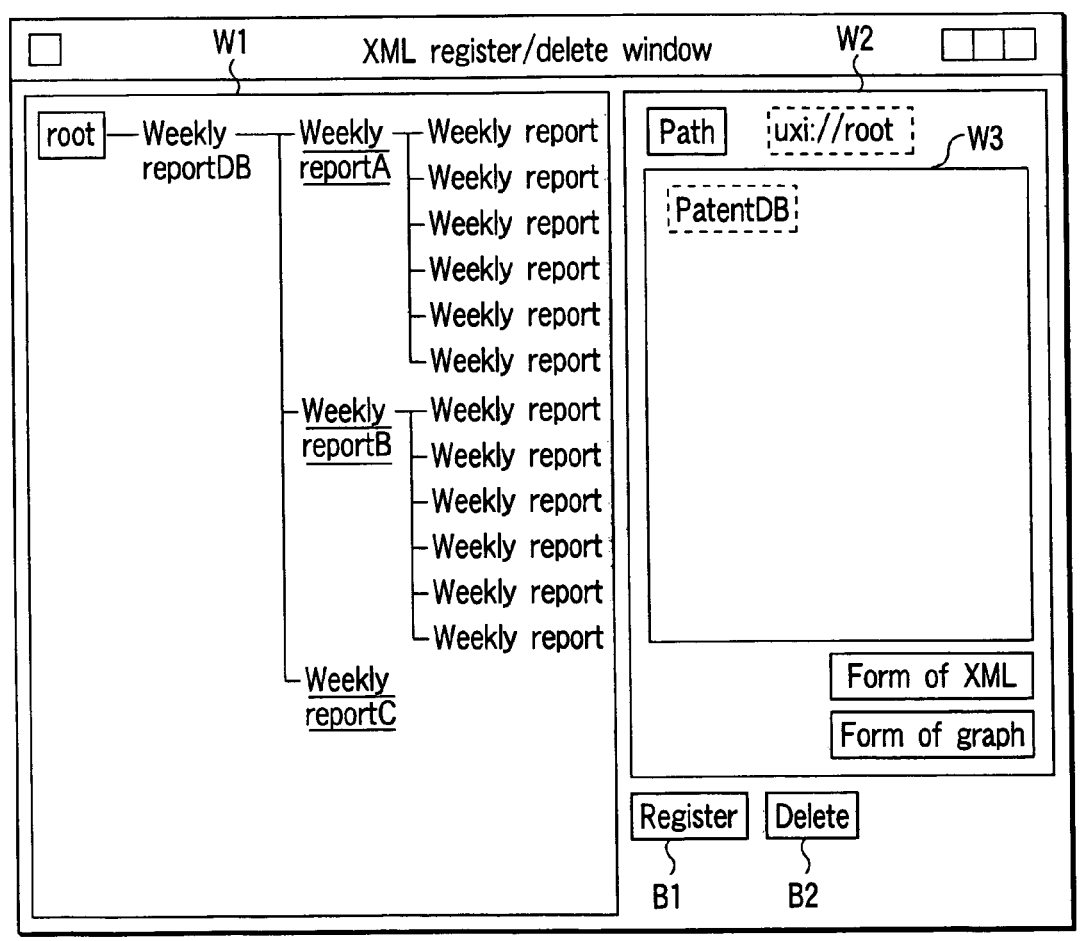
FIG. 32 shows a display example of a window as a user interface for storing/deleting a document.

When the user selects "XML register/delete" on this window using a pointing device such as a mouse or the like, a window as a user interface for storing/deleting a document, as shown in FIG. 32, is displayed.

In FIG. 32, region W1 displays component names (tag names) of the current tree structure of the structured document database in a simplified form so that the user can understand. FIG. 32 displays only component names of upper layers, but can display up to end component names. Also, region W2 is an input region of a structured document pass, and a structured document pass is input in accordance with the display contents on region W1. Region W3 is used to input a document to be stored or to display acquired documents.

Figure 33:
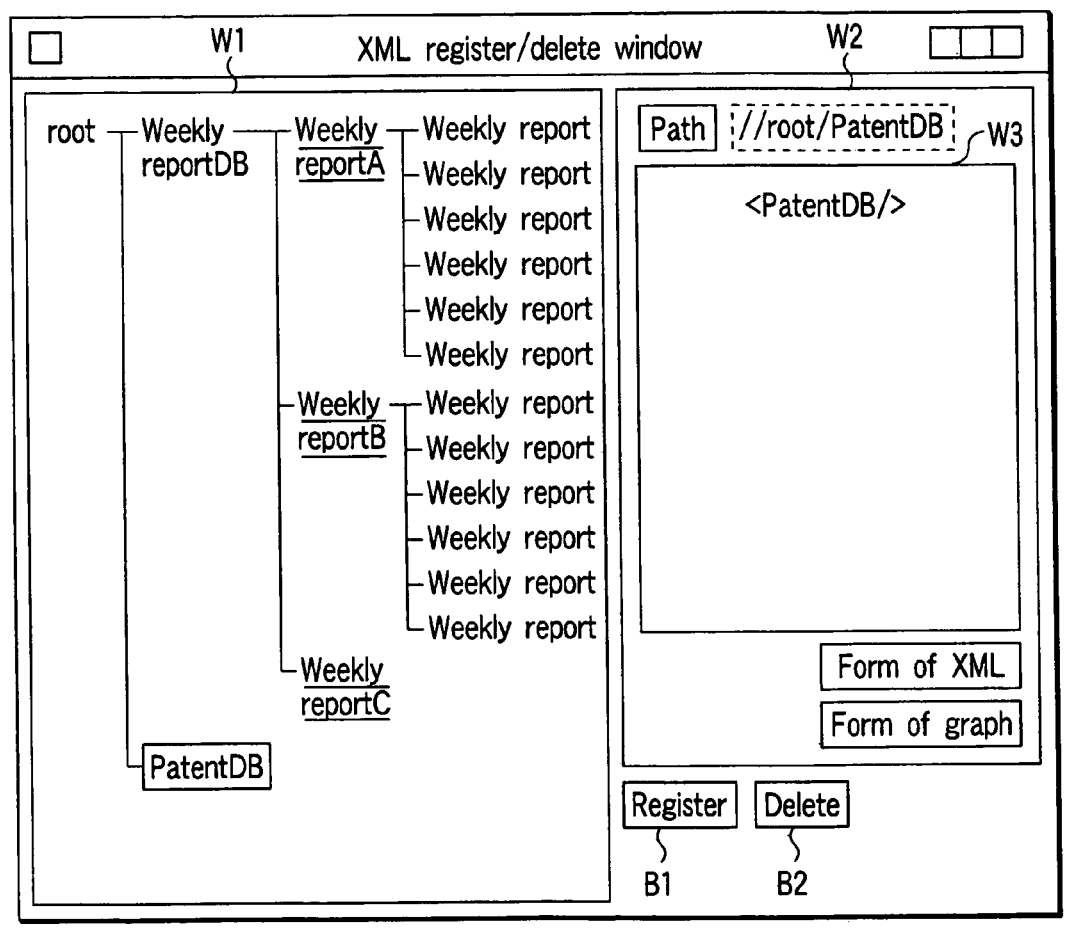
FIG. 33 shows a display example of a window as a user interface for storing/deleting a document.

When "root" which is already-present in the structured document database is input as the structured document pass, the user can select "root" on region W1 using, e.g., the mouse. Then, "uix://root" is displayed on region W2 as the structured document pass input region, as shown in FIG. 32. When new component "patent DB" is to be appended, the user inputs "patent DB" on region W3, as shown in FIG. 32. When the user selects "register" button B1, the client terminal sends append command "append XML("uix://root", "<patent DB/>")" to the structured document management system. The structured document management system receives the append command, and executes a process to be described later. As a result, node "#2" and arc "patent DB" are generated, as shown in, e.g., FIG. 5(b). On region W1, "patent DB" is additionally displayed below "root", as shown in FIG. 33.

Figures 34, 35:
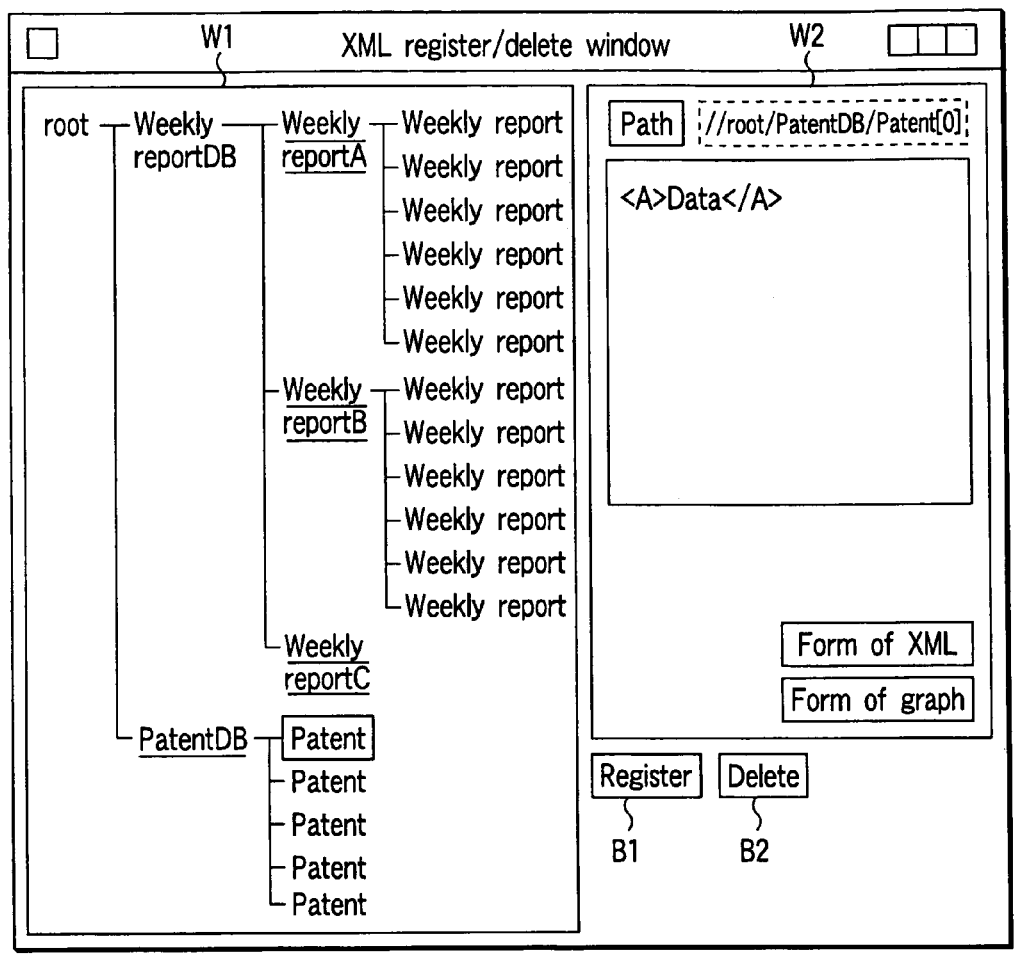
FIG. 34 shows a display example of a window as a user interface for storing/deleting a document.
FIG. 35 shows a display example of a message which is to be returned to a client when an error has occurred in validity check.

When the user inputs, e.g., document "<A> data </A>" on region W3 on the document store/delete window shown in FIG. 34 (or inputs by loading from a predetermined recording medium or the like such as a CD-ROM or the like), and selects "patent [0]" on region W1 using, e.g., the mouse, "uix://root/patent DB/patent [0]" is displayed on structured document pass input region W2. When the user selects "register" button B1, the client terminal sends append command "appendXML("uix://root", "<patent DB/>")" to the structured document management system.

A case will be exemplified below with reference to the flow chart shown in FIG. 20 wherein append command "appendXML("uix://root/patent DB/patent [0]", "<A> data </A>")" is received when the structured document database is in the state shown in FIG. 14.

Upon receiving the above append command, the request receiving device 11 passes structured document pass "uix://root/patent DB/patent [0]" and document "<A> data </A>" (to be referred to as a to-be-stored document hereinafter) as two parameters in that append command to the document storing device 21 (step S1).

The document storing device 21 passes the to-be-stored document to the document parser device 46. The document parser device 46 loads and parses the to-be-stored document, and checks matching, i.e., if the document structure of that to-be-stored document has a correct format specified by XML (step S2).

If any error is found in checking of matching (step S3), a message "document store failure" is returned to the client terminal via the document storing device 21 and result processing device 12 (step S4).

If no error is found in checking of matching, the document storing device 21 passes the structured document pass to the document-object-tree acquiring device 43. The document-object-tree acquiring device 43 specifies a physical area in the document storage 5 based on the structured document pass, thus extracting a document object tree which contains a node (document object Ox0) which is present in that area and is expressed by the structured document pass (step S5).

If the structured document pass is designated correctly, since the object ID of document object Ox0 can be acquired (step S6), the flow advances to step S8 in that case.

For example, in case of the append command, since node "#42" becomes document object Ox0, "#42" is acquired as its object ID, and a document object tree containing this node "#42" (for example, a document object tree made up of all descendant nodes of node "#42", all (brother) nodes in the same layer as node "#42", and node "#2" as a parent node of node "#42") is acquired.

If no document object Ox0 corresponding to the designated structured document pass is found, an error occurs (step S6), and a message "document store failure" is returned to the client terminal via the document storing device 21 and result processing device 12 (step S7).

For example, when the structured document database is in the state shown in FIG. 18, and when the structured document pass "uix://root/other" is described as a parameter of the append command, since there is no document object corresponding to this pass, an error occurs in step S6, and the flow advances to step S7.

It is checked in step S8 if document object Ox0 includes a schema. This checking step can be done by checking the attribute value since the attribute value is described in each document object file, as described above. If the value of "schema matching ON/OFF" of document object Ox0 is "1", the flow advances to step S9.

The process in step S9 in FIG. 20 (the process of the composite document generating device 47) will be described in detail below with reference to the flow chart shown in FIG. 21.

The document storing device 21 passes the document object tree acquired in step S5 to the composite document generating device 47.

The composite document generating device.47 searches for document object Ox1 having a "Schema" tag as a child component by tracing this document object tree from document object Ox0 (step S21).

For example, in the structured document database shown in FIG. 14, since node "#2" as a parent node of node "#42" as document object Ox0 is linked to a node (node "#3") which has a "Schema" tag as a top (head) tag (it has a "Schema" tag as a child component), this node "#2" corresponds to document object Ox1. Hence, the flow advances from step S22 to step S23.

By tracing arcs from this document object Ox1 to document object Ox0 and further from document object Ox0, document object tree Ot1 which is located downstream document object Ox0 and is made up of all child nodes with a document object attribute value "1" is extracted (step S23).

For example, when the structured document pass of the parameter in the append command is designated as "uix://root/patent DB/patent [0]", document object tree Ot1 is made up of nodes "#42" to "#49" (see FIG. 14).

The flow then advances to step S25.

In step S25, a document object tree of the to-be-stored document is inserted into document object tree Ot1 as a child node of document object Ox0. As a result, new document object tree Ot2 is obtained.

This document object tree Ot2 is converted into an XML document, which is output to temporary file A (step S27).

For example, FIG. 22 shows an XML document obtained by converting document object tree Ot2 of a composite document, which is obtained by inserting the document object tree (one document object in this case) of to-be-stored document "<A> data </A>" of the parameter in append command into document object tree Ot1 made up of nodes "#42" to "#49" as a child node of node "#42". This composite document is obtained by appending data "<A> data </A>" to "patent" information which is stored so far.

The XML document shown in FIG. 22, i.e., the composite document is output to and temporarily stored in temporary file A.

On the other hand, document object tree Ot3 below the schema tag is converted into an XML document, which is output to temporary file B (step S28). That is, temporary file B temporarily stores a schema document.

For example, FIG. 23 shows an XML document obtained by converting a document object tree having node "#3" as a top node, i.e., document object tree Ot3. The XML document shown in FIG. 23 is output to and temporarily stored in temporary file B.

As shown in FIG. 22, in temporary file A ("tmp000.xml"), the to-be-stored document, i.e., "<A> data </A>" in this case, is inserted in addition to components of original "patent" information. Also, temporary file A describes link information "xmlns="x-schema:tmp001.xml"" to temporary file B ("tmp001.xml"). This description designates temporary file B to which the schema that is applied to "patent" information is output.

The description will revert to FIG. 20.

In step S10, the document storing device 21 passes temporary file A of the composite document and temporary file B of the schema to the document parser device 46 to check the validity of the document structure of the composite document. That is, the document parser device 46 loads temporary file A of the composite document and temporary file B of the schema, and checks if the document structure of the composite document matches that defined by the schema.

For example, when the validity is checked using the composite document shown in FIG. 22 and the schema shown in FIG. 23, since the composite document includes component "AA" which is not defined by the schema, the composite document in FIG. 23 causes an error in validity check (step S11). In this case, a message "document store failure" is returned to the client terminal via the document storing device 21 and result processing device 12 (step S12).

For example, the display of the client terminal displays a message shown in FIG. 35.

A case will be described below with reference to FIG. 20 wherein append command "appendXML("uix://root/patent DB", "<patent> . . . </patent>")" is received when the structured document database is in the state shown in FIG. 14. As in the above case, object ID "#2" of document object Ox0 is acquired (step S5). Since this document object includes a schema (step S8), a composite document is generated in step S9.

Figure 21:
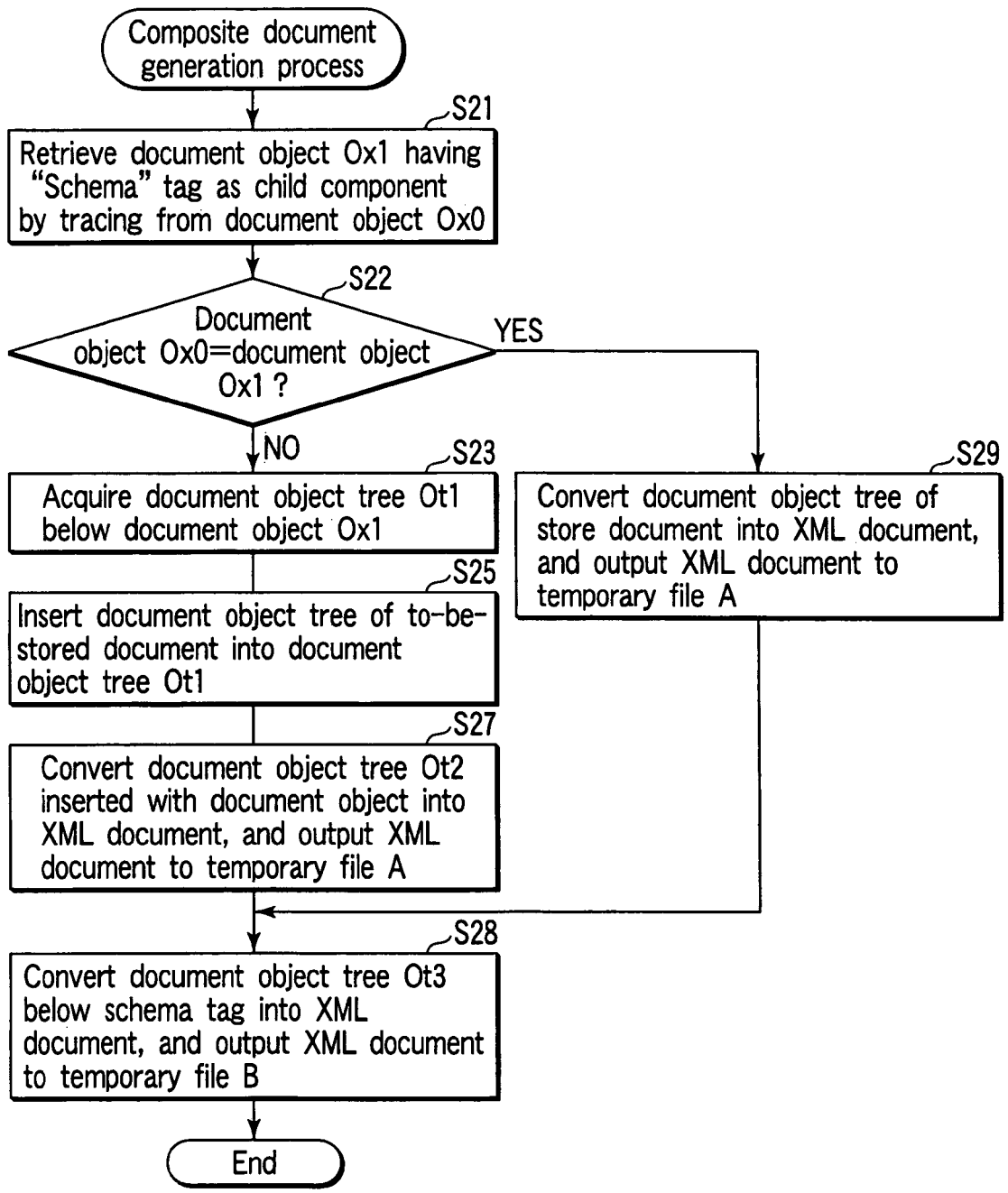
FIG. 21 is a flow chart for explaining the process in step S9 (the process of a composite document generating device) in FIG. 20.

In this case, since node "#2" itself as document object Ox0 is linked to a node having a "Schema" tag as a top (head) tag (node "#3"), this node "#2" becomes document object Ox1 (step S21 in FIG. 21). That is, since document objects Ox0 and Ox1 are the same (step S22), the flow advances to step S29, and the document object tree of the to-be-stored document "<patent> </patent>"is converted into an XML document and is output to temporary file A (step S29).

For example, as shown in FIG. 24, "patent" information as the to-be-stored document, i.e., "<patent> . . . </patent>" in this case, is output to temporary file A ("tmp000.xml"). Also, temporary file A describes link information "xmls="x-schema:tmp001.xml"" to temporary file B ("tmp001.xml").

The flow then advances to step S28. As shown in FIG. 25, the XML document obtained by converting the document object tree of the schema, which has node "#3" as a top node, is output to temporary file B.

When the validity between the composite document shown in FIG. 24 and the schema shown in FIG. 25 is checked in step S10 in FIG. 20, the document structure of the composite document matches that defined by the schema. In this case, the flow advances from step S11 to step S13.

In step S13, the document object tree of the to-be-stored document is appended below document object Ox0. That is, the document storing device 21 assigns object IDs to respective document objects (files) which form the document object tree of the to-be-stored document, and document object Ox0 is linked to the head document object of the document object tree of the to-be-stored document. The document-object-tree storing device 31 stores document objects (files) which form the document object tree of the to-be-stored document in the document storage 5.

The flow then advances to step S14 to update the indices in the index storage 6.

If it is determined in step S8 that document object Ox0 has an attribute value "0", validity checking of the document structure of the composite document using the schema is skipped, and the flow jumps to step S13. Then, the document object tree of the to-be-stored document is appended below document object Ox0 (step S13), and the indices in the index storage 6 are updated accordingly (step S14).

(1-2) Document Acquiring Process

The document acquiring processing operation of the structured document management system shown in FIG. 1 will be described below with reference to the flow chart shown in FIG. 26.

Figure 26:
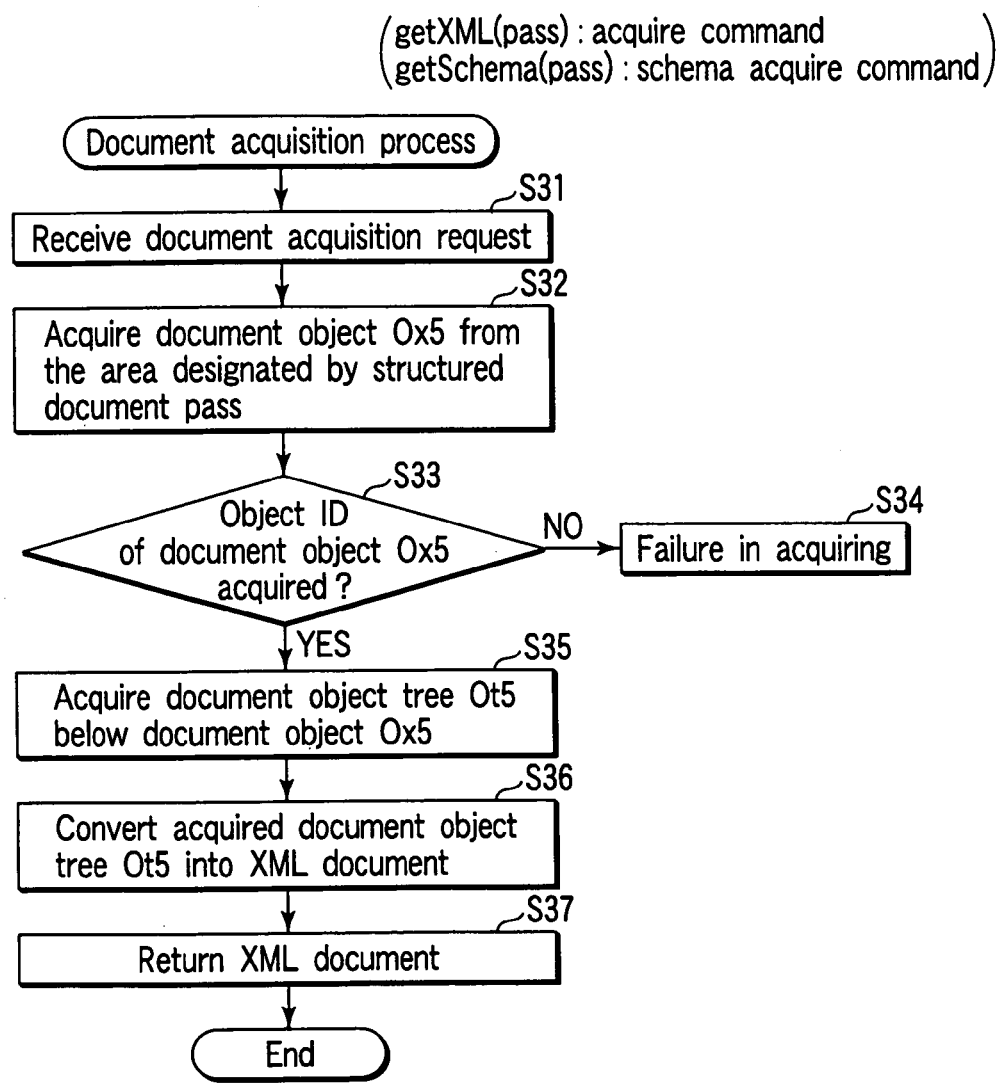
FIG. 26 is a flow chart for explaining a document acquiring processing operation of the structured document management system shown in FIG. 1.

When one of an acquire command and schema acquire command is sent as a document acquire request from the client terminal 102 to the structured document management system 100, and is received by the request receiving device 11, the processing operation shown in FIG. 26 is executed.

Figure 36:
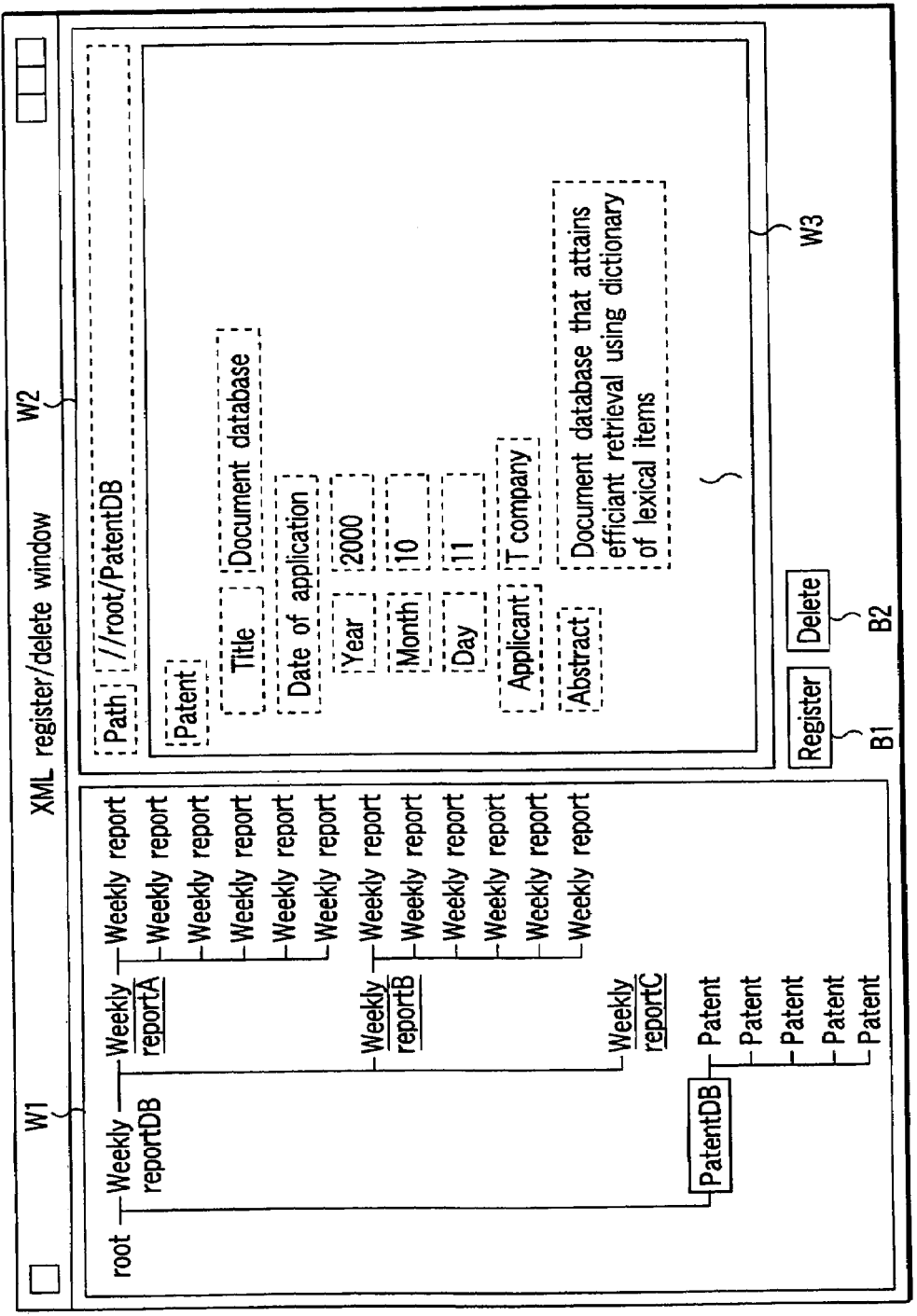
FIG. 36 shows a display example of a window as a user interface for storing/deleting a document, and is a view for explaining a document acquiring operation.

For example, when the user selects "patent DB" of region W1 on the document store/delete window shown in FIG. 36 using, e.g., the mouse, "uix://root/patent DB" is displayed on structured document pass input region W2, and acquire command "getXML("uix://root/patent DB")" is sent to the structured document management system.

A case will be exemplified below wherein acquire command "getXML("uix://root/patent DB")" is received when the structured document database is in the state shown in FIG. 8.

Upon receiving the acquire command, the request receiving device 11 passes structured document pass "uix://root/patent DB" as a parameter in the acquire command to the document acquiring device 22 (step S31).

The document acquiring device 22 passes the structured document pass to the document-object-tree acquiring device 43. The document-object-tree acquiring device 43 specifies a physical area in the document storage 5 based on the structured document pass to extract a node (document object Ox5) which is present in that area and is designated by the structured document pass (step S32). If the structured document pass is correctly designated, since the object ID of document object Ox5 can be acquired (step S33), the flow advances to step S35 in such case.

For example, in case of the above acquire command, since node "#2" corresponds to document object Ox5, "#2" is acquired as its object ID, and document object tree Ot5 (node "#2", nodes "#42" to "#49", nodes below node "#52", and nodes below node "#62") below node "#2" is acquired (step S35).

If no document object Ox5 corresponding to the designated structured document pass is found in step S32, an error occurs (step S33), and a message "document acquire failure" is returned to the client terminal via the document acquiring device 22 and result processing device 12 (step S34).

Document object tree Ot5 acquired in step S35 is converted into an XML document by the document-object-tree converting device 44. For example, in case of the above acquire command, the acquired XML document includes that of three pieces of "patent" information, as shown in FIG. 11.

The document acquiring device 22 returns the XML document shown in FIG. 11 to the client terminal together with a predetermined style sheet (e.g., XSL (extensible Style Language) via the result processing device 12 (step S37).

The client terminal 102 converts the XML document shown in FIG. 11 into HTML data using the style sheet, and displays the converted data on region W2, as shown in, e.g., FIG. 36.

Using XSL, an XML document can be converted into various formats. That is, an XML document can be converted into that having another document structure, or an HTML page can be generated from the XML document.

(1-3) Document Deleting Process

The document deleting processing operation of the structured document management system shown in FIG. 1 will be described below with reference to the flow chart shown in FIG. 27.

Figure 27:
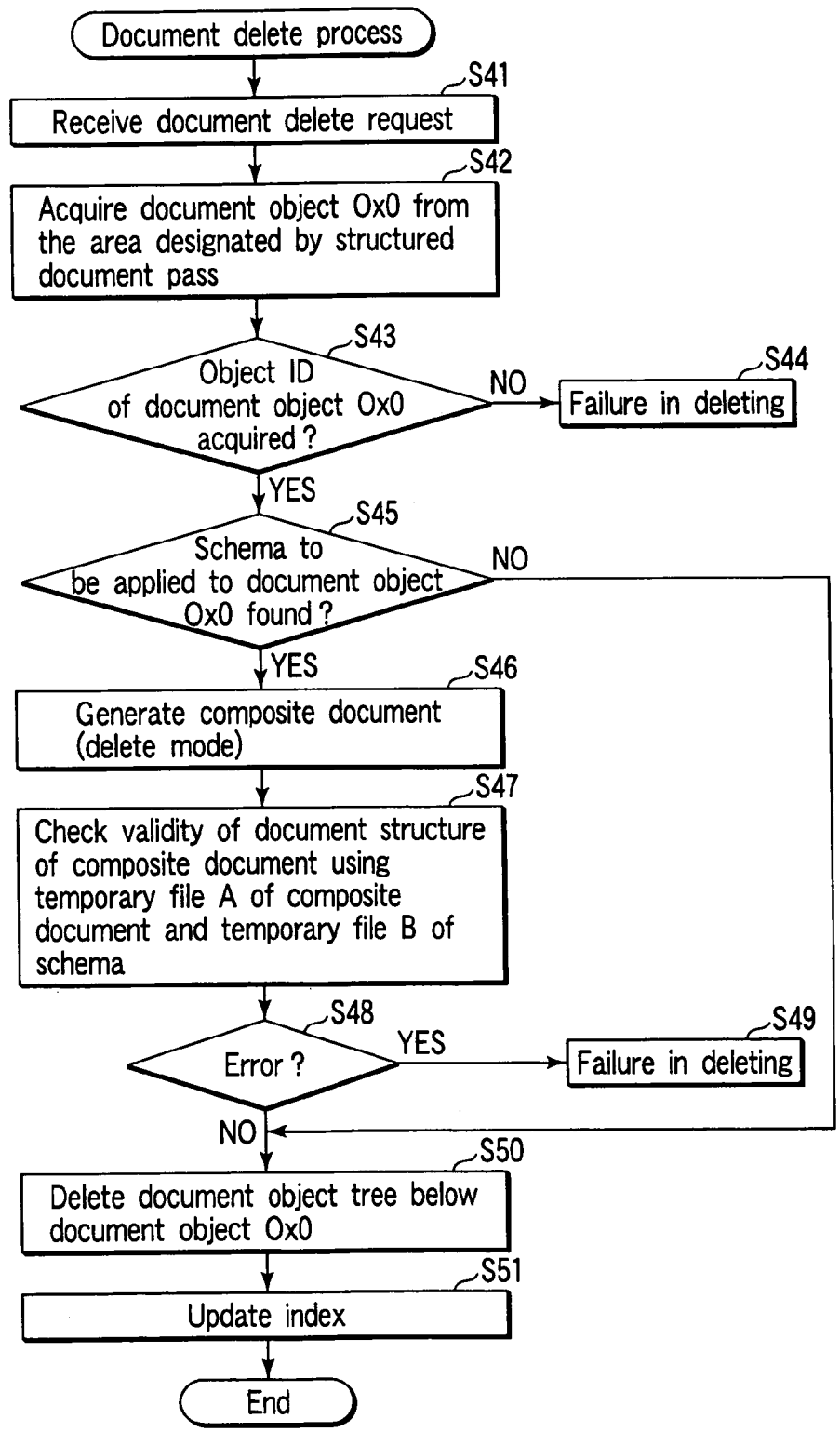
FIG. 27 is a flow chart for explaining a document deleting processing operation of the structured document management system shown in FIG. 1.

When a delete command is sent as a document delete request from the client terminal 102 to the structured document management system 100, and is received by the request receiving device 11, the processing operation shown in FIG. 27 is executed.

For example, when the user selects "patent DB" of region W1 on the document store/delete window shown in FIG. 36 using, e.g., the mouse, "uix://root/patent DB" is displayed on structured document pass input region W2. Furthermore, when the user selects "delete" button B2, delete command "removeXML("uix://root/patent DB")" is sent to the structured document management system 100.

A case will be exemplified below wherein delete command "removeXML("uix://root/patent DB/patent [0]/date of application") is received when the structured document database is in the state shown in FIG. 14.

Upon receiving the delete command, the request receiving device 11 passes structured document pass "uix://root/patent DB/patent [0]/date of application" as a parameter in the delete command to the document deleting device 23.

The document deleting device 23 passes the structured document pass to the document-object-tree acquiring device 43. The document-object-tree acquiring device 43 specifies a physical area in the document storage 5 based on the structured document pass, thus extracting a document object tree which contains a node (document object Ox0) which is present in that area and is expressed by the structured document pass (step S42). If the structured document pass is designated correctly, since the object ID of document object Ox0 can be acquired (step S43), the flow advances to step S45 in that case.

For example, in case of the above delete command, since node "#44" corresponds to document object Ox0, "#44" is acquired as its object ID. Furthermore, a document object tree containing node "#44" (for example, a document object tree made up of all descendant nodes of node "#44", all (brother) nodes in the same layer as node "#44", node "#42" as a parent node of node "#44", and node "#2" as its parent node) is acquired.

If no document object Ox0 corresponding to the designated structured document pass is found, an error occurs (step S43), and a message "document delete failure" is returned to the client terminal via the document storing device 21 and result processing device 12 (step S44).

It is checked in step S45 if document object Ox0 includes a schema. This checking step can be done by checking the attribute value since the attribute value is described in each document object file, as described above. If the attribute value of document object Ox0 is "1", the flow advances to step S46.

The process in step S46 in FIG. 27 (the process of the composite document generating device 47 (for a delete command)) will be described in detail below with reference to the flow chart shown in FIG. 28.

Figure 28:
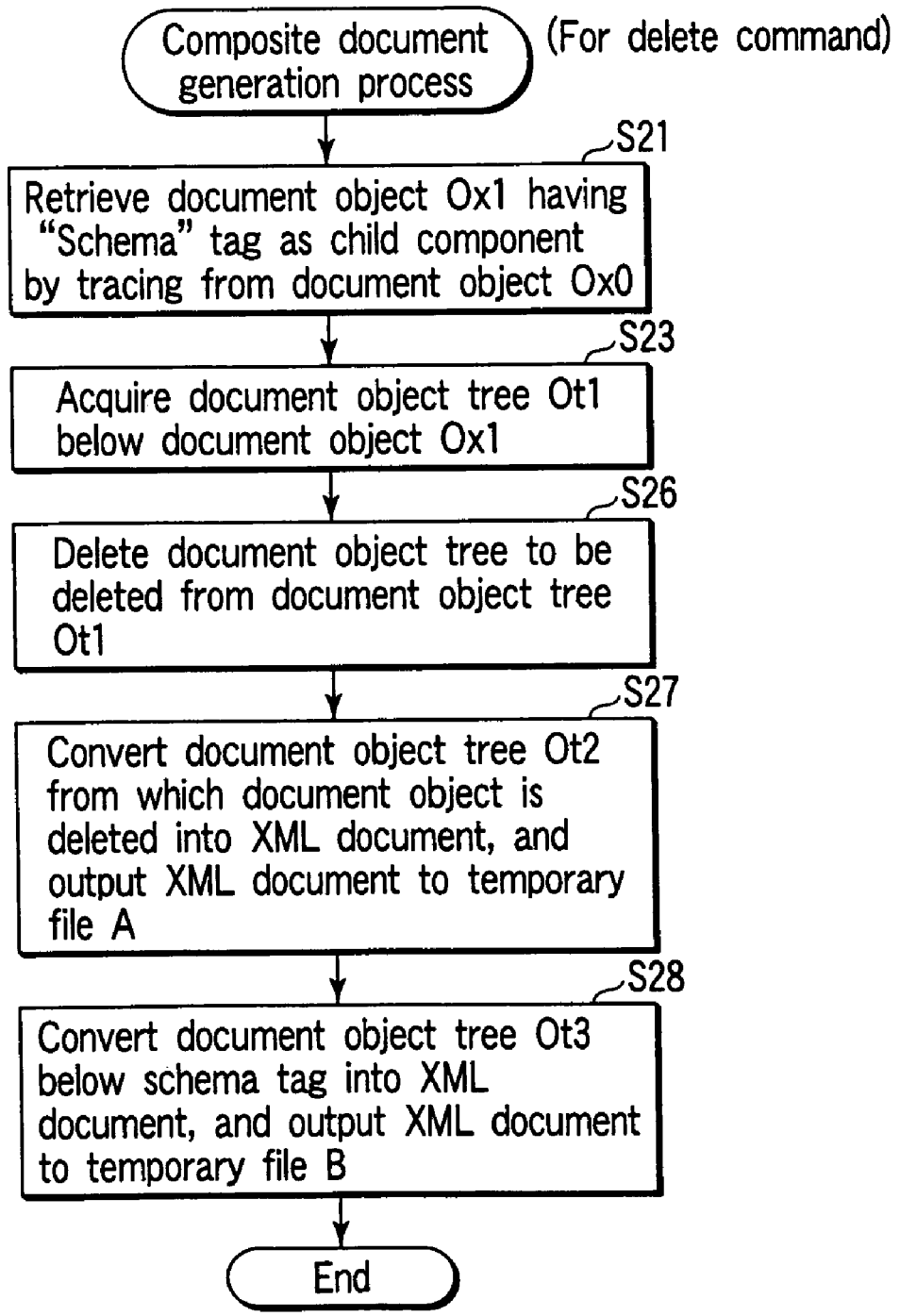
FIG. 28 is a flow chart showing the process in step S46 (the process (for a delete command) of the composite document generating device) in FIG. 27.

Note that the same reference numerals in FIG. 28 denote the same steps as in FIG. 21.

The document storing device 21 passes the document object tree acquired in step S42 to the composite document generating device 47.

The composite document generating device 47 searches for document object Ox having a "Schema" tag as a child component by tracing this document object tree from document object Ox0 (step S21).

For example, in the structured document database shown in FIG. 14, since node "#2" as a parent node of node "#42" as document object Ox0 is linked to a node (node "#3") which has a "Schema" tag as a top (head) tag (it has a "Schema" tag as a child component), this node "#2" corresponds to document object Ox1.

By tracing arcs from this document object Ox1 to document object Ox0 and further from document object Ox0, document object tree Ot1 which is located downstream document object Ox0 and is made up of all child nodes with a document object attribute value "1" is extracted (step S23).

For example, when the structured document pass of the parameter in the delete command is designated as "uix://root/patent DB/patent [0] /date of application", document object tree Ot1 is made up of nodes "#42" to "#49" (see FIG. 14).

The flow then advances to step S26, and a document object tree below document object Ox0 is deleted from document object tree Ot1. As a result, new document object tree Ot2 is obtained.

This document object tree Ot2 is converted into an XML document, which is output to temporary file A (step S27).

For example, FIG. 29 shows an XML document obtained by converting document object tree Ot2 of a composite document, which is obtained by deleting the document object tree below node "#44" designated by structured document pass "uix://root/patent DB/patent [0] /date of application" of the parameter in the delete command from document object tree Ot1 made up of nodes "#42" to "#49". This composite document is obtained by deleting data "<date of application></date of application>" from "patent" information which is stored so far.

The XML document shown in FIG. 29, i.e., the composite document is output to and temporarily stored in temporary file A.

On the other hand, document object tree Ot3 below the schema tag is converted into an XML document, which is output to temporary file B (step S28). That is, temporary file B temporarily stores a schema document.

For example, FIG. 30 shows an XML document obtained by converting a document object tree having node "#3" as a top node, i.e., document object tree Ot3. The XML document shown in FIG. 30 is output to and temporarily stored in temporary file B.

The description will revert to FIG. 27.

In step S47, the document deleting device 21 supplies temporary file A of the composite document and temporary file B of the schema to the document parser device 46 to make it check the validity of the document structure of the composite document as in the document storage process.

For example, when the validity is checked using the composite document shown in FIG. 29 and the schema shown in FIG. 30, since the composite document does not include any component "date of application" which is defined by the schema, the composite document in FIG. 29 causes an error in validity check (step S48). In this case, a message "document delete failure" is returned to the client terminal via the document storing device 21 and result processing device 12 (step S49).

When delete command "removeXML("uix://root/patent DB/patent [0]")" is processed according to FIG. 27 while the structured document database is in the state shown in FIG. 14, the composite document shown in FIG. 24 is output to temporary file A in step S27 in FIG. 28. Temporary file B is the same as that shown in FIG. 30.

At this time, when the validity is checked using the composite document shown in FIG. 24 and the schema shown in FIG. 30, since the document structure of the composite document matches that defined by the schema, the flow advances from step S48 to step S50.

In step S50, a document object tree below document object Ox0 is deleted. That is, the document-object-tree deleting device 42 deletes document objects (files) which form the document object tree below document object Ox0 from the document storage 5. For example, files of document objects below node "#42" are deleted from node "#2".

The flow then advances to step S51 to update the indices in the index storage 6. Also, "patent [0]" disappears from region W1 on the display window shown in FIG. 36 of the client terminal 102.

If it is determined in step S45 that document object Ox0 has an attribute value "0", validity checking of the document structure of the composite document using the schema is skipped, and the flow jumps to step S50. Then, the document object tree below document object Ox0 is deleted (step S50), and the indices of the index storage 6 are updated accordingly (step S51).

(1-4) Setting of Schema, Document Storage Using Schema

When the user selects "Schema setting" on the window shown in FIG. 31 using a pointing device such as a mouse or the like, a window as a user interface for setting a schema is displayed, as shown in FIG. 37.

When the user inputs a schema of ∂patent" information shown in, e.g., FIG. 12 on region W3, and wants to set the input schema for nodes below "patent DB", the user selects "patent DB" on region W1 by clicking it using the mouse or the like ("uix://root/patent DB" is displayed on region W2), and then selects "schema setting" button B3. Then, schema store command "setschema ("uix://root/patent DB", "<Schema> . . . </Schema>")" is sent to the structured document management system 100. The processing of this command is the same as the aforementioned document storing processing operation (see FIG. 20).

A case will be explained below wherein "patent" information is input using the schema already set for the nodes below "patent DB" upon storing "patent" information below "uix://root/patent DB".

The schema is acquired first. For example, when the user selects "schema" from region W1 on the document store/delete window shown in, e.g., FIG. 38 using the mouse or the like, "uix://root/patent DB/#Schema" is displayed on document pass input region W2, and schema acquire command "getXML("uix://root/patent DB/#Schema")" is sent to the structured document management system.

The processing of this command is the same as the aforementioned document acquiring process (see FIG. 26). An XML document returned from the structured document management system is displayed on region W3 of the window shown in FIG. 38.

Figure 38:
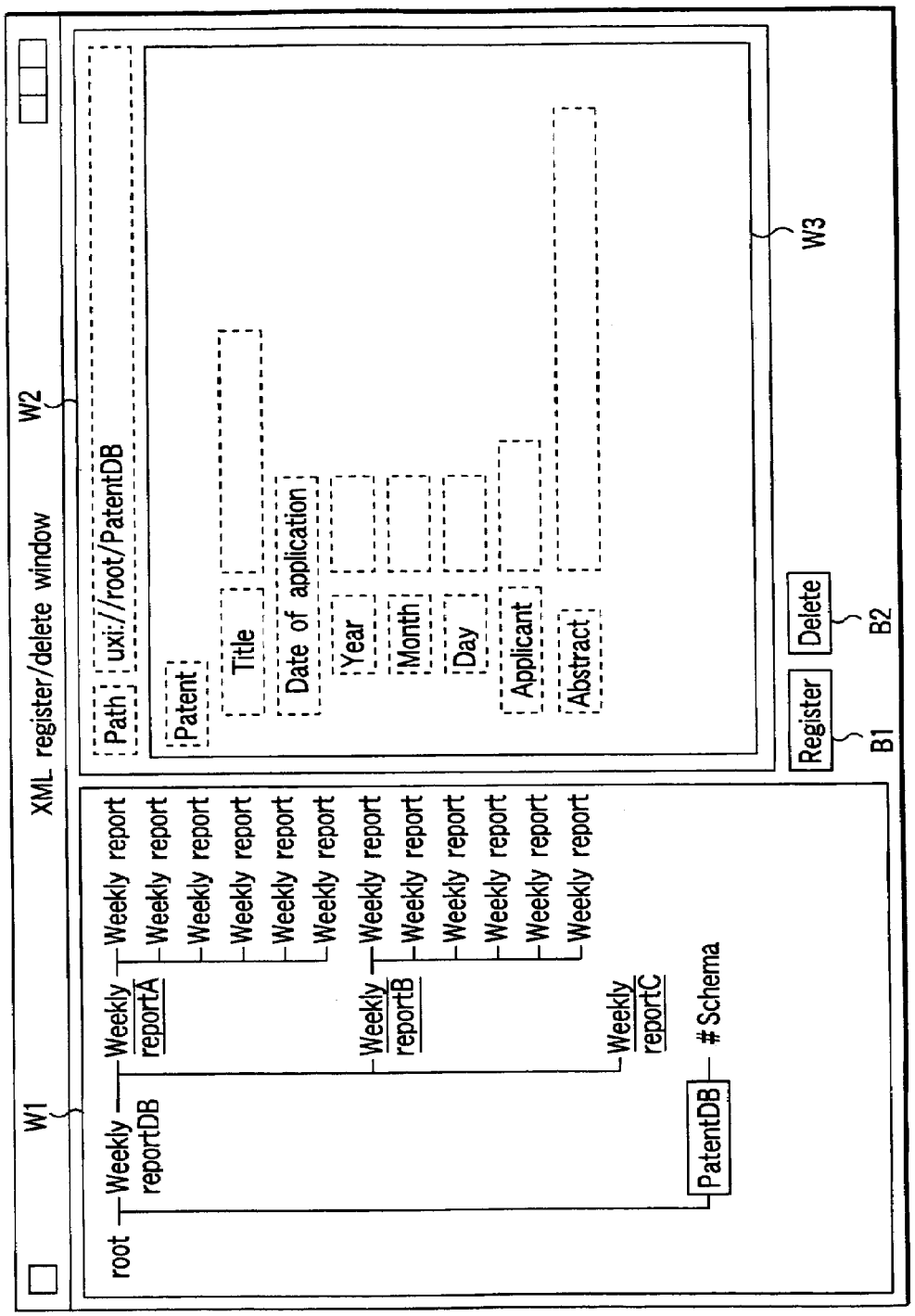
FIG. 38 shows a display example of a window as a user interface for acquiring a schema, i.e., a display example of the acquired schema.

As shown in FIG. 38, region W3 displays data input fields of "patent" information set for respective components. The user can input data according to this display. For example, data input fields "title", "year", and the like are hierarchically laid out and displayed. When the user inputs data on these data input fields, he or she can easily generate a to-be-stored document with the document structure defined by the schema.

When the user selects "patent DB" on region W1 as a storage destination of "patent" information input on region W3 using the mouse or the like, "uix://root/patent DB" is displayed as the structured document pass on region W3. When the user then selects "register" button B1, append command "appendXML("uix://root/patent DB", "<patent> . . . </patent>")" is sent to the structured document management system.

In this case, since the to-be-stored document is input in advance according to the schema, no error occurs in validity check in step S10 in FIG. 20.

(2) Retrieval Function

A retrieval-system command in the structured document management system shown in FIG. 1 includes: query (q1).

The "query" is a command which executes query q1 in ( ) as a parameter, and acquires an XML document as a result of the query (to be referred to as a retrieval command hereinafter).

The query is a structured XML document, which describes the retrieval location, retrieval condition, information extraction portion, and the like using a language in a format similar to SQL (Structured Query Language). The query document is also stored in the structured document database and managed by the structured document management system.

A component starting from a "kf:from" tag describes designation of a retrieval location, and correspondence between the value of a document element and variable, a component starting from a "kf:where" tag describes a condition associated with a variable, and a component starting from a "kf:select" tag describes an output format of a retrieval result.

Retrieval includes plain retrieval and conceptual retrieval. Plain retrieval retrieves and extracts information which satisfies the retrieval condition designated in a query, and conceptual retrieval retrieves and extracts information which satisfies the retrieval condition using concept information designated in a query.

FIG. 40 shows an example of a query for plain retrieval. The query shown in FIG. 40 means a retrieval request "to list "title" of documents ("patent" information) having component "abstract" with contents (values) like "PC" and like "1999"" in documents of "patent" information stored below a node indicated by arc "patent DB" in the structured document database in the state shown in, e.g., FIG. 14.

By a description of a component starting from a "kf:from" tag, values of document components "title", "year", and "abstract" are substituted in variables "$t", "$y", and "$s".

By a description of a component starting from a "kf: where" tag, comparison of variable "$y"="1999" is made. Component "MyLike" is a function for detecting variable "$s" with a value similar to "PC" using variables "$s" and "PC" as arguments.

By a description of a component starting from a "kf:from" tag, variable "$t" is used as an output value.

Note that a "kf:start" tag is ambiguous expression of a structure. For example, "<patent><kf:star><year>" means "a component which is present somewhere as a child component of a component with tag name "patent" and has tag name "year"".

FIG. 41 shows the retrieval result using the query of simple retrieval shown in FIG. 40. This retrieval result is also an XML document.

FIG. 42 shows an example of a query for conceptual retrieval. The query shown in FIG. 42 is a retrieval request to search documents of "patent" information stored below a node designated by arc "patent DB" using "concept" information to the structured document database in the state shown in, e.g., FIGS. 18 and 19. Note that child concept components of the concept component "peripheral device" include concepts "SCSI", "memory", "HDD", and the like. Although not shown in FIG. 18, components of "patent" information include a component starting from a "keyword" tag.

That is, the query shown in FIG. 42 means a retrieval request "to list " title" of documents ("patent" information) having one of concepts below concept "peripheral device" as values of component "keyword"".

By a description of a component starting from a "kf:from" tag in the query shown in FIG. 42, values of the components "title" and "keyword" of "patent" information are substituted in variables "$t" and "$k". Also, values ("SCSI", "memory", "HDD", and the like) of child concept components of a concept component "peripheral device" substituted in variable "$x".

By a description of a component starting from a "kf: where" tag in the query shown in FIG. 42, comparison of "$k"="peripheral device" or "$k"="$x" is made.

Figure 43:
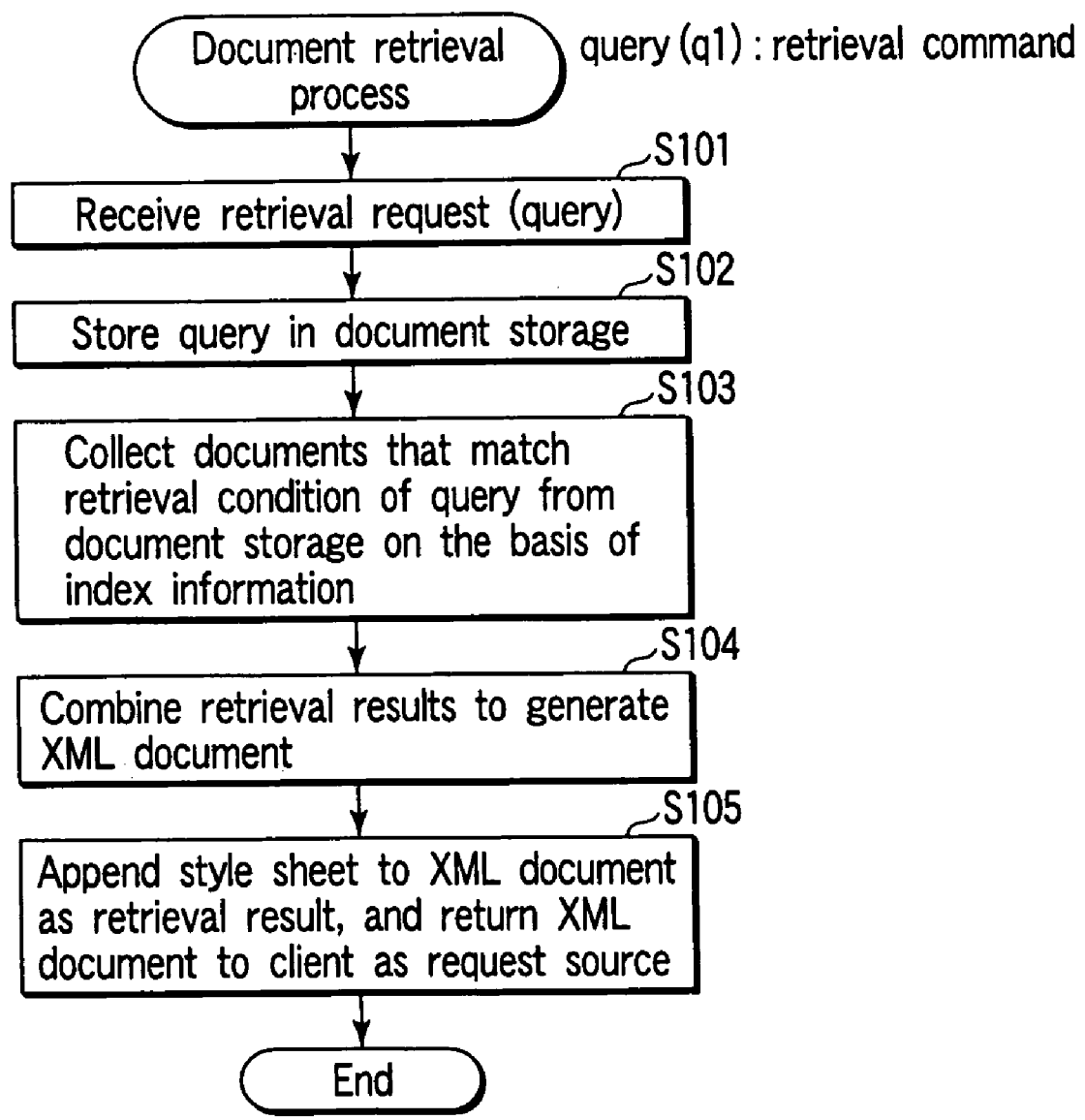
FIG. 43 is a flow chart for explaining a document retrieval processing operation of the structured document management system shown in FIG. 1.

The document retrieval processing operation of the structured document management system shown in FIG. 1 will be described below with reference to the flow chart shown in FIG. 43.

Figure 44:
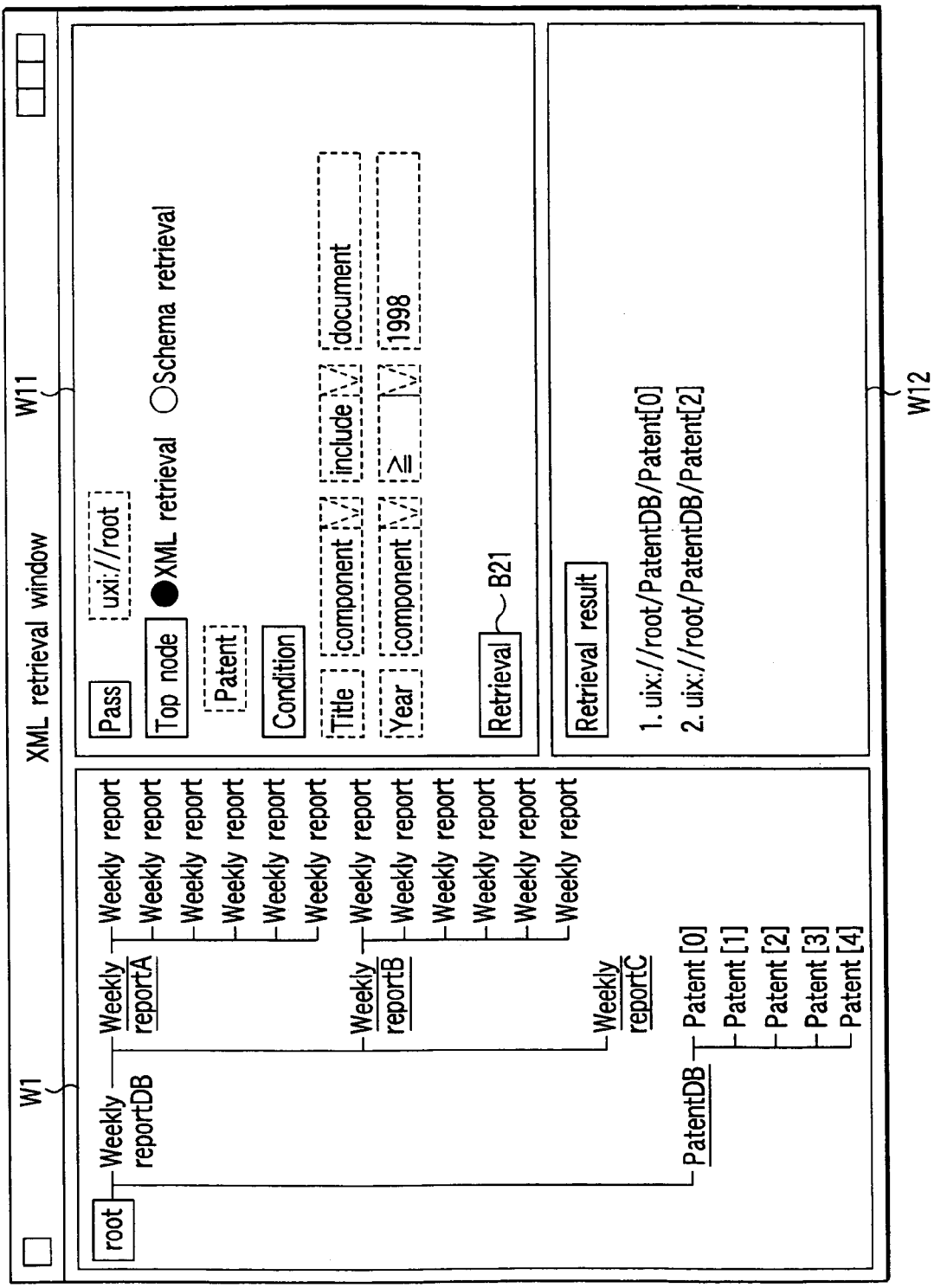
FIG. 44 shows a display example of a window as a user interface for retrieving documents.

When the user selects "XML retrieval" on the window shown in FIG. 31, a window as a user interface used to make document retrieval shown in FIG. 44 is displayed.

On the retrieval window shown in FIG. 44, region W1 displays component names (tag names) of the current tree structure of the structured document database in a simplified form so that the user can understand, as in the above description.

Region W11 is a region for inputting a retrieval range (retrieval range on the tree structure), retrieval condition, and the like. Region W12 displays a retrieval result.

For example, in case of a retrieval request "to retrieve documents in which a "title" component (includes or has) a value including a character string "document" and which was generated after "1998" from documents including "patent DB" as head tags below "uix://root"", the user selects "root" from region W1 using the mouse or the like, thereby inputting the structured document pass as a retrieval range. Then, the user inputs "patent DB" as a top node (in this case, the user may select "patent DB" from region W1 to input the top node). Then, the user inputs, as a retrieval condition, "value of component "title" includes character string "document"" and "value of component "year" is equal to or larger than "1998"" on a predetermined data input region.

After that, when the user selects "retrieval" button B21, for example, a query shown in FIG. 45 is sent to the structured document management system together with an append command for storing that query in the structured document database. The query storage location is determined in advance, and the system side automatically sets parameters of this append command. For example, when the structured document database is in the state shown in FIG. 18, the structured document pass as a parameter indicating the storage location of the query is "uix://root/query DB". Also, the other parameter of the append command is the query document itself.

Upon receiving the query (step S101 shown in FIG. 43), the request receiving device 11 passes that query to the retrieval request processing device 3. Also, the request receiving device 11 passes the parameters of the append command for storing that query document to the document storing device 21. This append command is processed in the same manner as described above, and the query is stored in the document storage 5 (step. S102).

Figure 46:
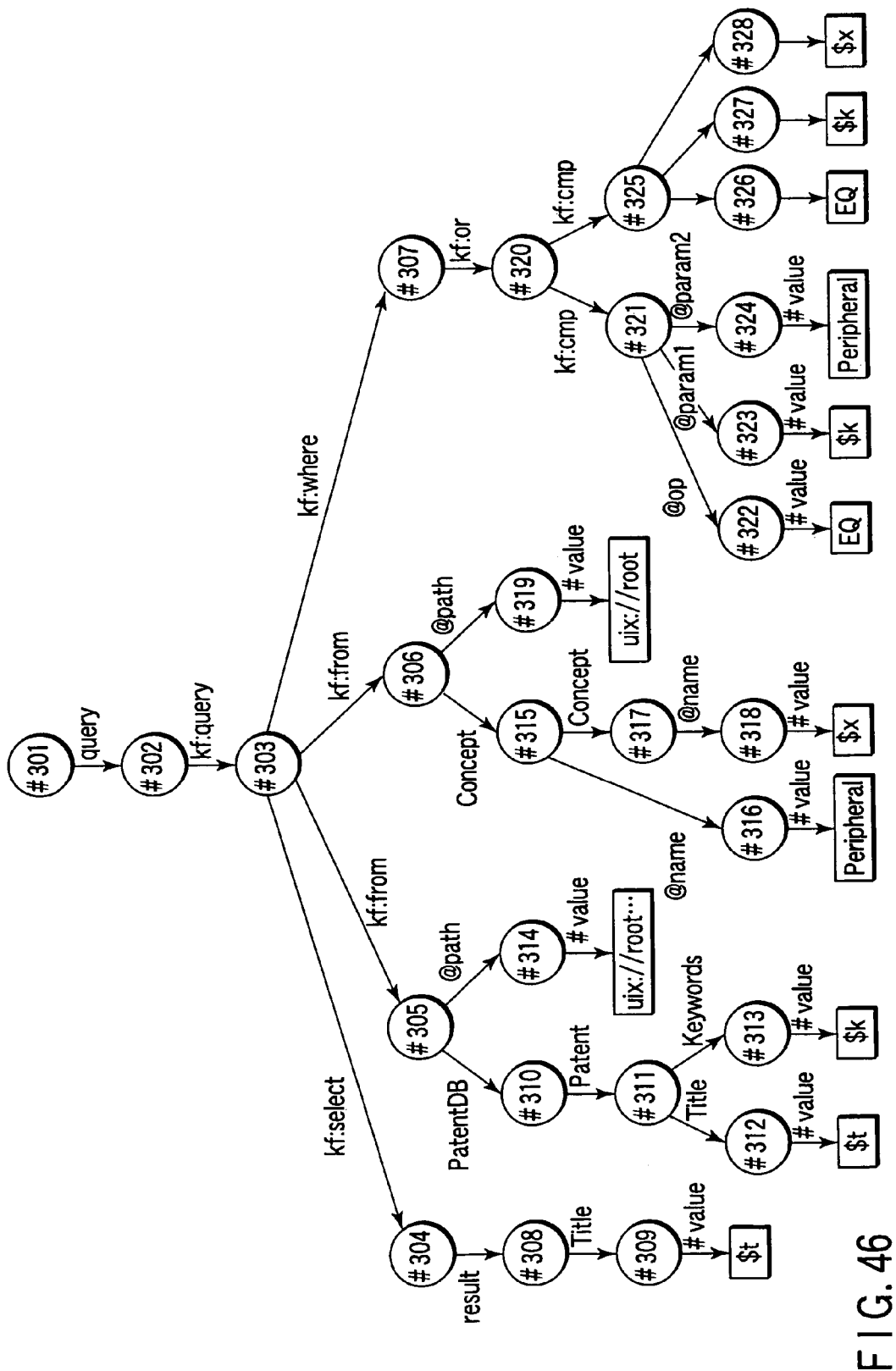
FIG. 46 shows a storage example of the query shown in FIG. 42 in the structured document database.

For example, in case of the query shown in FIG. 42, the query is evolved, as shown in FIG. 46, and is linked below node "#301" designated by structured document pass "uix://root/query DB".

On the other hand, the retrieval request processing device 3 accesses the index storage 6 and document storage 5 via the data access device 4 to acquire a set of documents which match the retrieval request, extracts information requested in the query, and outputs the extracted information via the result processing device 12.

For example, in case of the above query, this process is efficient to narrow down documents to be retrieved to those that match the condition "title" component includes a value including character string "document" first. Hence, object IDs of nodes (document objects) linked to the text including the character string "document" are obtained using the lexical index shown in FIG. 10. A document object tree is traced upstream by one node from each of the found nodes, and if tag name "title" is reached, the tree is traced further upstream. If tag name "patent" is reached, document object tree Ot11 below that node is extracted.

From a plurality of extracted document object trees Ot11, document object trees Ot12 in which the value of component "year" is equal to or larger than "1998" are extracted.

These document object trees Ot12 correspond to documents that match the retrieval condition of the query. Furthermore, according to the request contents of the query, a structured document pass to the top node of each document object tree Ot12 is obtained (step S103).

Note that the retrieval process is not limited to the aforementioned method, and various other efficient retrieval methods using index information are available.

The retrieval request processing device 3 combines results obtained in step S102 to generate an XML document as a retrieval result (step S104).

For example, the XML document as the retrieval result is expressed by:
<out>
<result>
uix://root/patent DB/patent[0]
</result>
<result>
uix://root/patent DB/patent[2]
</result>
</out>

The retrieval request processing device 3 returns the XML document to the client terminal together with a style sheet via the result processing device 12 (step S105).

The client terminal converts the XML document shown in FIG. 11 into HTML data using the style sheet, and displays that data on region W12, as shown in, e.g., FIG. 44.

Likewise, a schema can be retrieved.

Figure 47:
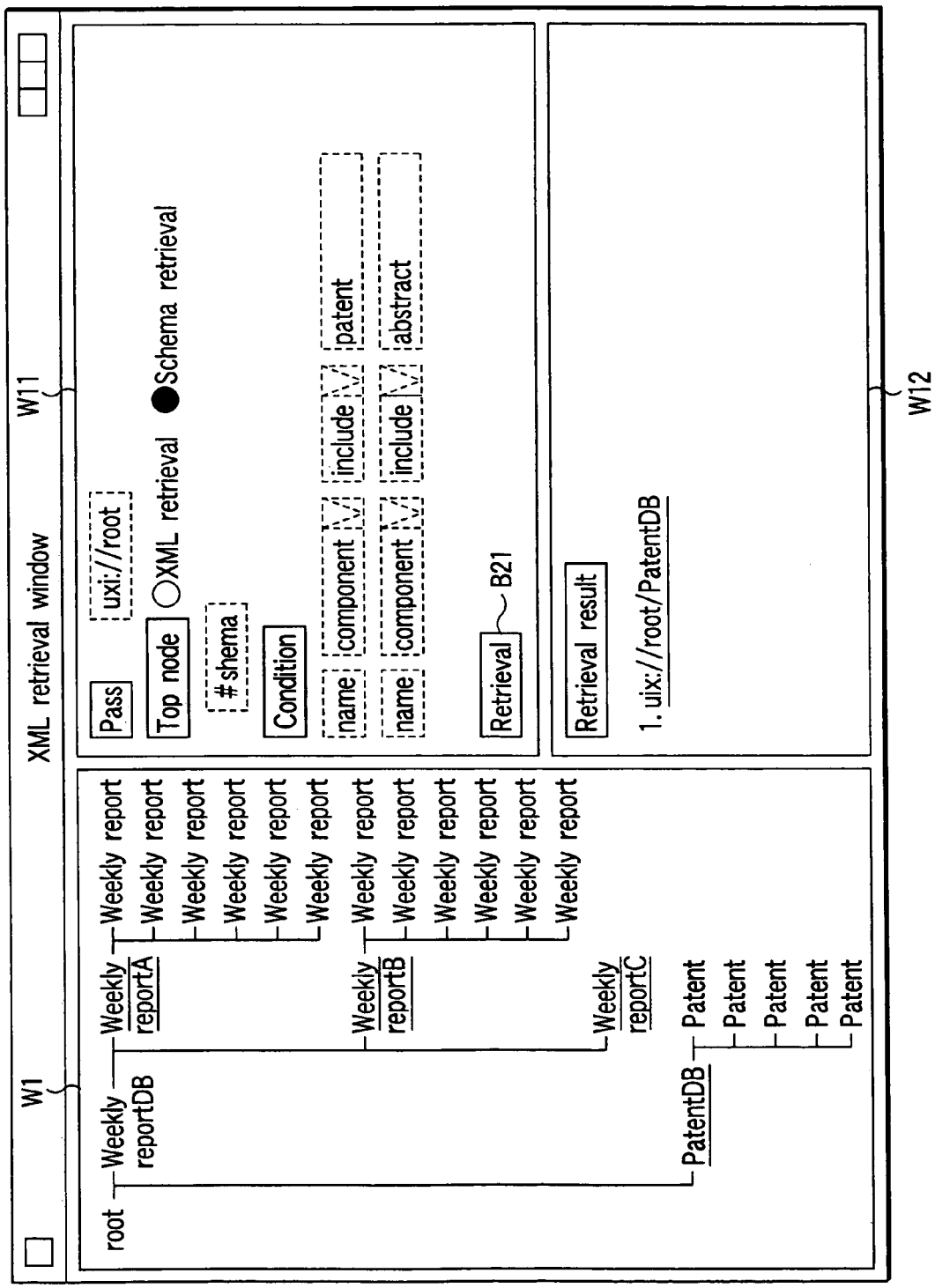
FIG. 47 shows a display example of a window as a user interface for retrieving documents, and is a view for explaining a schema retrieval processing operation.

For example, in case of retrieval request "to retrieve a schema having tag names "patent" and "abstract" from documents having "schema" as head tags below "uix://root"", the user selects "root" as a retrieval range from region W1 using the mouse or the like, and inputs the structured document pass, as shown in FIG. 47. Also, the user can input, as a retrieval condition, "name of component (component name) includes character string "patent"" and "name of component (component name) includes character string "abstract"" on the predetermined data input region.

After that, when the user selects "retrieval" button B21, a query (see FIG. 48) which describes the retrieval request is sent to the structured document management system together with an append command for storing that query in the structured document database.

In case of the above query, for example, documents which match the condition and have "#schema" as head tag" are retrieved. For this purpose, the object Ids of nodes (document objects) linked to component "#schema" are obtained using the structure index shown in FIG. 9. Arcs of a document object tree are traced downstream from each of the found nodes, and if components having component names "patent" and "abstract" are reached, document object tree Ot21 having "#schema" as a head tag is extracted. This document object tree Ot21 corresponds to a document that matches the query as shown in FIG. 48. Furthermore, according to the request contents of the query shown in FIG. 48, the structured document pass to the top node of each document object tree Ot21 is obtained.

If a plurality of document object trees Ot21 are found, the retrieval request processing device 3 adds up the structured document passes to their top nodes to generate an XML document as a retrieval result, and returns that XML document to the client terminal as a request source together with a style sheet via the result processing device 12.

The client terminal converts the XML document received as the retrieval result into HTML data using the style sheet, and displays that data on region W12, as shown in, e.g., FIG. 47.

When the user selects one schema in the retrieval result and instructs to display it at the client terminal, data input fields of "patent" information set for respective components are displayed on region W3 of the document store/delete window shown in, e.g., FIG. 38.

By inputting data on these data input fields, the user can easily generate a to-be-stored document with the document structure defined by the schema.

For example, when the user selects "patent DB" on region W1 as a storage destination of "patent" information input on region W3 of FIG. 38 using the mouse or the like, structured document pass "uix://root/patent DB" is displayed on region W2. After that, when the user selects "register" button B1, append command "appendXML("uix://root/patent DB", "<patent> ... </patent>")" is sent to the structured document management system.

In this case, since the to-be-stored document is input in advance according to the schema, no error occurs in validity check in step S10 in FIG. 20.

Likewise, a query can be retrieved. By retrieving a query, an existing query obtained as the retrieval result can be modified and re-used (re-use of query).

The query is retrieved in the same manner as the aforementioned retrieval process of structured documents, and a retrieval range corresponds to a partial document object tree on the structured document database where queries are stored.

A case will be explained below wherein a query which includes a character string "patent DB" in a component starting from a "kf:from" tag is retrieved from the structured document database in the state shown in, e.g., FIG. 18. FIG. 49 shows a query which describes such retrieval request.

The query shown in FIG. 49 means "to retrieve a query which includes "patent DB" in a component starting from a "kf:from" tag from those present below node "#301" designated by "uix://root/query DB", and to list contents (a document of a document object tree below a component having tag name "query") of that query".

Note that document object trees below components having tag name "query" of queries in which a component starting from a "kf:from" tag includes "patent DB" is substituted in variable "$elt" in accordance with the contents of a "kf:as" component.

When the retrieval request processing device 3 processes this query, the object IDs of nodes (document objects) linked to component "kf:from" are obtained using the structure index shown in FIG. 9, in the same manner as described above. Arcs of a document object tree are traced downstream from each of the found nodes, and if tag name "patent DB" is reached, arcs are further tracked upstream. If tag name "query" is reached, document object tree Ot31 having "query" as a head tag is extracted. This document object tree Ot31 corresponds to a document that matches the contents of the query as shown in FIG. 49.

If a plurality of document object trees Ot31 are retrieved, they are combined to integrate an XML document, which is returned to the client terminal together with a style sheet.

When the user selects one query in the retrieval result and instructs to display it at the client terminal, the contents of the retrieval request described in that query are displayed while data are input to respective data input fields on region W11 of the retrieval window shown in, e.g., FIG. 44.

Region W11 of the retrieval window in FIG. 44 displays a query "to retrieve documents in which character string "document" is included in the value of "title" component and which are generated after "1998" from documents having "patent DB" as head tags below "uix://root"".

From this state, when the user changes "document" in the retrieval condition to "XML" and selects "retrieval" button B21, a query "to retrieve documents in which character string "XML" is included in the value of "title" component and which are generated after "1998" from documents having "patent DB" as head tags below "uix://root"" is sent to the structured document management system.

As described above, the structured document management system shown in FIG. 1 handles a huge number of XML documents (contents documents, schema documents, query documents, and the like) having different document structures, which are registered on the structured document database) as one tree-like giant XML document starting from the "root" tag, as shown in FIGS. 18 and 19. Therefore, documents that match a retrieval condition can be easily retrieved from a huge number of documents having different document structures and various schemas.

Also, since a query used in retrieval is also a structured document, when the query is stored as a log in the structured document database, an application that re-uses old queries can be easily formed.

(3) Application Example

An application example of the conceptual retrieval to patent research will be explained below.

Figure 50:
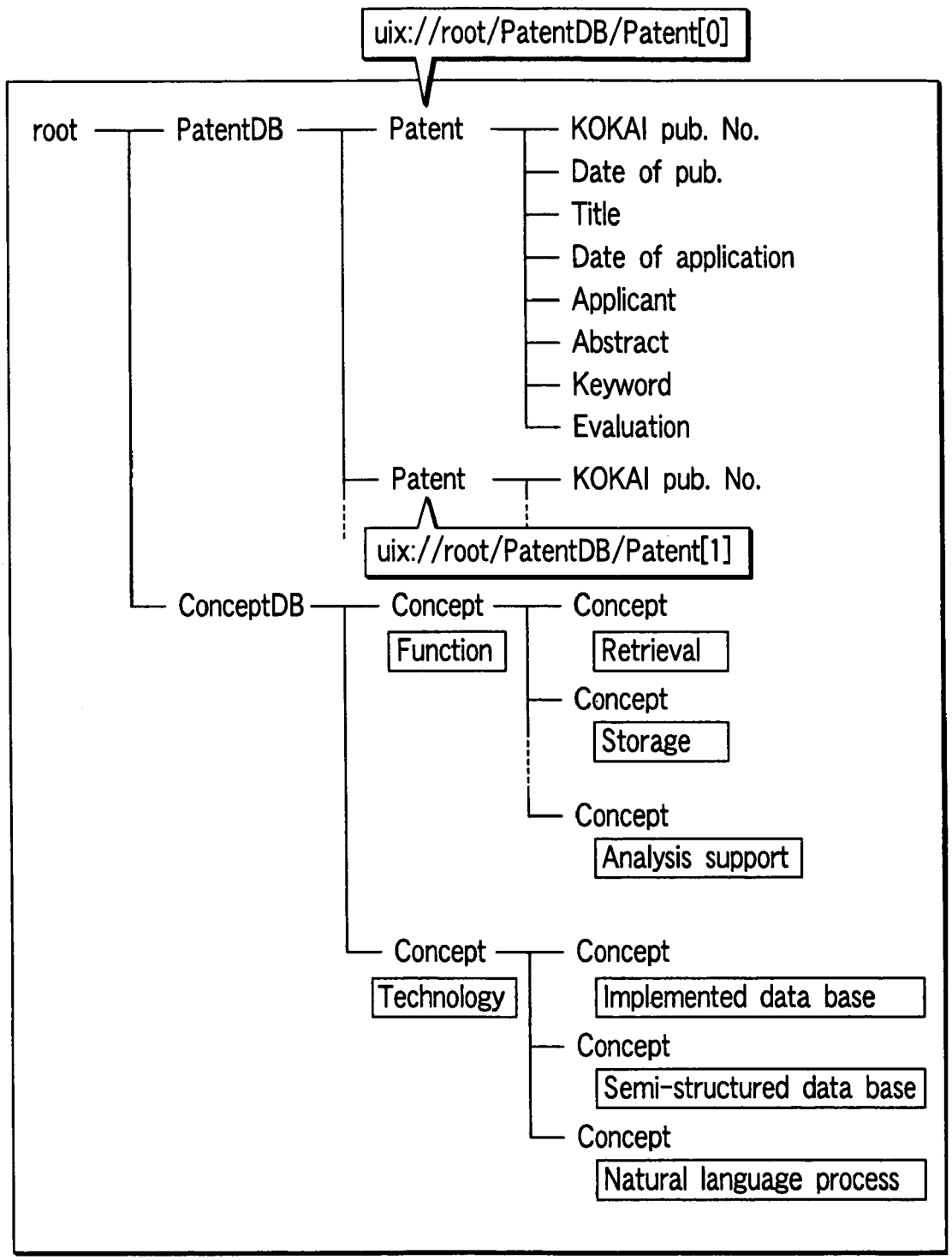
FIG. 50 shows an example of a structured document database in patent research.

FIG. 50 shows an example of a structured document database in patent research, which stores "concept" information in addition to "patent" information.

The most important operations in patent research are to acquire associated "patent" information, to analyze "patent" information from various viewpoints, and to generate a map (patent map) associated with patents, as shown in FIG. 54. In order to generate the patent map shown in FIG. 54, in a conventional method, arbitrary items to be set on the columns and rows of the table corresponding to the patent map are determined in advance, retrieval that uses arbitrary items set on the columns and rows as a retrieval condition is made sequentially. This process requires very high cost. However, when the structured document management system is used, cost required for this process can be greatly reduced.

Note that the map is used to classify and arrange retrieval results, which are obtained using arbitrary items set on the y-axis and x-axis as a retrieval condition, using the x- and y-axes as axes of classification.

When the user of the client terminal wants to generate the patent map shown in FIG. 54 using the structured document management system, he or she inputs the pass of "patent" information as an analysis range and components serving as axes (e.g., x- and y-axes) of analysis on regions W21 and W22 on a retrieval window shown in FIG. 51 with reference to the current tree structure (FIG. 50) displayed on a display device of the client terminal. The components serving as the axes of analysis may be selected from either components of "patent" information or those of "concept" information in the structured document database.

For example, in FIG. 51, the user inputs components "function" and "technology" of "concept" information as the x- and y-axes.

After that, when the user selects "execute" button B31, a query shown in FIG. 52 is sent from the client terminal to the structured document management system shown in FIG. 1.

The query shown in FIG. 52 is a retrieval request that means: "to retrieve "patent" information in which values of components "keyword", "abstract", and the like include one of child components of concept "function" and one of child components of concept "technology" which are stored below node indicated by arc "concept DB", from documents of "patent" information stored below a node indicated by arc "patent DB", and to list sets of child components of "function" and "technology" and "KOKAI pub. No." corresponding to "patent" information as a retrieval result".

As shown in FIG. 50, concept "function" includes child components "retrieval", "store", . . . , "analysis support", and concept "technology" includes child components "implemented database", "semi-structured database", "natural language process", . . . . Upon receiving the query, the retrieval request processing device 3 of the structured document management system obtains the object IDs of nodes (document objects) linked to text including one of child components (character strings) of concept "function" using the lexical index shown in FIG. 10. A document object tree is traced upstream for each of the obtained object IDs, and if tag "patent" is reached, a document object tree below that node is further traced downstream. At this time, if a tag name linked to text including one of child components (character strings) of concept "technology" is reached, that document object tree and a character string (component value) linked to a "KOKAI pub. No." tag in that document object tree are extracted.

Sets of child components of "function" and "technology", and "KOKAI pub. No." of the extracted "patent" information are combined to generate an XML document as a retrieval result, as shown in FIG. 53, and that XML document is returned to the client terminal as a request source together with a predetermined style sheet.

Upon receiving the XML document, the display of the client terminal displays the patent map in the form of a table, as shown in FIG. 54.

In this manner, by only designating desired concepts as items to be set on the "x-axis" and "y-axis", a plurality of pieces of information stored in the structured document database can be easily integrated and classified on the basis of the concepts designated as "axes", and can be displayed as a map. That is, a plurality of pieces of information stored in the structured document database can be easily integrated and classified from various viewpoints using "concept" information.

(Implementation Scheme of OLAP)

A scheme for implementing OLAP on the structured document database will be explained below. In this case, the scheme will be explained as an application example to conceptual retrieval.

Figure 55:
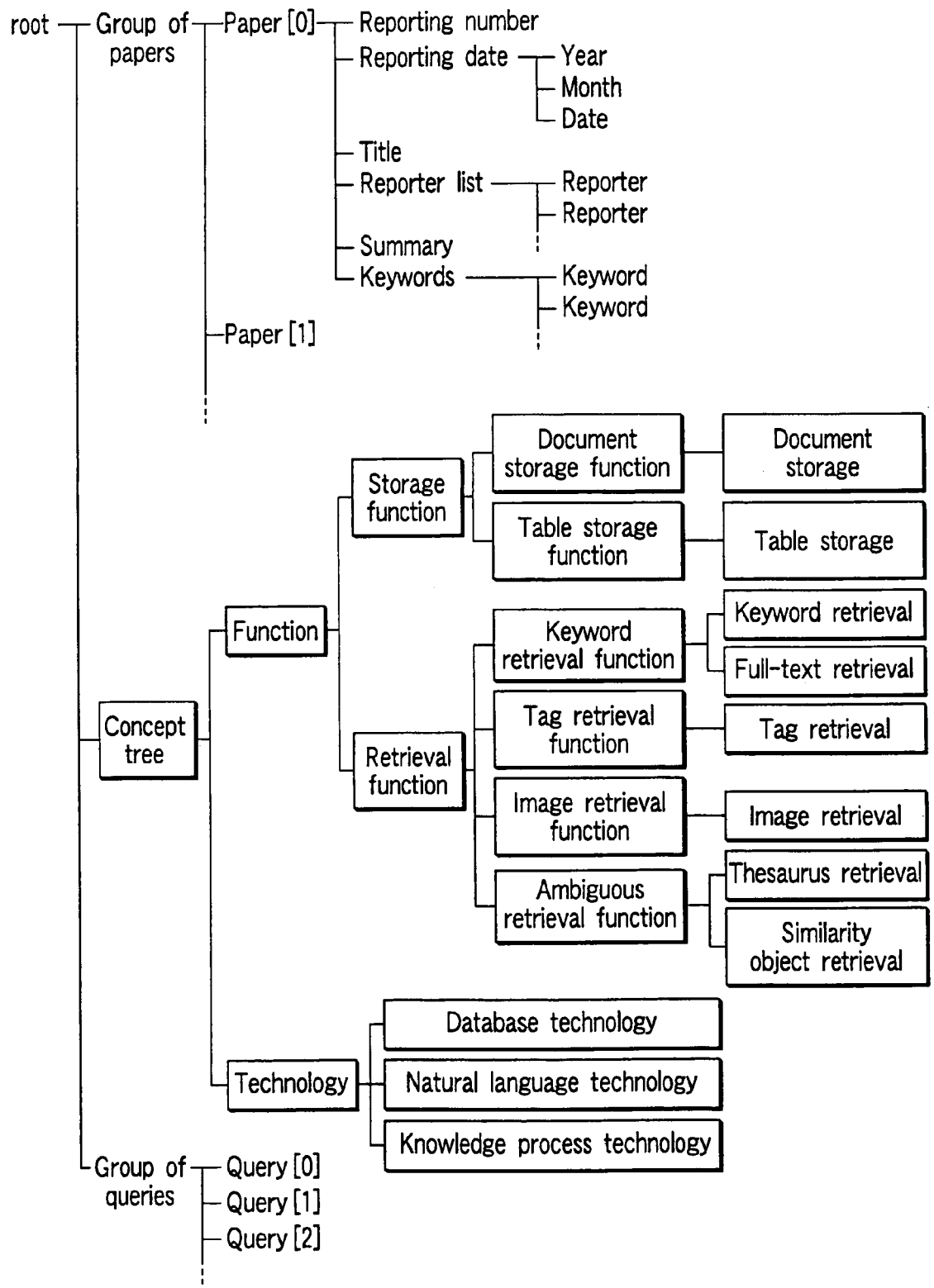
FIG. 55 shows an example of a structured document database.

FIG. 55 illustrates the logical structure of a structured document database, which stores "paper" information and "concept" information. That is, "paper" information ("paper" document) stored below node "group of papers", and "concept" information is stored below node "concept tree".

FIG. 56 shows an example of the "paper" information as an example of a structured document described in XML.

The document shown in FIG. 56 starts from a component having tag name (component name) "paper", and includes a set of components "reporting number", "reporting date", "title", "reporter list", "abstract", and "keywords". Also, components "reporting date", "reporter list", and "keywords" respectively include child components.

The structured document shown in FIG. 56 is stored on the structured document database while being logically evolved (evolved into a document object tree), as shown in FIG. 55.

FIG. 57 shows an XML document corresponding to a document object tree below node "concept tree" shown in FIG. 55.

When the XML document shown in FIG. 57 is stored on the structured document database, it is evolved into a document object tree, as shown in FIG. 55.

As shown in FIG. 55, "concept" information includes a plurality of concept items which are roughly classified into "function" and "technology" and classified hierarchically. For example, concept item "function" includes concept items "storage function" and "retrieval function", and "storage function" includes concept items "document storage function" and "table storage function", and "document storage function" includes concept item "document storage". Components (i.e., concept items) that form such hierarchically classified structure of "concept" information are managed as those of the structured document database.

Note that the structured document database shown in FIG. 55 pre-stores queries below node "group of queries". Each query stored in the structured document database has identification information (query ID) used to identify each query. Each query stored in the structured document database uses index expression in a structured document pass so as to identify each individual query. Hence, in this case, each query ID corresponds to the structured document pass to each query.

In this embodiment, retrieval is executed using a query that includes a retrieval condition including parameters corresponding to tag names (component names) and the words (for example, concept items) included in values of the components. And the retrieval result is categorized (classified) and displayed on a map using a style sheet. The map is a table being constructed by a plurality of cells arranged two-dimensionally, the cells including a plurality of column index cells and a plurality of row index cells and a plurality of data cells, the column index cells in which a plurality of column indexes are set respectively, the row index cells in which a plurality of row indexes are set respectively, and the data cells in which a plurality of data items are set respectively. The concept items are set at column indexes and row indexes of the map. The retrieved structured documents are categorized into one of data items of data cells of the map, based on the concept items which are included in the value of the desired component designated in the retrieval condition and included in each of the retrieved structured documents In this manner, the retrieval result is displayed as a map. This map has a region associated with window transition. The region associated with window transition is associated with a query ID and parameter values used in that query in advance. When the user designates that region, the associated query ID and parameter values are sent to the structured document management system. In the structured document management system, the received parameter values are set (substituted) in a query specified by that query ID. The system then makes retrieval using the query, and returns a retrieval result and a predetermined style sheet to the client terminal. The client terminal displays the received retrieval result in the form of a map using the style sheet, thus making window transition.

In this manner, according to this embodiment, window transition from a window that display a table showing a retrieval result to another window that displays another table showing more detail retrieval result than the former retrieval result can be easily made without any explicit operation.

For example, a case that structured documents including a component "keyword" in which a value including any of concept items (child components) subordinated to concept "function" and any of concept items (child components) subordinated to concept "technology" is included are retrieved from "paper" documents stored below node "group of papers" in the structured document database in the state shown in FIG. 55, will be exemplified below.

In this case, a map which associated the retrieved structured document with concept items (child components) of concept "function" and concept items (child components) of concept "technology" is displayed. This map has a table format in which child components of concept "function" and those of concept "technology" are arranged as classification items along the x- and y-axis as axis of analysis used to classify and display a retrieval result. That is to say, child components of concept "function" (e.g. concept items classified as concept items immediately lower than the concept "function") are set at column indexes of the map respectively and child components of concept "technology" (e.g. concept items classified as concept items immediately lower than the concept "technology") are set at row indexes of the map.

Figure 58:
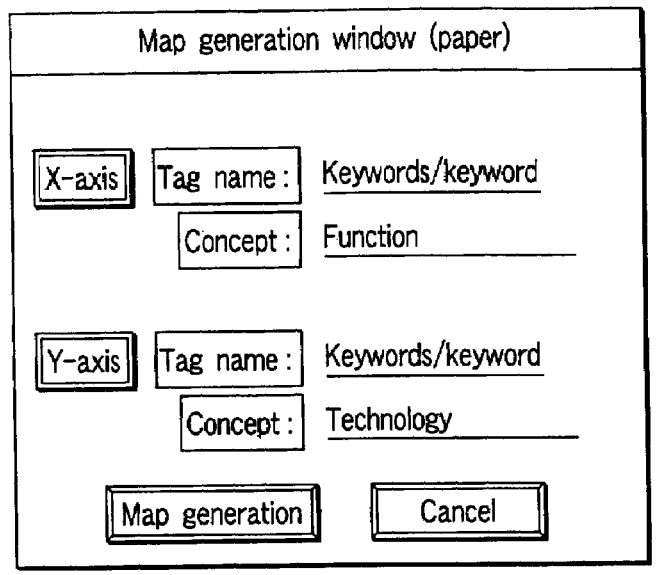
FIG. 58 shows an example of a retrieval condition input window for conceptual retrieval.

When the user of the client terminal wants to generate the map in the structured document management system, he or she inputs components set at axis (x- and y-axis) of analysis on a retrieval window shown in FIG. 58 with reference to the current tree structure of the structured document database shown in FIG. 55, which is displayed on a display device on the client terminal. Assume that the window shown in FIG. 58 is a retrieval window when the range of structured documents to be retrieved corresponds to "paper" documents below node "group of papers", for the sake of simplicity.

As shown in FIG. 58, for the x-axis, the user inputs "keywords/keyword" (this is the structured document pass indicating "keyword" immediately below node "keywords" to designate components to be searched in "paper" information inputs concept "function" as a classification item to be assigned to the x-axis. Furthermore, for the y-axis, the user inputs "keywords/keyword" to designate components to be searched in "paper" information, and also inputs concept "technology" as a classification item to be assigned to the y-axis. After that, when the user selects a "map generation" button using, e.g., the mouse, a retrieval request is issued to the structured document management system.

Figure 70:
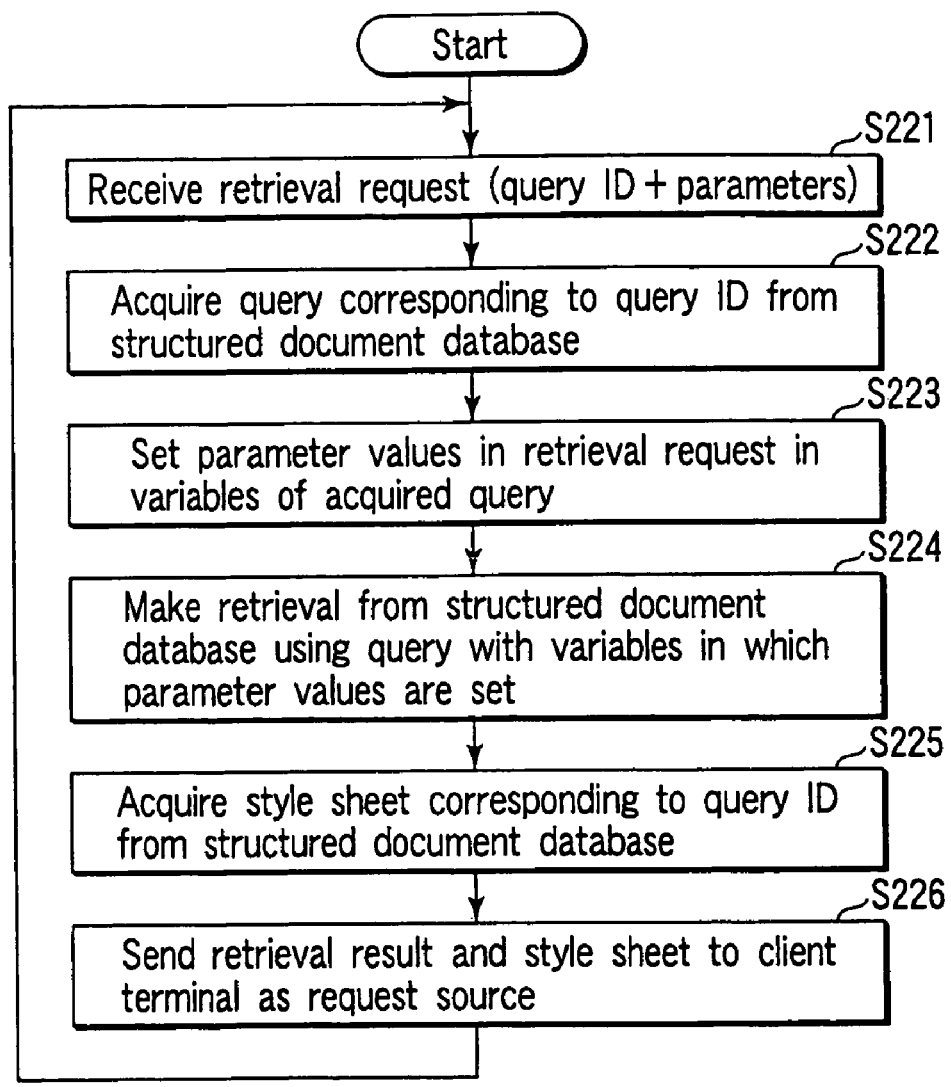
FIG. 70 is a flow chart for explaining the processing operation of the structured document management system.

The processing operation between the structured document management system and client terminal will be described below with reference to FIGS. 59 and 70. Note that FIG. 70 is a flow chart for explaining the processing operation of the structured document management system.

If the user selects the "map generation" button on the retrieval window shown in FIG. 58 using, e.g., the mouse (step S201), a retrieval request which includes query ID "Qid0" and parameter values input by the user (to be substituted in predetermined variables in the corresponding query) is sent to the structured document management system (step S202).

Note that the retrieval window shown in FIG. 58 is associated with query ID "Qid0" and corresponding parameters in advance. When the user selects the "map generation" button on the retrieval window, the values input by the user are sent as the parameter values together with query ID "Qid0" to the structured document management system as a retrieval request.

In this case, query ID "Qid0" corresponds to structured document pass "uix://root/group of queries/query [0]". Four parameters (first, second, third, and fourth parameters) included in this query. The retrieval condition on the x-axis corresponds to the first and second parameters. The retrieval condition on the y axis corresponds to the third and fourth parameters. The value of the first parameter corresponds to a component to be searched, as the retrieval condition used in the x-axis, is component "keywords/keyword", which is input by the user. The value of the second parameter corresponds to a retrieval condition used in the x-axis, is concept "function", which input by the user. The third parameter corresponds to a component to be searched, as the retrieval condition used in the y-axis, is component "keywords/keyword", which is input by the user. The fourth parameter corresponds to a retrieval condition used in the y-axis, is concept "technology", which input by the user.

The retrieval request is received by the request receiving device 11 of the structured document management system (step S221 in FIG. 70), and is processed by the retrieval request processing device 3.

Figure 59:
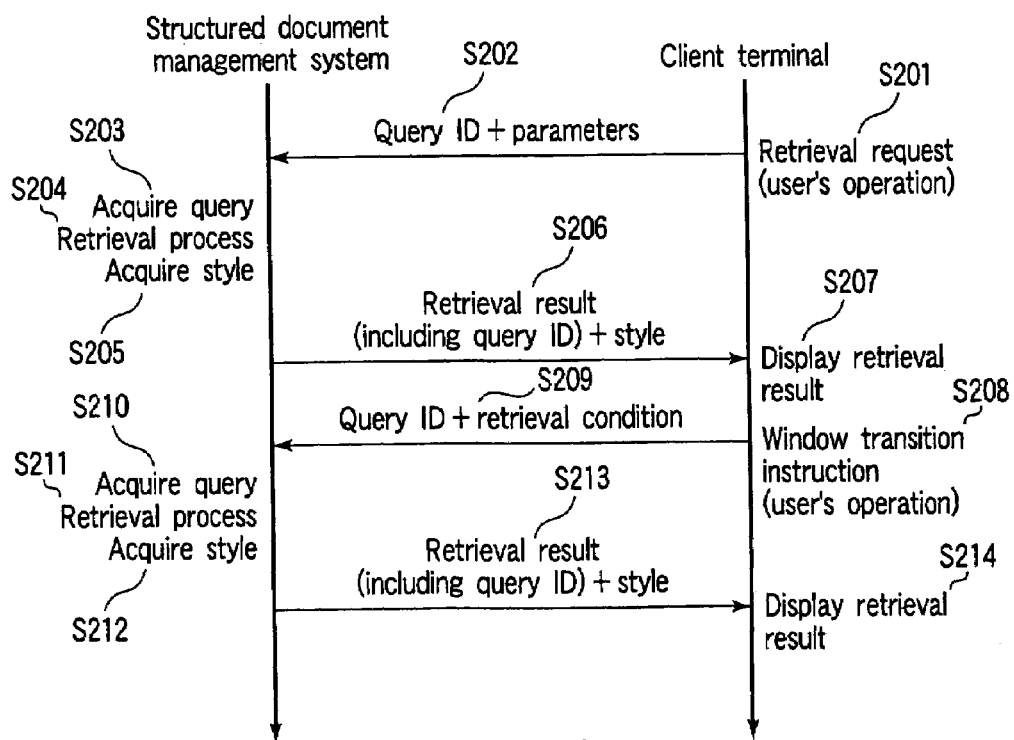
FIG. 59 is a flow chart for explaining the processing operation between the structured document management system and client terminal.

The retrieval request processing device 3 acquires a query corresponding to query ID "Qid0" contained in the retrieval request from the structured document database (step S203 in FIG. 59, step S222 in FIG. 70). More specifically, since query ID "Qid0" corresponds to structured document pass "uix://root/group of queries/query[0]", the query specified by that query ID (structured document pass) is acquired from the structured document database shown in FIG. 55. The parameter values contained in the retrieval request are set in variables of the query (step S223 in FIG. 70). Using this query, "paper" documents in which any of child components of concept "function" (at least one of the concept items subordinated to concept "function") and any of child components of concept "technology" (at least one of the concept items subordinated to concept "technology") are included in component values with tag name "keyword" are retrieved from documents stored below node "group of papers" in the structured document database (step S204, step S224 in FIG. 70).

FIG. 60 shows the query of query ID "Qid0".

This query includes four variables or "$tag1", "$category1", "$tag2", and "$category2". And "$tag1", "$category1", "$tag2", and "$category2" respectively correspond to the tag name (component name) and concept item used for the retrieval condition for the x-axis, and the tag name (component name) and concept item used for the retrieval condition for the y-axis.

In a field bounded by "head" tags, the values given as the parameters are set in the variables. That is, "keywords/keyword" as the values of the first and third parameters is set in "$tag1" and "$tag2", and the values "function" and "technology" of the second and fourth parameters are respectively set in "$category1" and "$category2".

A field bounded by "kf:from" tags describes a retrieval condition that "the value of component "keyword" included in "paper" documents stored below "uix://root/group of papers" includes one of concept items subordinated to concept "function" and includes one of concept items subordinated to concept "technology"". With this description, each concept items below concept "function" is substituted in variable "$sub1", and each concept items below concept "technology." is substituted in variable "$sub2". These two variables ("$sub1", "$sub2") and values of component "keyword" in all pieces of "paper" documents are compared, to extract "paper" documents each of which satisfies the retrieval condition described above.

With a description in a field bounded by "result" tags, the number of "paper" documents each satisfying the retrieval condition is counted. That is, every time "paper" document which satisfies the retrieval condition described in the field bounded by the "kf:from" tags is extracted during retrieval, the number of "paper" documents that satisfy the retrieval condition is counted in correspondence with the values of variables "$sub1" and "$sub2", to obtain count results as variables "$cnt0". Also, this description means that the values of variables "$cnt0" and the values of variables "$sub1" and "$sub2" are output in correspondence with the number of variables "$cnt0". That is to say, each of variables "$cnt0" is associated with one of the values of variables "$sub1" and one of the values of variables "$sub2".

There are three fields bounded by the "kf:from" tags. The first field bounded by the "kf:from" tags means to substitute the value of component "$tag1" (in this case, "keywords/keyword" as the value of the first parameter sent as the retrieval request) included in one of "paper" documents which is located immediately below pass "uix://root/group of papers" in variable "$keyword1", and to substitute the value of tag "$tag2" (in this case, "keywords/keyword" as the value of the third parameter sent as the retrieval request) included in one of "paper" documents which is located immediately below pass "uix://root/group of papers" in variable "$keyword2".

The second field bounded by the "kf:from" tags means to find out first components (concept items), each of the first components is located below a node designated by pass "uix://root/concept tree", and has a "concept" tag that is located immediately below a "concept" tag having a "name" attribute value "$category1" (in this case, "function" as the value of the second parameter sent as the retrieval request) and that one of the concept items below the first component is included in the value of variable "$keyword1". In this field, whenever the first component is found, the "name" attribute value of the first component is substituted in variable "$sub1".

The third field bounded by the "kf:from" tags means to find out second components (concept items), each of the second components is located below a node designated by pass "uix://root/concept tree", and has a "concept" tag that is located immediately below a "concept" tag having a "name" attribute value "$category2" (in this case, "technology" as the value of the fourth parameter sent as the retrieval request) and that one of the concept items below the second component is included in the value of variable "$keyword2". In this field, whenever the second component is found, the "name" attribute value of the second component is substituted in variable "$sub2".

A field bounded by "kf:select" tags means to set the values of variables "$sub1" and "$sub2" at "x" and "y" tags respectively, and to set count results (the values of variables "$cnt0") associated with the one of the values of variables "$sub1" and one of the values of "$sub2" at the value of a "count" tag. The values of variables "$sub1" and "$sub2" obtained by the description in the second and third field bounded by the "kf:from" tags are respectively sub-concept items of (concept items classified as concept items immediately lower than) main concepts "function" (x-axis) and "technology" (y-axis).

A "kf:groupBy" tag means to execute a plurality of processes each corresponding to one of the values of variables "$sub1" and one of the values of variables "$sub2".

The actual retrieval process based on the query shown in FIG. 60 may be done using the structure index shown in FIG. 9 and the lexical index shown in FIG. 10 as in the above embodiment. However, in this case, all "paper" documents stored in the structured document database undergo retrieval one by one, to find out "paper" documents which match a condition "the value of component "keyword" includes at least one of the character-strings which are "storage function" and descendant concept items of concept "storage function" or at least one of the character strings which are "retrieval function" and descendant concept items of concept "retrieval function", as sub-concept items of concept "function"", and matches a condition "the value of component "keyword" includes at least one of the character strings which are "database technology", "natural language technology", and "knowledge processing technology" as sub-concept items of concept "technology"".

The numbers of "paper" documents which satisfy the above two conditions are used as retrieval count results corresponding to the sub-concept items on the x- and y-axis.

FIG. 61 shows an XML document as a retrieval result obtained by executing retrieval of the structured document database.

In FIG. 61, a field bounded by "result" tags describes one of sub-concept items of concept "function" to be arranged on the x-axis as indexes of columns, one of sub-concept items of concept "technology" to be arranged on the y-axis as indexes of rows, and "count" as a result of retrieving and counting "paper" documents using them as the retrieval condition. That is to say, the variable "count" is associated with one of the sub-concept items immediately lower than concept item "function" and one of the sub-concept items immediately lower than concept item "technology", and represents the number of the "paper" documents each including component "keyword" which includes a value in which one of the concept items subordinate to the one of the sub-concept item of concept item "function" (including the one of the sub-concept item of concept item "function") and the one of the sub-concept items of concept item "technology" (including the one of the sub-concept item of concept item "function"). Since there are two sub-concept items of concept "function" and three sub-concept items of concept "technology", there are a total of six fields bounded by the "result" tags.

Referring back to FIG. 59, after the retrieval result is obtained, a style sheet corresponding to query ID "Qid0" is acquired (step S205, step S225 in FIG. 70).

The style sheet is a document that defines the display style of the retrieval result corresponding to the query specified by the query ID, and is also a structured document, which is to be managed by the structured document database. Also, the style sheet is described in XSL (Extensible Style Language) or the like.

Since the style sheet is stored in the structured document database, a structured document pass that represents a local area where the corresponding style sheet is stored preferably expresses a style ID. The retrieval request processing device 3 acquires a style sheet specified by the style ID (structured document pass) from the structured document database shown in FIG. 55.

The retrieval request processing device 3 pre-stores a correspondence table of query IDs and style IDs, as shown in FIG. 62. Note that individual style sheets are identified by style IDs, and FIG. 62 shows correspondence between the query IDs and style IDs. In step S205 shown in FIG. 59, a style sheet corresponding to the received query ID is acquired based on the table shown in FIG. 62, and the XML document as the retrieval result shown in FIG. 61 and the acquired style sheet are returned to the client terminal as the request source (step S206, step S226 in FIG. 70).

Using the style sheet, the XML document as the retrieval result shown in FIG. 61 is displayed on the client terminal as a matrix (table)-format map, as shown in, e.g., FIG. 63 (step S207).

In the map shown in FIG. 63, "storage function" and "retrieval function" as the sub-concept items of concept "function" are arranged on the x-axis as indexes of columns, and "database technology", "natural language technology", and "knowledge processing technology" as the sub-concept items of concept "technology" are arranged on the y-axis as indexes of the row to form a matrix. Also, an element (data cell) at the intersection of given sub-concept items on the x- and y-axis displays a "count" value as a result of retrieving and counting "paper" documents using those sub-concept items in the retrieval condition. That is to say, each of the retrieved structured documents ("paper" document) is categorized into one of data cells of the map, based on the sub-concept items of concept "function" and sub-concept items of concept "technology" which are included in the value of the component "keyword" included in each of the retrieved structured documents.

Note that elements (or cells) which form the matrix of the map are expressed by coordinates like elements (x, y), as shown in FIG. 64, for the sake of simplicity. In this case, x=1, 2, and 3, and y=1, 2, 3, and 4.

When the XML document as the retrieval result shown in FIG. 61 is displayed in the map format, as shown in FIG. 63, the elements that form the matrix of the map are associated with the query IDs and parameter values, as shown in FIG. 65, based on the description of the style sheet corresponding to query ID "Qid0". The parameter values associated with each element in the matrix of the map can be determined by the position of the-element on the matrix.

In the XML document as the retrieval result shown in FIG. 61, a field bounded by "head" tags defines possible value ranges of query IDs and parameters, which are used upon next window transition, and are to be associated with elements in the matrix of the map.

When the user selects one element on the map shown in FIG. 63 using, e.g., the mouse, the query ID and parameter values associated with that element are sent as a retrieval request to the structured document management system to attain window transition.

In FIG. 61, components bounded by "XTAG" and "XVAL" tags define the ranges of the parameter values used in the next window transition. In this case, as the ranges of the parameter values corresponding to the retrieval condition on the x-axis, component name "keywords/keyword" to be searched and concept "function" are defined.

Components bounded by "YTAG" and "YVAL" tags define the ranges of the parameter values used in the next window transition. In this case, as the ranges of the parameter values corresponding to the retrieval condition on the y-axis, component name "keywords/keyword" to be searched and concept "technology" are defined.

Components bounded by "QID1" and "QID2" tags define the query IDs of queries used in the next window transition.

A method of assigning the query IDs and parameters to elements of the matrix of the map using the style sheet will be explained below with reference to FIGS. 61 and 65. The style sheet has a description for assigning the query IDs and parameters to elements in the elements (cells) of the map, and a browser on the client terminal associates the query IDs and parameters with the elements in the map on the basis of the description of this style sheet and the XML document as the retrieval result shown in FIG. 61. Note that such process of the browser is the well-known art.

The style sheet corresponding to query ID "Qid0" describes the following contents (1) to (4).

(1) A set {X0, X1, . . . , Xi} corresponding to values of components bounded by "X" tags shown in FIG. 61, MaxX corresponding to the number of component values, a set {Y0, Y1, . . . , Yj} corresponding to values of components bounded by "Y" tags shown in FIG. 61, and MaxY corresponding to the number of the component values, are obtained. Note that "i" is an integer which falls within the range "0"≦i<"MaxX", and "j" is an integer which falls within the range "0"≦j<"MaxY".

(2) To each of the elements in the uppermost row (column index cells) of the map, a set of {the value of a component bounded by "QID1" tags shown in FIG. 61, the value of a component bounded by "XTAG" tags shown in FIG. 67, Xi, the value of a component bounded by "YTAG" tags shown in FIG. 61, the value of a component bounded by "YVAL" tags shown in FIG. 61} are assigned.

(3) To each of the elements in the leftmost column (row index cells) of the map, a set of {the value of a component bounded by "QID1" tags shown in FIG. 61, the value of a component bounded by "XTAG" tags shown in FIG. 61, the value of component bounded by "XVAL" tags shown in FIG. 61, the value of component bounded by "YTAG" tags shown in FIG. 61, Yj} are assigned.

(4) To each of the other elements (data cells) of the map, a set of {the value of a component bounded by "QID2" tags shown in FIG. 61, the value of a component bounded by "XTAG" tags shown in FIG. 61, Xi, the value of component bounded by "YTAG" tags shown in FIG. 61, Yj↑ are assigned.

According to this description, initially, the set {X0, X1, Xi}, or the values of components bounded by "X" tags (={storage function, retrieval function}), MaxX or the number of the component values (=2), the set {Y0, Y1, . . . , Yj} or the values of components bounded by "Y" tags (={database technology, natural language technology, knowledge processing technology}), and MaxY, or the number of the component values (=3) are obtained from the XML document as the retrieval result in FIG. 61. For example, X0="storage function", X1="retrieval function", Y0="database technology", Y1="natural language technology", and Y2="knowledge processing technology".

Subsequently, the query IDs and parameters are associated with cells of the map respectively, based on the set assigned to each cell.

In FIG. 65, to elements (2, 1) and (3, 1) in the uppermost row (column index cells) of the map, {the value of a component bounded by "QID1" tags, the value of a component bounded by "XTAG" tags, Xi, the value of a component bounded by "YTAG" tags, the value of component bounded by "YVAL" tags} are assigned. According to this rule, element (2, 1) is associated with {Qid0, keywords/keyword, storage function, keywords/keyword, technology}. Also, element (3, 1) is associated with {Qid0, keywords/keyword, retrieval function, keywords/keyword, technology}.

In FIG. 65, to elements (1, 2), (1, 3), and (1, 4) in the leftmost column (row index cells) of the map, {the value of a component bounded by "QID1" tags, the value of a component bounded by "XTAG" tags, the value of component bounded by "XVAL" tags, the value of component bounded by "YTAG" tags, Yj} are assigned. According to this rule, element (1, 2) is associated with {Qid0, keywords/keyword, function, keywords/keyword, database technology}. Also, element (1, 3) is associated with {Qid0, keywords/keyword, function, keywords/keyword, natural language technology}. Furthermore, element (1, 4) is associated with {Qid0, keywords/keyword, function, keywords/keyword, knowledge processing technology).

To other elements (2, 2), (2, 3), (2,4), (3, 2), (3, 3), and (3, 4), {the value of a component bounded by "QID2" tags, the value of a component bounded by "XTAG" tags, Xi, the value of component bounded by "YTAG" tags, Yj} are assigned. According to this rule, element (2, 3) is associated with {Qid1, keywords/keyword, storage function, keywords/keyword, natural language technology}, and element (3, 2) is associated with {Qid1, keywords/keyword, retrieval function, keywords/keyword, database technology}.

Window transition after the map shown in FIG. 63 is displayed on the client terminal will be explained below with reference to FIG. 66.

In FIG. 66, assume that map M1 (which is the same as that in FIG. 63) is displayed on the client terminal. When the user clicks element (3, 1) of map M1 using, e.g., the mouse, window transition is made to a display window of another map M2. When the user clicks element (3, 4) of map M1 using, e.g., the mouse, window transition is made to a display window of paper list M3.

Element (3, 1) of map M1 is associated with the query ID and parameters or {Qid0, keywords/keyword, retrieval function, keywords/keyword, technology}, as shown in FIG. 65. When the user clicks, e.g., element (3, 1) using the mouse or the like, a window transition instruction is issued (step S208 in FIG. 59). With this instruction, a retrieval request which includes query ID "Qid0" and the corresponding parameters (parameter 1, parameter 2, parameter 3, parameter 4)= (keywords/keyword, retrieval function, keywords/keyword, technology) as the retrieval condition is sent to the structured document management system shown in FIG. 1.

The retrieval request is received by the request receiving device 11 of the structured document management system (step S221 in FIG. 70) as in the above description, and is processed by the retrieval request processing device 3 as shown in steps S222 to S226 in FIG. 70.

The retrieval request processing device 3 acquires a query corresponding to query ID "Qid0" from the structured document database (step S210 in FIG. 59), by using the command (e.g. get XML("uix://root/group of queries/query [0]")). That is, since query ID "Qid0" corresponds to structured document pass "uix://root/group of queries/query[0]" in this case, a query specified by that query ID (structured document pass) is acquired from the structured document database shown in FIG. 55. The values of parameters sent as the retrieval request are set in the acquired query. Then, "paper" documents, each of which one of concept items subordinate to concept "retrieval function" and one of concept items subordinate to concepts "technology" are included in the value of components bounded by tag name "keyword", are retrieved from documents stored under node "group of papers" in the structured document database (step S211 in FIG. 59).

The query used in retrieval in step S211 uses that of query ID "Qid0" shown in FIG. 60. However, in this case, since different parameter values are used, different values are set in four variables in fields bounded by "head" tags. That is, "keywords/keyword" is set in "$tag1" and "$tag2", and "retrieval function" and "technology" are respectively set in "$category1" and "$category2". Other components are almost the same as those in FIG. 60.

An actual retrieval process based on the above query searches all "paper" documents stored in the structured database one by one, the "paper" documents, each of which matches a first condition and a second condition. The first condition is that "the value of a component bounded by "keyword" tags includes one of character strings (concept items) which are classified into one of the sub-concept items of concept item "retrieval function", the sub-concept items of concept "retrieval function" including "keyword retrieval function", "retrieval function", "image retrieval function", and "ambiguous retrieval function". The second condition is that "the value of a component bounded by "keyword" tags includes one of character strings (concept items) which are classified into one of the sub-concept items of concept item "technology", the sub-concept items of concept item "technology" including "database technology", "natural language technology", and "knowledge processing technology".

Each of the variables "count" or the number of "paper" documents associated with one of the sub-concept items of concept "retrieval function" and one of the sub-concept items of concept item "technology", is obtained by counting the number of "paper" documents each including the component "keyword" which includes a value in which one of the concept items which are classified into the one of the sub-concept items of concept item "retrieval function" and one of concept items which are classified into the one of the sub-concept items of concept item "technology".

FIG. 67 shows an XML document as a retrieval result obtained by the aforementioned retrieval process of the structured document database.

Referring to FIG. 67, a field bounded by "result" tags describes one of sub-concept items of concept "retrieval function" arranged on the x-axis, one of sub-concept items of concept item "technology", and "count" as a retrieval result using the concept items described in the field as the retrieval condition. Since there are four sub-concept items of concept item "retrieval function" and three sub-concept items of concept item "technology", there are a total of 12 fields bounded by "result" tags.

After the retrieval result is obtained, a style sheet corresponding to query ID "Qid0" is acquired from the table shown in FIG. 62 (step S212 in FIG. 59), by using the command (e.g. get XML).

The XML document as the retrieval result shown in FIG. 67, and the acquired style sheet are returned to the client terminal as the request source (step S213 in FIG. 59).

For example, the XML document as the retrieval result shown in FIG. 67 is displayed on the client terminal as matrix (table)-format map M2, as shown in, e.g., FIG. 66 (step S214 in FIG. 59). More specifically, when the user clicks element (3, 1) of map M1 displayed on the screen using the mouse on the client terminal, window transition to the window of map M2 is attained.

Elements of map M2 in FIG. 66 are also associated with query IDs and parameter values by the style sheet as in map M1.

Note that elements (cells) that form the map M2 are expressed by coordinates like elements (x, y), as shown in FIG. 68, for the sake of simplicity. In this case, x=1 to 5, and y=1 to 4.

As in the above description, with the style sheet corresponding to query ID "Qid" elements (2, 1), (3, 1), (4, 1), and (5, 1) in the uppermost row (column index cells) of map M2 are assigned with {the value of a component bounded by "QID1" tags, the value of a component bounded by "XTAG" tags, Xi, the value of a component bounded by "YTAG" tags, the value of component bounded by "YVAL" tags}. According to this rule, element (2, 1) is associated with {Qid0, keywords/keyword, keyword retrieval function, keywords/keyword, technology}. Also, element (3, 1) is associated with {Qid0, keywords/keyword, tag retrieval function, keywords/keyword, technology}. Furthermore, element (4, 1) is associated with {Qid0, keywords/keyword, image retrieval function, keywords/keyword, technology}. Moreover, element (5, 1) is associated with {Qid0, keywords/keyword, ambiguous retrieval function, keywords/keyword, technology}.

Elements (1, 2), (1, 3), and (1, 4) in the leftmost column (row index cells) of map M2 are assigned with {the value of a component bounded by "QID1" tags, the value of a component bounded by "XTAG" tags, the value of component bounded by "XVAL" tags, the value of component bounded by "YTAG" tags, Yj}. According to this rule, element (1, 2) is associated with {Qid0, keywords/keyword, retrieval function, keywords/keyword, database technology}. Also, element (1, 3) is associated with {Qid0, keywords/keyword, retrieval function, keywords/keyword, natural language technology}. Furthermore, element (1, 4) is associated with {Qid0, keywords/keyword, retrieval function, keywords/keyword, knowledge processing technology}.

Other elements (data cells) of the map M2 are assigned with {the value of a component bounded by "QID2" tags, the value of a component bounded by "XTAG" tags, Xi, the value of component bounded by "YTAG" tags, Yj}. According to this rule, element (2, 3) is associated with {Qid1, keywords/keyword, keyword retrieval function, keywords/keyword, natural language technology}, and element (3, 2)

is associated with {Qid1, keywords/keyword, tag retrieval function, keywords/keyword, database technology}.

When the user instructs window transition by clicking an element of the map M2, which is associated with the query ID and parameter values, using the mouse, a retrieval request which includes the query ID and parameter values associated with the clicked element is sent to the structured document management system shown in FIG. 1, thus achieving window transition (steps S208 to S214 in FIG. 59).

When the user clicks element (3, 4) in the matrix of map M1 using the mouse or the like, window transition is made to a display window of paper list M3.

Element (3, 4) of map M1 is associated with the query ID and parameter values, i.e., {Qid1, keywords/keyword, retrieval function, keywords/keyword, knowledge processing technology}, as shown in FIG. 65. When the user clicks, e.g., element (3, 4) using the mouse or the like, a window transition instruction is issued (step S208 in FIG. 59). With this instruction, a retrieval request which includes query ID "Qid1" and parameter values as the retrieval condition that are associated with element (3, 4), i.e., (parameter 1, parameter 2, parameter 3, parameter 4)=(keywords/keyword, retrieval function, keywords/keyword, knowledge processing technology) is sent to the structured document management system.

The retrieval request is received by the request receiving device 11 of the structured document management system, and is processed by the retrieval request processing device 3 as in the above description.

The retrieval request processing device 3 acquires a query corresponding to query ID "Qid1" from the structured document database (step S210 in FIG. 59). That is, since query ID "Qid1" corresponds to structured document pass "uix://root/group of queries/query[1]" in this case, a query specified by that query ID (structured document pass) is acquired from the structured document database shown in FIG. 55, e.g. by using the command "getXML". The values of parameters sent as the retrieval request are set in the acquired query. Then, "paper" documents in which one of concept items subordinate to concept "retrieval function" and one of concept items subordinate to concept "technology" are included in the values of components bounded by tag name "keyword" is retrieved from documents stored under node "group of papers" in the structured document database (step S211).

FIG. 69 shows the query of query ID "Qid1" used in retrieval in step S211.

This query includes four variables, or "$tag1", "$category1", "$tag2", and "$category2". And "$tag1", "$category1", "$tag2", and "$category2" correspond to the tag name and concept item used for the x-axis, and those used for the y-axis.

With a description in a field bounded by "head" tags, the parameter values sent as the retrieval request are set in the variables. That is, "keywords/keyword" is set in "$tag1" and "$tag2", and "retrieval function" and "knowledge processing technology" are respectively set in "$category1" and "$category2".

A field bounded by "kf:from" tags describes a retrieval condition "the value of component "keyword" in "paper" documents stored below "uix://root/group of papers", includes one of concept items classified into (subordinate to) concept item "retrieval function" and one of concept items classified into (subordinate to) concept item "knowledge processing technology"".

A field bounded by "result" tags has the following description. That is, this field describes that "when "paper" document which satisfies the retrieval condition described in the field bounded by "kf:from" tags is extracted during retrieval, the value of variable "$elt" substituted with the extracted "paper" document itself (or the tag name of the top node of a document object tree of that "paper" document) is output, and the number of value of variable "$elt" to be output is equal to the number of extracted "paper" documents".

There are three fields bounded by the "kf:from" tags. The first field bounded by the "kf:from" tags means to substitute the value of component bounded by tags "$tag1" below pass "uix://root/group of papers" in variable "$keyword1", and to substitute the value of component bounded by tags "$tag2" below pass "uix://root/group of papers" in variable "$keyword2". Also, a field bounded by "kf:as" tags means to substitute that "paper" document itself in variable "$elt".

The second field bounded by the "kf:from" tags means to find out first components (concept items), each of the first components is located below a node designated by pass "uix://root/concept tree", and has a "concept" tag that is located immediately below a "concept" tag having a "name" attribute value "$category1" (in this case, "retrieval function") and that one of the concept items below the first component is included in the value of variable "$keyword1".

The third field bounded by the "kf:from" tags means to find out second components (concept items), each of the second components is located below a node designated by pass "uix://root/concept tree", and has a "concept" tag that is located immediately below a "concept" tag having a "name" attribute value "$category2" (in this case, "knowledge processing technology") and that one of the concept items below the second component is included in the value of variable "$keyword2".

A field bounded by "kf:select" tags means to set the value substituted in variable "$elt" (e.g., the extracted "paper" document itself) in the value of a component bounded by "result" tags.

A "kf:groupBy" tag means to execute a plurality of processes each corresponding to one of the values of variables "$elt".

An actual retrieval process based on the query shown in FIG. 69 searches all "paper" documents stored in the structured database one by one, to find "paper" documents which matches a condition "the value of a component bounded by "keyword" tags includes character string corresponding to one of the concept items which are concept "retrieval function" and concept items below the node of concept "retrieval function"", and a condition "the value of a component bounded by "keyword" tags includes the character string corresponding to the concept item "knowledge processing technology"".

"Paper" documents that satisfy the above two conditions are obtained as a retrieval result.

After the retrieval result is obtained, a style sheet corresponding to query ID "Qid1" is acquired from the table shown in FIG. 62 (step S212 in FIG. 59).

The XML document as the retrieval result, and the acquired style sheet are returned to the client terminal as the request source (step S213 in FIG. 59).

The style sheet extracts only values of " title"component in " paper" document from the XML document as the retrieval result, and displays them as list M3, as shown in FIG. 66 (step S214 in FIG. 59). That is, when the user clicks element (3, 4) of map M1 on the window displayed on the client terminal using the mouse, window transition to a window of list M3 is attained.

As described above, according to the embodiment, since a query which includes variables corresponding to component names (tag names) and concept items used in the retrieval condition, and a style sheet associated with each query are used, window transition that involves retrieval can be easily made by associating a query ID (as identification information of the query) and parameter values with the each elements (cells) of the map which display the retrieval result.

That is, when the user designates a display region (e.g. one of the cells of the table) where the query ID and parameter values are embedded (associated), a retrieval request which includes the query ID and parameter values embedded in (associated with) that display region is sent to the structured document management system. Upon receiving this retrieval request, the structured document management system sets the parameter values included in the retrieval request at variables in a query corresponding to the query ID included in that request, and searches the structured document database. Then, the retrieval result is displayed on the screen of the request source using the style sheet corresponding to that query ID. In this way, when the user wants to see more details of information after he or she observes the retrieval result displayed on the screen, he or she need only designate a desired display region (one of the cells of the table) on the display screen to display detailed information of the contents displayed on the designated display region.

As described above, according to the present invention, on a structured document database storing and managing structured documents having various document structure, as shown in FIG. 55 or the like, retrieval that involves window transition from a display of a retrieval result from a given viewpoint to that from another viewpoint can be easily executed.

When the retrieval method of the embodiment described above is applied to a conventional structured document database storing structured documents each having a specific document structure, OLAP can be implemented. In this case, information such as queries, style sheets, and the like, whose document structure are not the specific document structure, is stored and managed separately from the structured document database.

Note that the method described in the embodiments of the present invention can be distributed by storing in a recording medium such as a magnetic disk (floppy disk, hard disk, or the like), optical disk (CD-ROM, DVD, or the like), semiconductor memory, or the like, as a program that can be executed by a computer Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for retrieving structured documents from a structured-documents-database having a hierarchical structure and storing a plurality of structured documents each having a document structure and a plurality of first data items, each of the document structures being constructed by a plurality of components, each of the component constructing the hierarchical structure, and each of the first data items being stored in the structured-documents-database as a value included in one of the components, the apparatus comprising:

a receiver configured to receive a first group of a first desired component, a second desired component, a first desired concept item, and a second desired concept item, the first desired concept item having a plurality of first concept items classified hierarchically and subordinated to the first desired concept item, and the second desired concept item having a plurality of second concept items classified hierarchically and subordinated to the second desired concept item;

a first generating device configured to generate a first retrieval condition for retrieving a plurality of first structured documents each including the first desired component including a value in which one of the first concept items is included and the second desired component including a value in which one of the second concept items is included, based on the first group;

a retrieving device configure to retrieve the first structured documents from the structured-documents-database, based on the first retrieval condition, to obtain a plurality of first retrieval results each associated with one of a plurality of first items classified as first concept items immediately lower than the first desired concept item and one of a plurality of second items classified as second concept items immediately lower than the second desired concept item;

a second generating device configured to generate a first table for displaying the first retrieval results, by using a table which constructed by a plurality of cells arranged two-dimensionally, the cells including a plurality of column index cells and a plurality of row index cells and a plurality of data cells, the column index cells in which a plurality of column indexes are set respectively, the row index cells in which a plurality of row indexes are set respectively, and the data cells in which a plurality of second data items are set respectively, setting the first items at the column index cells as the column indexes respectively, setting the second items at row index cells as the row indexes respectively, and setting the first retrieval results at the data cells as the second data items respectively based on the one of the first items and the one of the second items which are associated with each of the first retrieval results;

an associating device configure to associate a plurality of second groups of the first desired component, the second desired component, one of the first items, and the desired second concept item with the column index cells of the first table respectively;

a display to display the first table;

a designating device configure to designate an area where one of the column index cells is displayed, to obtain a first designated area;

an acquiring device configure to acquire one of the second groups associated with the first designated area, to obtain acquired second group; and wherein:

the first generating device further generates a second retrieval condition for retrieving, a plurality of second structured documents each including the first desired component including a value in which one of the first concept items subordinated to the one of the first item is included and the second desired component including a value in which one of the second concept items are included, based on the acquired second group;

the retrieving device further retrieves a plurality of second structured documents from the structured-documents-database, based on the second retrieval condition, to obtain a plurality of second retrieval results each associated with one of a plurality of third items classified as first concept items immediately lower than the one of the first item and one of the second items;

the second generating device further generates a second table for displaying the second retrieval result, by using the table, setting the third items at the column index cells as the column indexes respectively, setting the second items at row index cells as the row indexes respectively, and setting the second retrieval results at the data cells as the second data items respectively based on one of the third items and one of the second items which are associated with each of the second retrieval results; and, the display further displays the second table.

2. The apparatus according to claim 1, wherein the first desired concept item, the first concept items, the second desired concept item, and the second concept items are stored in the structured-documents-database.

3. The apparatus according to claim 1, wherein:

the associating device further associates a plurality of third groups of the first desired component, the second desired component, the first desired concept item, and one of the second items with the row index cells of the first table, respectively;

the designating device further designates an area where one of the row index cells is displayed, to obtain a second designated area;

the acquiring device further acquires one of the third groups associated with the second designated area, to obtain acquired third group;

the first generating device further generates a third retrieval condition for retrieving a plurality of third structured documents each including the first desired component including a value in which one of the first concept items subordinated to the first desired concept item is included and the second desired component including a value in which one of the second concept items subordinated to the one of the second items included, based on the acquired third group;

the retrieving device further retrieve a plurality of third structured documents from the structured-documents-database, based on the third retrieval condition, to obtain a plurality of third retrieval results each associated with one of the first items and one of a plurality of fourth items classified as the second concept items immediately lower than the one of the second item;

the second generating device further generate a third table for displaying the third retrieval result, by using the table, setting the first items at the column index cells as the column indexes respectively, setting the fourth items at row index cells as the row indexes respectively, and setting the third retrieval results at the data cells as the second data items respectively based on one of the first items and one of the fourth items which are associated with each of the third retrieval results; and, the display further displays the third table.

4. The apparatus according to claim 1 wherein the associating device further associates a plurality of fourth groups of the first desired component, the second desired component, one of the first items, and one of the second items with the data cells of the first table respectively;

the designating device further designates an area where one of the data cells is displayed, to obtain a third designated area;

the acquiring device further acquires one of the fourth groups associated with the third designated area, to obtain acquired fourth group;

the first generating device further generates a fourth retrieval condition for retrieving a plurality of fourth structured documents each including the first desired component including a value in which one of the first concept items subordinated to the one of the first items is included and the second desired component including a value in which one of the second concept items subordinated to the one of the second items is included, based on the acquired fourth group;

the retrieving device further retrieves the fourth structured documents from the structured-documents-database, based on the fourth retrieval condition, to obtain at least one fourth retrieval result; and, the display further displays the fourth retrieval result.

5. The apparatus according to claim 1, wherein:

the associating device further associates a plurality of fifth groups of the first desired component, the second desired component, one of the third items, and the desired concept item with the column index cells of the second table respectively;

the designating device further designates an area where one of the column index cells of the second table is displayed, to obtain a fourth designated area;

the acquiring device further acquires one of the fifth groups associated with the fourth designated area, to obtain acquired fifth group;

the first generating device further generates a fifth retrieval condition for retrieving a plurality of fifth structured documents each including the first desired component including a value in which one of the first concept items subordinated to the one of the third item is included and the second desired component including a value in which one of the second concept items subordinated to the desired concept item is included, based on the acquired fifth group;

the retrieving device further retrieves a plurality of fifth structured documents from the structured-documents-database, based on the fifth retrieval condition, to obtain a plurality of fifth retrieval results each associated with one of a plurality of fifth items classified as the first concept items immediately lower than the one of the third item and one of the second items;

the second generating device further generates a fourth table for displaying the fifth retrieval result, by using the table, setting the fifth items at the column index cells as the column indexes respectively, setting the second items at row index cells as the row indexes respectively, and setting the fifth retrieval results at the data cells as the second data items respectively based on one of the fifth items and one of the second items which are associated with each of the fifth retrieval results; and, the display further displays the fourth table.

* * * * *

UNITED STATES PATENT AND TRADEMARK OFFICE
CERTIFICATE OF CORRECTION

| | | |
|---|---|---|
| PATENT NO. | : 7,231,386 B2 | Page 1 of 1 |
| APPLICATION NO. | : 10/980787 | |
| DATED | : June 12, 2007 | |
| INVENTOR(S) | : Nonomura et al. | |

It is certified that error appears in the above-identified patent and that said Letters Patent is hereby corrected as shown below:

Title page, item (57), in the Abstract, line 12, change "acquire" to --acquires--.

Claim 1, column 46, line 20, change "configure" to --configured--.

Claim 1, column 46, line 31, change "which constructed" to --which is constructed--.

Claim 1, column 46, line 46, change "configure" to --configured--.

Claim 1, column 46, line 52, change "configure" to --configured--.

Claim 1, column 46, line 55, change "configure" to --configured--.

Claim 3, column 47, line 45, change "retrieve" to --retrieves--

Claim 3, column 47, line 52, change "generate" to --generates--.

Signed and Sealed this

Seventh Day of August, 2007

JON W. DUDAS
*Director of the United States Patent and Trademark Office*